(12) United States Patent
Ahuja et al.

(10) Patent No.: US 12,466,874 B2
(45) Date of Patent: Nov. 11, 2025

(54) PREVENTION OF PROTEIN DISULFIDE BOND REDUCTION

(71) Applicant: MEDIMMUNE LLC, Gaithersburg, MD (US)

(72) Inventors: Sanjeev Ahuja, Gaithersburg, MD (US); Wai Keen Chung, Gaithersburg, MD (US); Deborah Sweet Goldberg, Gaithersburg, MD (US); Michael Handlogten, Gaithersburg, MD (US); Someet Narang, Gaithersburg, MD (US); Brian Russell, Gaithersburg, MD (US); Min Zhu, Gaithersburg, MD (US); Suzanne Hudak, Gaithersburg, MD (US); Kenneth Hwang, Gaithersburg, MD (US); Jihong Wang, Gaithersburg, MD (US)

(73) Assignee: MEDIMMUNE LLC, Gaithersburg, MD (US)

( * ) Notice: Subject to any disclaimer, the term of this patent is extended or adjusted under 35 U.S.C. 154(b) by 1008 days.

(21) Appl. No.: 17/545,262

(22) Filed: Dec. 8, 2021

(65) Prior Publication Data

US 2022/0098282 A1 Mar. 31, 2022

Related U.S. Application Data

(63) Continuation of application No. 16/300,315, filed as application No. PCT/US2017/031704 on May 9, 2017, now abandoned.

(60) Provisional application No. 62/334,136, filed on May 10, 2016.

(51) Int. Cl.
*C07K 16/00* (2006.01)
*A61K 39/395* (2006.01)

(52) U.S. Cl.
CPC ........ *C07K 16/00* (2013.01); *A61K 39/39591* (2013.01); *C07K 2317/14* (2013.01); *C07K 2317/40* (2013.01)

(58) Field of Classification Search
None
See application file for complete search history.

(56) References Cited

U.S. PATENT DOCUMENTS

| | | | |
|---|---|---|---|
| 8,574,869 B2 | 11/2013 | Kao et al. | |
| 2006/0030022 A1* | 2/2006 | Beckwith et al. | ... C12N 9/0004 |
| 2006/0252137 A1* | 11/2006 | Burmaster | ................ C12P 7/06 |
| 2008/0075713 A1* | 3/2008 | Eulenberg et al. | .... A61K 31/70 |
| 2008/0248521 A1 | 10/2008 | Knapp et al. | |
| 2009/0317391 A1 | 12/2009 | Fanidi et al. | |
| 2014/0128575 A1 | 5/2014 | Kao et al. | |
| 2016/0002695 A1 | 1/2016 | Von Borstel et al. | |

FOREIGN PATENT DOCUMENTS

| | | |
|---|---|---|
| WO | 2008074131 A1 | 6/2008 |
| WO | 2009009523 A2 | 1/2009 |

OTHER PUBLICATIONS

Hutterer et al. "Monoclonal antibody disulfide reduction manufacturing" MAbs (Year: 2013).*
Castro et al. "Interferon-based biopharmaceutical: Overview on the production, purification, and formulation" Vaccines (Year: 2021).*
Rezaei "Optimization of production of recombinant human growth hormone in E. coli" Journal Research in a Medical Sciences (Year: 2021).*
Bardell D.A., et al., "Clinical Research Abstracts of the British Equine Veterinary Association Congress 2015," Equine Veterinary Journal, Sep. 2015, vol. 47, No. 48, ISSN 2042-3306, 2 Pages.
Extended European Search Report for European Application No. 17796668.6, mailed Dec. 13, 2019, 6 Pages.
Handlogten W.M., et al., "Glutathione and Thioredoxin Systems Contribute to Recombinant Monoclonal Antibody Interchain Disulfide Bond Reduction During Bioprocessing : Glutathione System Reduces Antibody Interchain Disulfide Bonds," Biotechnology and Bioengineering, Jul. 1, 2017, vol. 114, No. 7, pp. 1469-1477, DOI: 10.1002/bit.26278, ISSN 0006-3592, XP055591527.
International Preliminary Report on Patentability for International Application No. PCT/US2017/031704, mailed Nov. 22, 2018, 10 Pages.
International Search Report for International Application No. PCT/US2017/031704, mailed Aug. 28, 2017, 4 Pages.
Lu J., et al., "The Thioredoxin Antioxidant System," Free Radical Biology and Medicine, 2014, vol. 66, pp. 75-87.
Written Opinion for International Application No. PCT/US2017/031704, mailed Aug. 28, 2017, 8 Pages.

* cited by examiner

*Primary Examiner* — Tracy Vivlemore
*Assistant Examiner* — John David Moore

(57) ABSTRACT

Disclosed are methods for testing the presence and/or activity of glutathione system components and thioredoxin system components during the manufacturing process of disulfide bond-containing proteins. Also disclosed are methods for mitigating reduction of disulfide bonds during the manufacturing process, and for lowering the reduction potential of disulfide bond-containing proteins. Provided are compositions, kits, and methods for mitigating reduction and diminishing reduction potential of disulfide bond-containing proteins during protein manufacturing processes.

13 Claims, 23 Drawing Sheets

PREVENTION OF PROTEIN DISULFIDE BOND REDUCTION

FIELD

Figure 1:
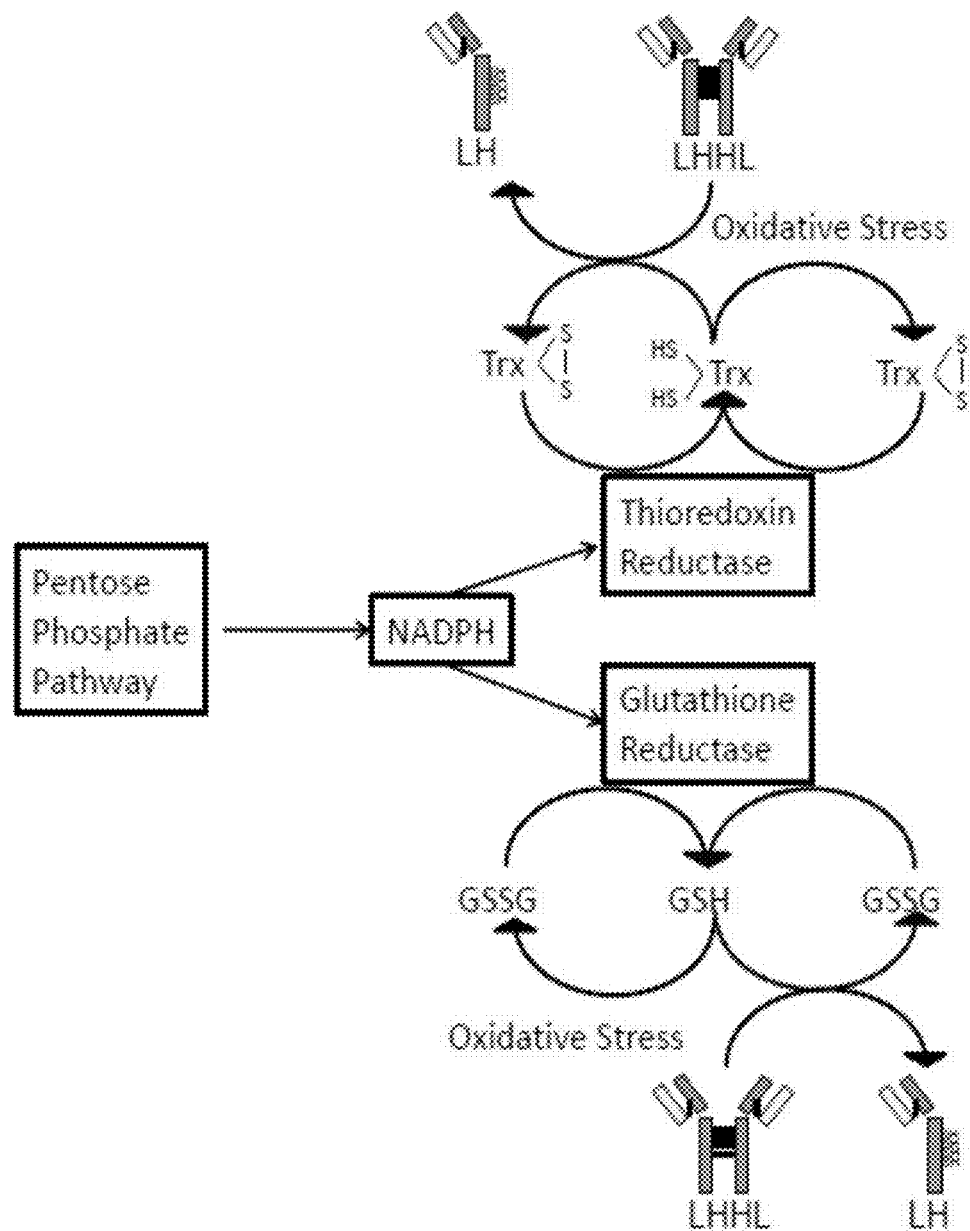

The present disclosure relates to reduction of monoclonal antibodies and resulting product variants. It discloses methods for increasing the yield of an intact disulfide bond-containing protein, methods for mitigating reduction of disulfide-bond containing proteins, and methods for mitigating reduction potential of disulfide-bond containing proteins.

BACKGROUND

Monoclonal antibodies (mAbs) are capable of binding to a wide range of targets with high affinity and exceptional specificity. Accordingly, mAbs have been successfully designed to treat a wide variety of diseases and conditions including cancers, infectious diseases, autoimmunity and inflammation, cardiovascular disease, and ophthalmological diseases. The high success rate of mAbs in the clinic has made them a rapidly growing and increasingly important class of therapeutics. To keep up with the increasing demand for these lifesaving molecules, significant effort has been invested in the development of manufacturing processes for mAbs designed to increase antibody titer while maintaining consistent product quality. Rapid increases in antibody titers have been achieved over the past decade, with current manufacturing processes generating greater than 10 g/L mAb.

Many protein molecules only function with the formation of stable inter- and intra-molecular disulfide bonds to properly fold and maintain function. Examples of these protein molecules are immunoglobulins and cell surface receptors containing immunoglobulin domains, ribonucleases, lactalbumin, insulin, keratin, hemagglutinin, viral membrane proteins, neuroendocrine protein 7B2, epidermal growth factor, androgenic gland hormone, AP-1-like transcription factor YAP1, acetylcholine receptor, dendrotoxins, bone morphogenic protein 2-A, chorionic gonadotropin, histones H3, thrombospondin 1, disintegrin schistatin, snaclec botrocetin, acetylcholinesterase collagenic tail peptide, conglutin delta-2, oxidoreductases, sulfide dehydrogenase, and lysozyme. Standard antibody molecules include four peptide chains, two heavy chains and two light chains. These four peptide chains properly fold together in a functional antibody molecule by forming disulfide bonds between the four chains. The number of disulfide bonds formed within the peptide chains of an antibody molecule varies depending on antibody subtype.

Reduction of the disulfide bonds that internally anchor disulfide bond-containing proteins can occur during manufacturing. This issue was reported for manufacture of immunoglobulins as early as 2010 and has subsequently been observed industry-wide (Hutterer et al., 2013, mAbs, 5:608-613; and Kao et al., 2010, Biotechnol. Bioeng., 107:622-632). Reduction of the inter-chain disulfide bonds results in loss of functional antibody and requires more complex purification processes to remove inactive byproducts (Mun et al., 2014, Biotechnol. Bioeng., 112(4):734-742). During mAb process development, fragments and aggregates have to be removed to adequate levels due to their associated risks with increased immunogenicity and unknown effects on drug efficacy. Further, the presence of these impurities can also affect the stability of the product during storage leading to reduced shelf life.

Fragmentation of proteins or polypeptides can arise from either product instability (Cordoba A. et al., 2005, J. Chrom. B., 818(2):115-21) or proteolytic activity through the host cell proteins (HCP) present in the cells (Gao et al., 2011, Biotechnol. Bioeng. 108(4):977-982), while aggregation can occur at various steps during and after the manufacturing process such as during cell culture, harvest, purification, freeze thaw, vialing and storage. Strategies are often implemented during process development to improve both of these product quality attributes. These include: optimizing bioreactor conditions to prevent fragmentation or aggregate formation during cell culture; optimizing harvest conditions to minimize cell lysis (Hutchinson N. et al., 2006, Biotechnol. Bioeng., 95(3):483-491); incorporating chromatographic polishing steps in the purification process (e.g. ion exchange, hydrophobic interaction, and mixed mode) to separate the impurities from the product of interest; and excipient screening during formulation development to minimize aggregation and fragmentation during the shelf life of the molecule.

Various strategies have been used to mitigate antibody reduction during a manufacturing process, including chilling, providing an oxidative storage environment, holding for shorter periods of time, and adding at least one reduction inhibitor. Previous reports attributed the reduction experienced in cell culture protein manufacturing processes to only the thioredoxin system. These studies used inhibitors for the thioredoxin system at concentrations where they were no longer specific for the thioredoxin system (Kao et al., 2010, Biotechnol. Bioeng., 107:622-632; Kao et al., 2013, U.S. Pat. No. 8,574,869). By using inhibitors for the thioredoxin system at concentrations where they no longer were specific for the thioredoxin system Kao et al. attributed the reduction experienced in cell culture manufacturing processes to only the thioredoxin system and commented on the lack of role for the glutathione reductase system in antibody reduction.

Accordingly, there is a need to avoid reduction of disulfide bonds during manufacture or storage of disulfide bond-containing proteins. Avoiding reduction of disulfide bond-containing proteins during manufacture can result in increased stability of the intact protein throughout its shelf life. Thus, there is a need to develop manufacturing processes for disulfide bond-containing proteins that can avoid reduction of the disulfide bonds and result in increased stability of the intact protein throughout its shelf life.

SUMMARY

This disclosure relates to methods for preventing reduction of disulfide bonds in disulfide bond-containing proteins to increase stability of the intact protein throughout its shelf life. The methods improve stability of purified disulfide bond-containing proteins by mitigating reduction of the disulfide bond-containing protein or by mitigating reduction potential of the disulfide bond-containing protein during the manufacturing process.

In an embodiment, the disclosure relates to a method for increasing the yield of an intact disulfide bond-containing protein of interest in a cell culture or solution, comprising manufacturing the disulfide bond-containing protein of interest in the presence of a glutathione reductase inhibitor, a thioredoxin reductase inhibitor, or both a glutathione reductase inhibitor and a thioredoxin reductase inhibitor, whereby the amount of intact disulfide bond-containing protein is higher in the cell culture or solution manufactured in the presence of a glutathione reductase inhibitor, a thioredoxin reductase inhibitor, or a glutathione reductase inhibitor and a thioredoxin reductase inhibitor.

In certain embodiments, the disclosure relates to a method for increasing the yield of an intact disulfide bond-containing protein of interest in a manufacturing process, comprising: detecting the presence of glutathione reductase and/or thioredoxin reductase in the culture and or solution containing the disulfide bond-containing protein of interest, and adding a glutathione reductase and/or thioredoxin reductase inhibitor to mitigate reduction of the disulfide bond-containing protein of interest. In certain embodiments, the disclosure relates to a method further comprising determining the activity of the glutathione reductase and/or thioredoxin reductase detected. In further embodiments, determining the activity of the glutathione reductase and/or thioredoxin reductase comprises adding 5,5'-dithio-bis(2-nitrobenzoic acid) (DTNB) to a sample obtained during the manufacturing process; adding at least one of thioredoxin reductase inhibitor and glutathione reductase inhibitor to a portion of the sample containing DTNB; and monitoring reduction of DTNB at a wavelength of 412 nm in the sample; wherein a higher reduction of DTNB in the samples without at least one of thioredoxin reductase inhibitor and glutathione reductase inhibitor, indicates activity of thioredoxin reductase and/or glutathione reductase. In certain embodiments, NADPH, oxidized glutathione, and buffer are added to the sample prior to monitoring reduction.

In an embodiment, this disclosure relates to a method for increasing the yield of an intact disulfide bond-containing protein of interest or diminishing the reduction potential of the disulfide containing protein of interest in a cell culture or fermentation process by maintaining the extracellular cystine levels above 0 during the process. In certain aspects, the intact protein of interest is released into the cell culture fluid (CCF). In certain aspects, the process comprises maintaining the cells in CCF for at least 2 days, at least 8 days, at least 10 days, at least 12 days, at least 14 days, or at least 16 days.

In certain aspects of the disclosure, the cell culture process is a mammalian or insect cell culture process, and the fermentation process is a bacterial, yeast, or fungi fermentation process. In certain aspects of the methods disclosed, the cystine levels are maintained in the cell culture or fermentation process above 0 to prevent disulfide bond reduction. In certain aspects, in the methods disclosed, the potential for disulfide bond reduction is decreased relative to a process in which an effective amount of cystine is not maintained above 0 in the CCF.

In an embodiment, the disclosure relates to a method for improving the stability of a purified disulfide bond-containing protein of interest, comprising using a manufacturing process that maintains the disulfide bond-containing protein of interest in a form with minimal free thiols, thereby mitigating reduction or reduction potential of the disulfide bond-containing protein of interest during the manufacturing process. In some embodiments of the disclosure, the manufacturing process comprises a cell culture phase, a harvest phase, at least one hold phase, a purification phase, or any combination thereof. In some embodiments of the disclosure, the hold phase comprises storing the material in any of the phases during the manufacturing process. In some embodiments of the disclosure, the hold phase comprises storing harvested cell culture fluid (HCCF) for a period of up to one hour, up to one day, at least four days, at least one week, at least 10 days, at least two weeks, at least one month, or at least three months following the harvest phase and prior to the purification phase. In some embodiments of the disclosure, minimizing free thiols in the disulfide bond-containing protein of interest comprises mitigating disulfide bond reduction throughout the manufacturing process. In some embodiments of the disclosure, the HCCF is stored at 2-8° C. in airtight bags during the hold phase.

BRIEF DESCRIPTION OF THE DRAWINGS/FIGURES

FIG. 1: Schematic representing the enzymes and chemical intermediates of the thioredoxin system and the glutathione system. Trx is thioredoxin, GSH is reduced glutathione, GSSG is oxidized glutathione, L is immunoglobulin light chain, H is immunoglobulin heavy chain, and NADPH is reduced nicotinamide adenine dinucleotide phosphate.

Figure 2A:
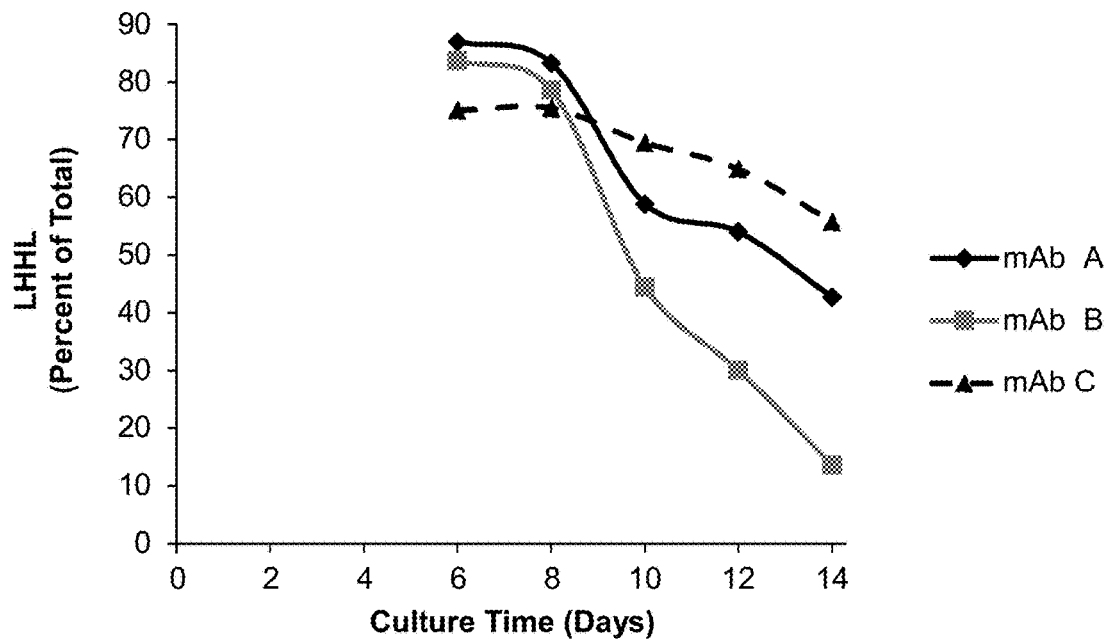
Figure 2B:
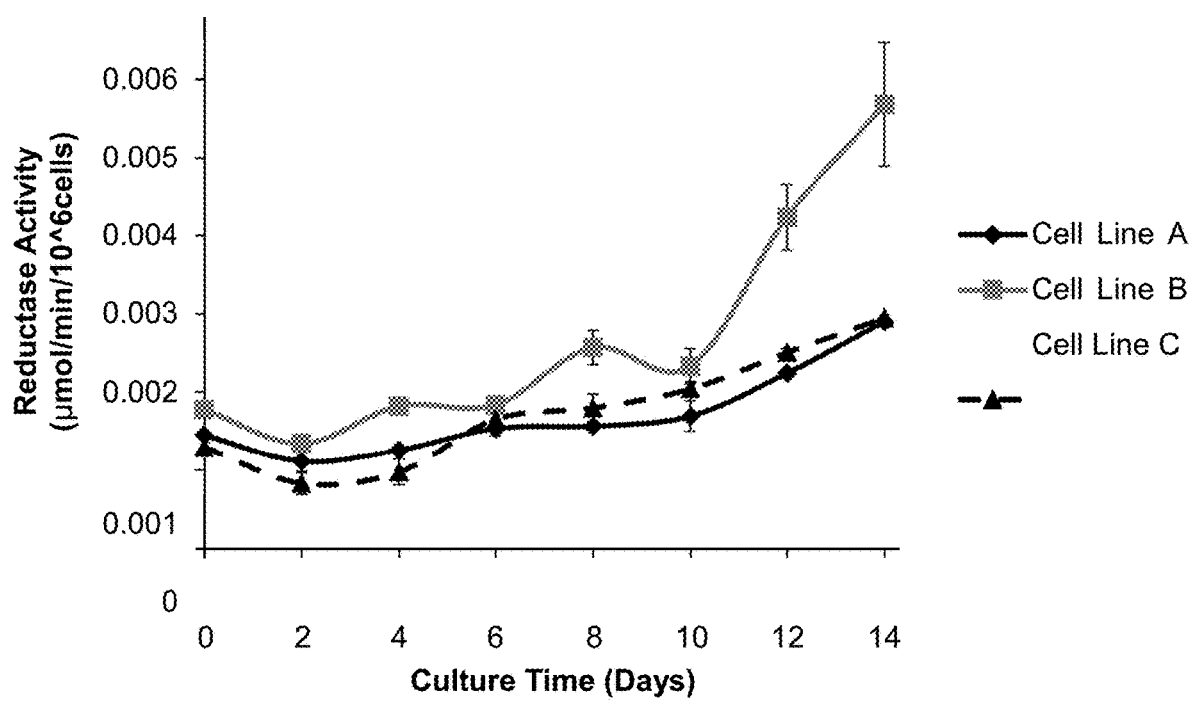

FIG. 2A and FIG. 2B: Reduction in Cell Culture. FIG. 2A Depicts a time course of the percent intact (non-reduced) antibody in supernatant samples from small scale production reactors of mAb A (diamonds), mAb B (squares), and mAb C (triangles), which were evaluated using capillary electrophoresis. FIG. 2B Depicts a time course of the total reductase activity measured in samples from the same small scale reactors, determined using a colorimetric assay based on the reduction of 5,5'-dithio-bis(2-nitrobenzoic acid) (DTNB). Data represents the mean±SD of triplicate experiments.

Figure 3A:
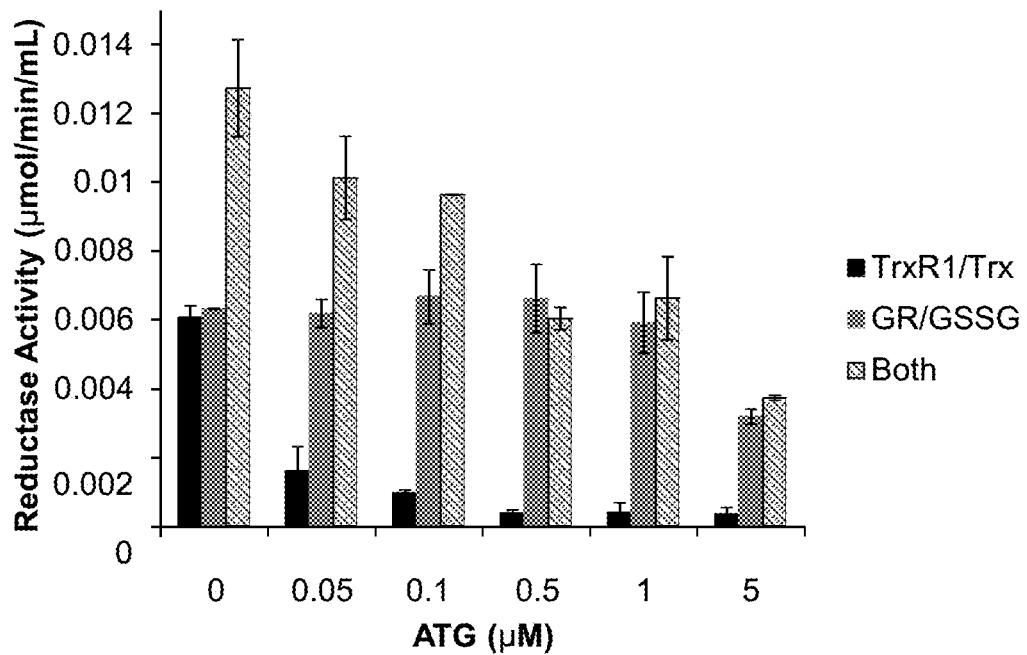
Figure 3B:
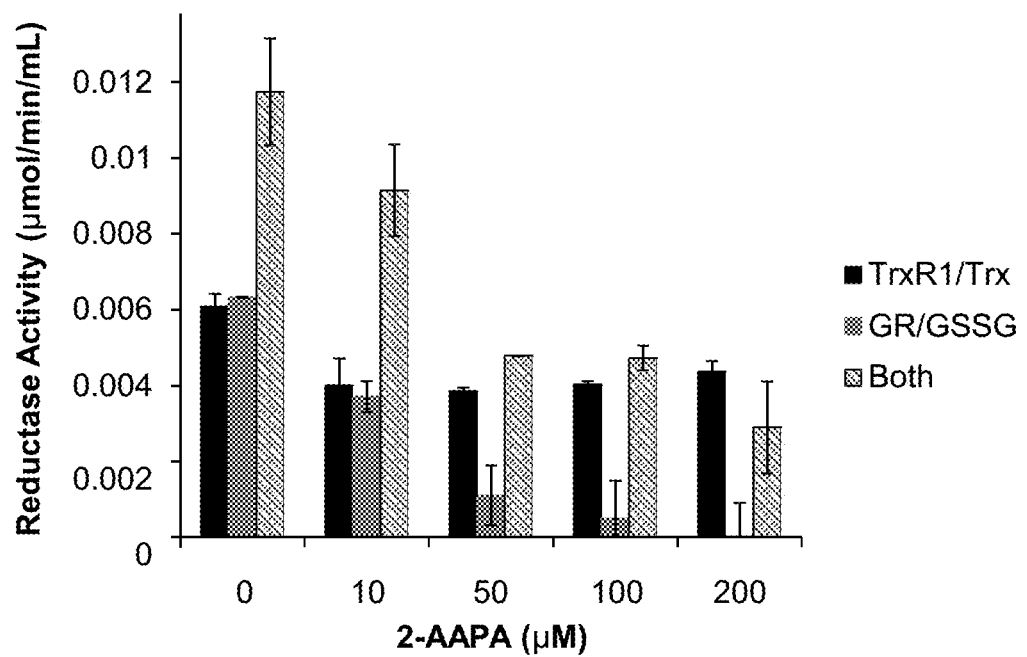

FIG. 3A and FIG. 3B: Effect of Specific Reductase Inhibitors on reductase activity as determined using a colorimetric assay based on the reduction of DTNB. FIG. 3A: Addition of aurothioglucose (ATG), a thioredoxin reductase inhibitor, to solutions of recombinant TrxR1/Trx1 (black bars), GR/GSSG (gray bars), or TrxR1/Trx1 with GR/GSSG (hashed bars) FIG. 3B: Addition of 2-Acetylamino-3-[4-(2-acetylamino-2-carboxyethylsulfanylthiocarbonyl-amino)phenylthiocarbamoylsulfanyl]propionic acid (2-AAPA), a glutathione reductase inhibitor, to solutions of recombinant TrxR1/Trx1 (black bars), GR/GSSG (gray bars), or TrxR1/Trx1 with GR/GSSG (hashed bars). Data represents the mean±SD of triplicate experiments.

Figure 4A:
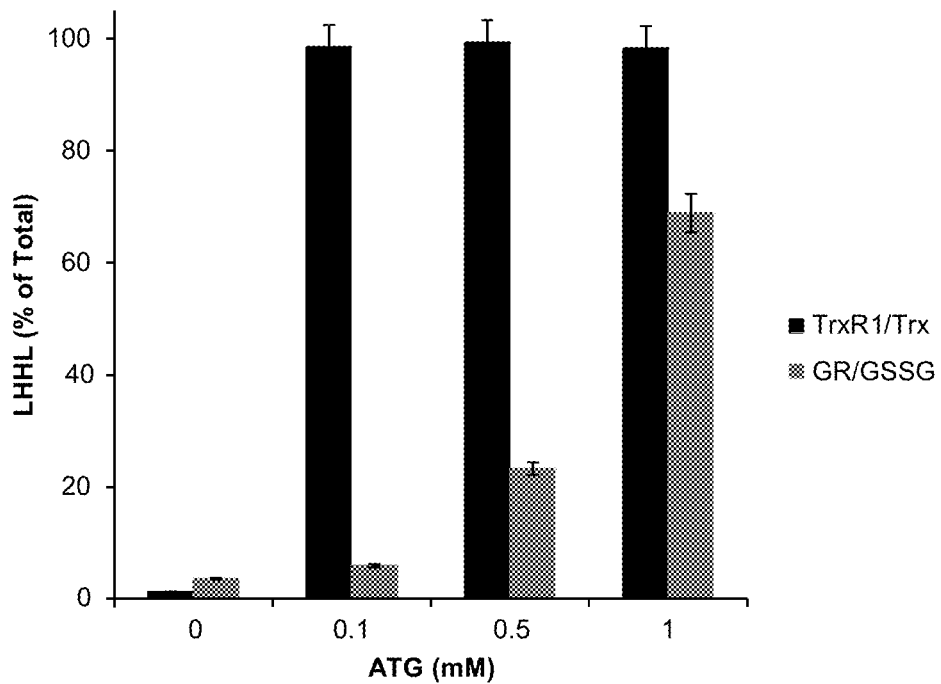
Figure 4B:
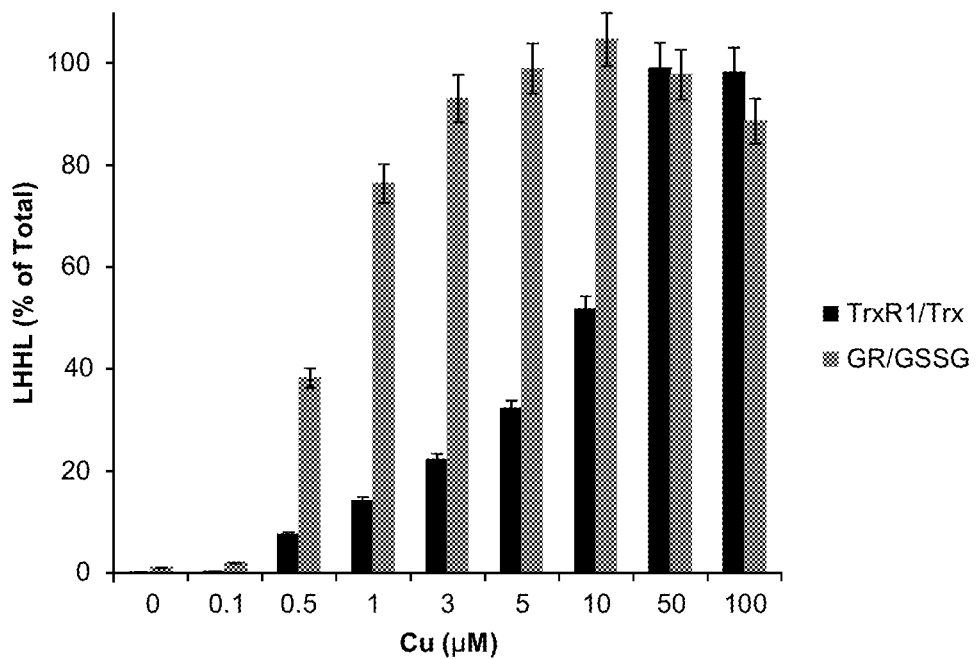

FIG. 4A and FIG. 4B: Impact of Specific Reductase Inhibitors on Antibody Reduction. FIG. 4A: Percent of intact (non-reduced) antibody obtained after adding increasing concentrations of ATG to solutions of purified mAb B with TrxR1/Trx1 (black bars) or GR/GSSG (gray bars) and incubating overnight at room temperature. FIG. 4B: Percent of intact (non-reduced) antibody after adding increased concentrations of $Cu^{2+}$ to solutions of purified mAb B with TrxR1/Trx1 (black bars) or GR/GSSG (gray bars) and incubating overnight at room temperature. Data represents the mean±SD of duplicate experiments.

Figure 5A:
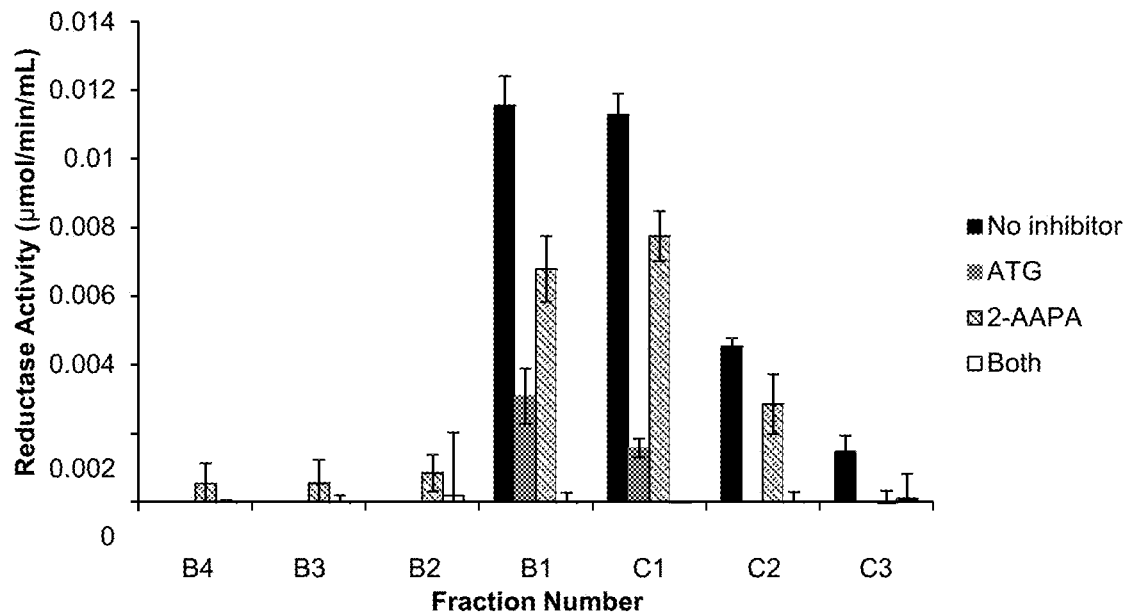
Figure 5B:
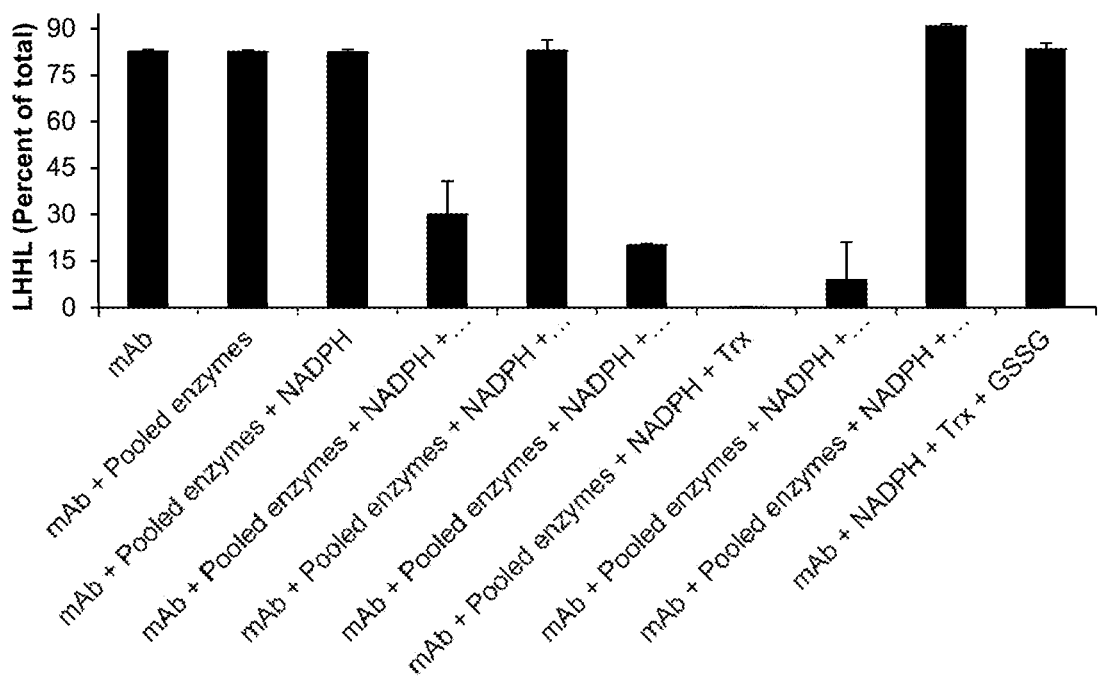

FIG. 5A and FIG. 5B: Sensitivity of CHO Reductases to Identified Inhibitors. FIG. 5A: TrxR1 and GR reductase activity of collected fractions evaluated using no inhibitor (black bars); 0.5 µM ATG (gray bars); 100 µM 2-AAPA (hashed bars); and both 0.5 µM ATG and 100 µM 2-AAPA (white bars). FIG. 5B: Percent of total intact mAb B after an overnight incubation with different combinations of pooled fractions of active TrxR1 and GR, 0.4 mM NADPH, 1 mM GSSG, 3 µM $Cu^{2+}$, Trx1, and 100 µM ATG. Data represents the mean±SD of duplicate experiments.

Figure 6A:
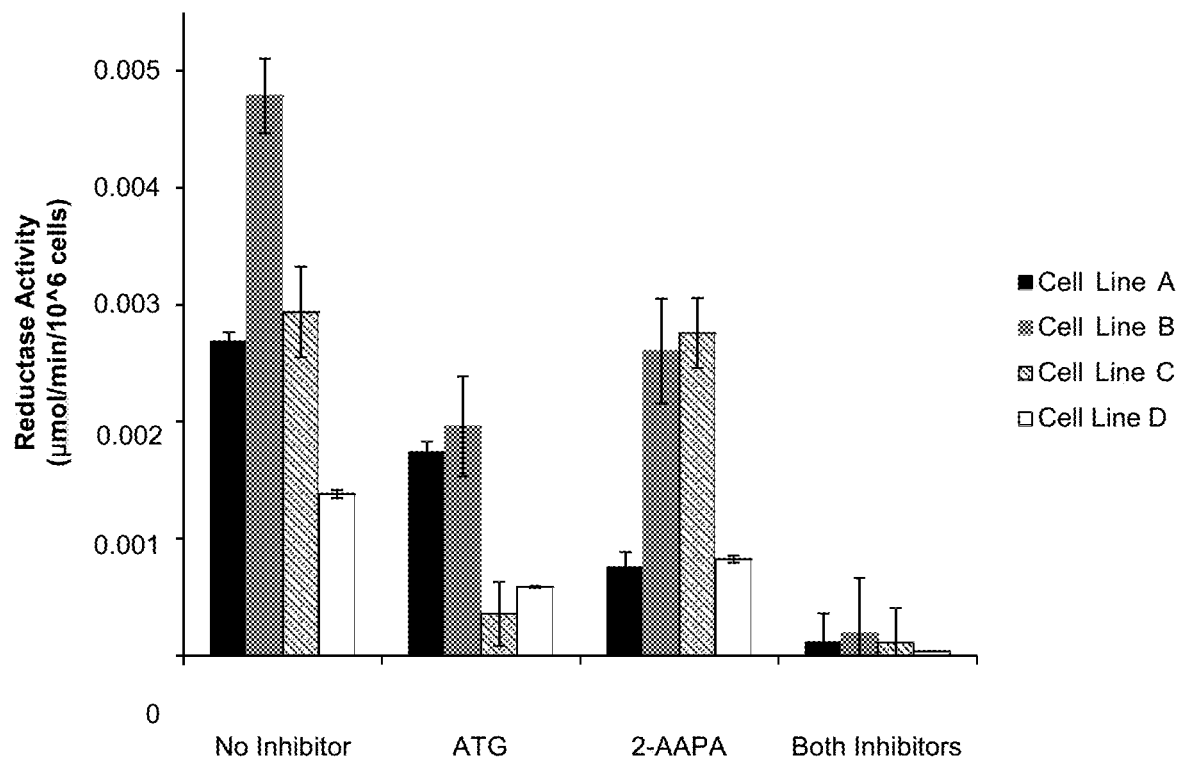
Figure 6B:
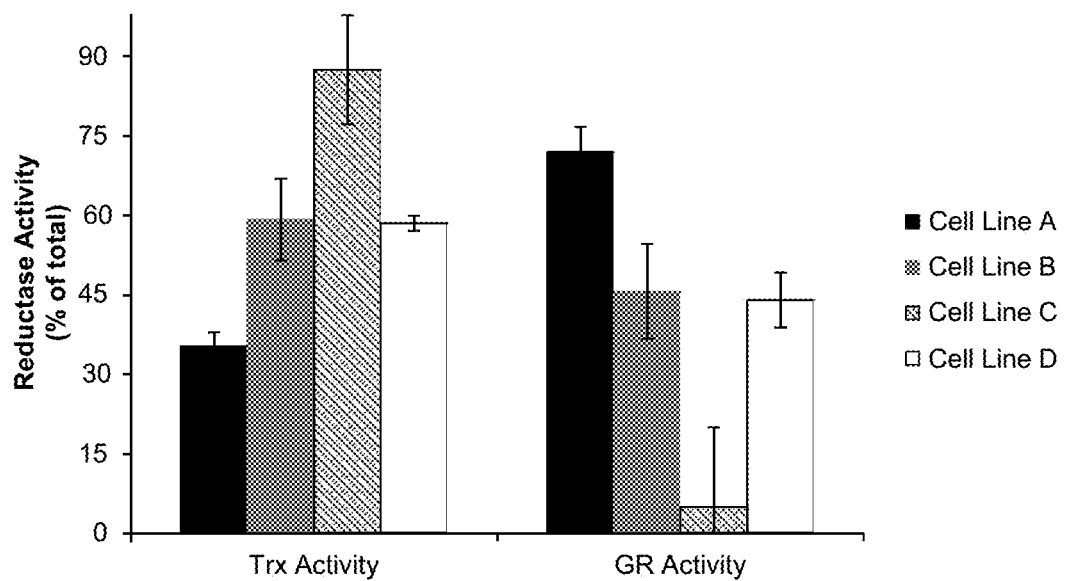

FIG. 6A and FIG. 6B: Cell Culture Activity of the Thioredoxin and Glutathione Systems. FIG. 6A: Reductase activity of day 14 samples from small scale production reactors of mAb A (black bars), mAb B (gray bars), mAb C (hashed bars), and mAb D (white bars) in the presence of 0.5 µM ATG, 100 µM 2-AAPA, and both 0.5 µM ATG and 100 µM 2-AAPA. FIG. 6B: Percent of total Trx or GR reductase activity in samples from day 14 samples from small scale production reactors of mAb A (black bars), mAb B (gray bars), mAb C (hashed bars), and mAb D (white bars). Data represents the mean±SD of triplicate experiments.

Figure 7:
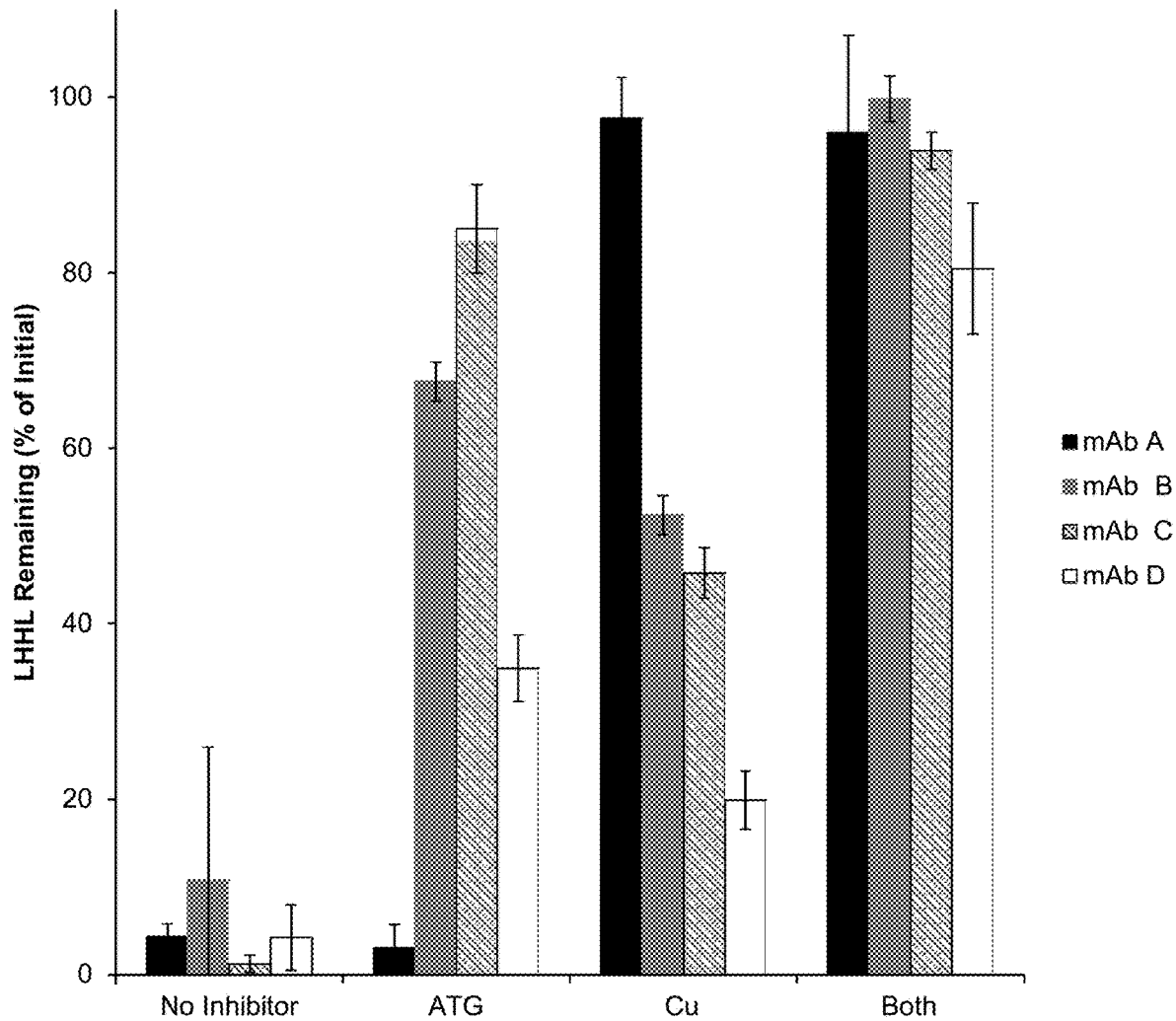

FIG. 7: Percent of intact (non-reduced) antibody remaining in day 14 cell culture samples from small scale bioreactors of mAb A (black bars), mAb B (gray bars), mAb C (hashed bars), and mAb D (light gray bars) spiked with 0.1 mM ATG, 3 µM $Cu^{2+}$, or both 0.1 mM ATG and 3 µM $Cu^{2+}$. Data represents the mean±SD of duplicate experiments.

Figure 8:
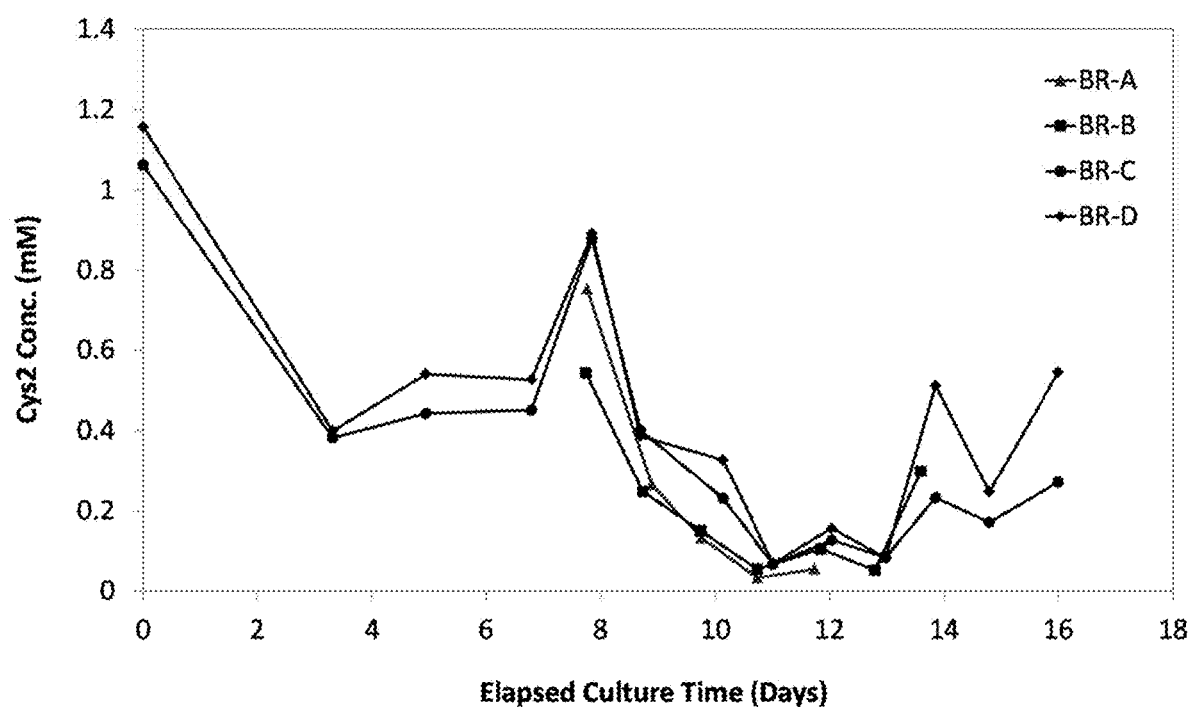

FIG. 8: Time course of cysteine/cystine concentration in the production bioreactor runs BR-A, BR-B, BR-C, and BR-D, measured using ultra-performance liquid chromatography (UPLC) amino acid analysis.

Figure 9A:
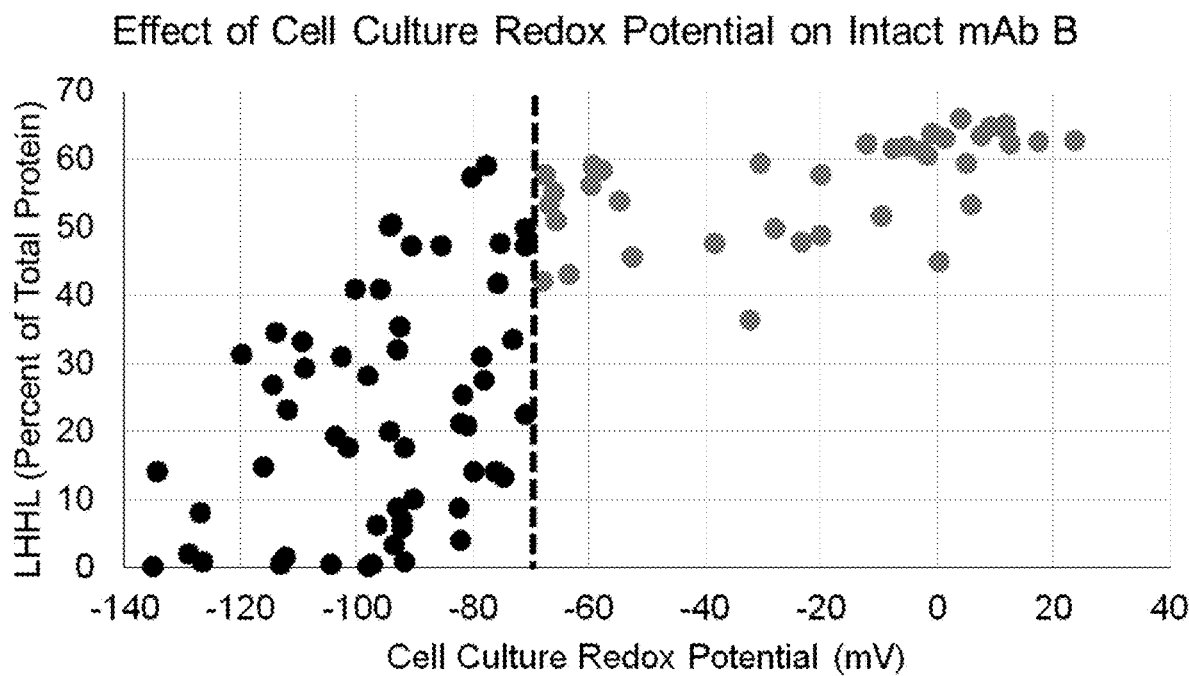
Figure 9B:
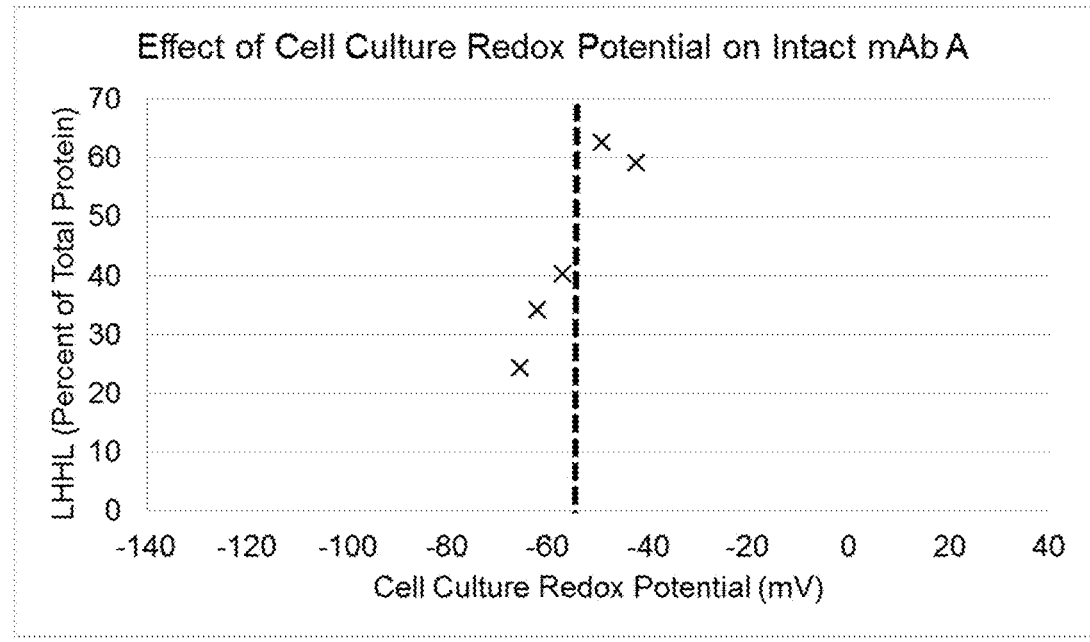

FIG. 9: The amount of intact mAb B (LHHL) (FIG. 9A) and intact mAb A (LHHL) (FIG. 9B) was measured via capillary electrophoresis from unpurified cell culture samples. Note, the amount of intact antibody is never 100% as these were measured in unpurified cell culture samples. Above a threshold cell culture redox potential, indicated with a dashed black line there is minimal reduction of the interchain disulfide bonds. The conditions in FIG. 9 had the following final concentrations (at harvest) of: $Zn^{2+}$ concentration ranged from 0.6-19.6 PPM, $Mn^{2+}$ concentration ranged from 0.007-5.5 ppm, $Fe^{3+}$ concentration ranged from 0.12-4.2 ppm, $Se^{2+}$ concentration ranged from 0.006-7.9 ppm, $Cu^{2+}$ concentration ranged from 0.3-6.4 ppm, Cystine concentration ranged from –0-3.5 mM, dissolved oxygen concentration ranged from 20-75% of air saturation, beta mercaptoethanol concentration ranged from 83-206 µM and glutathione concentration ranged from 1-750 µM.

Figure 10:
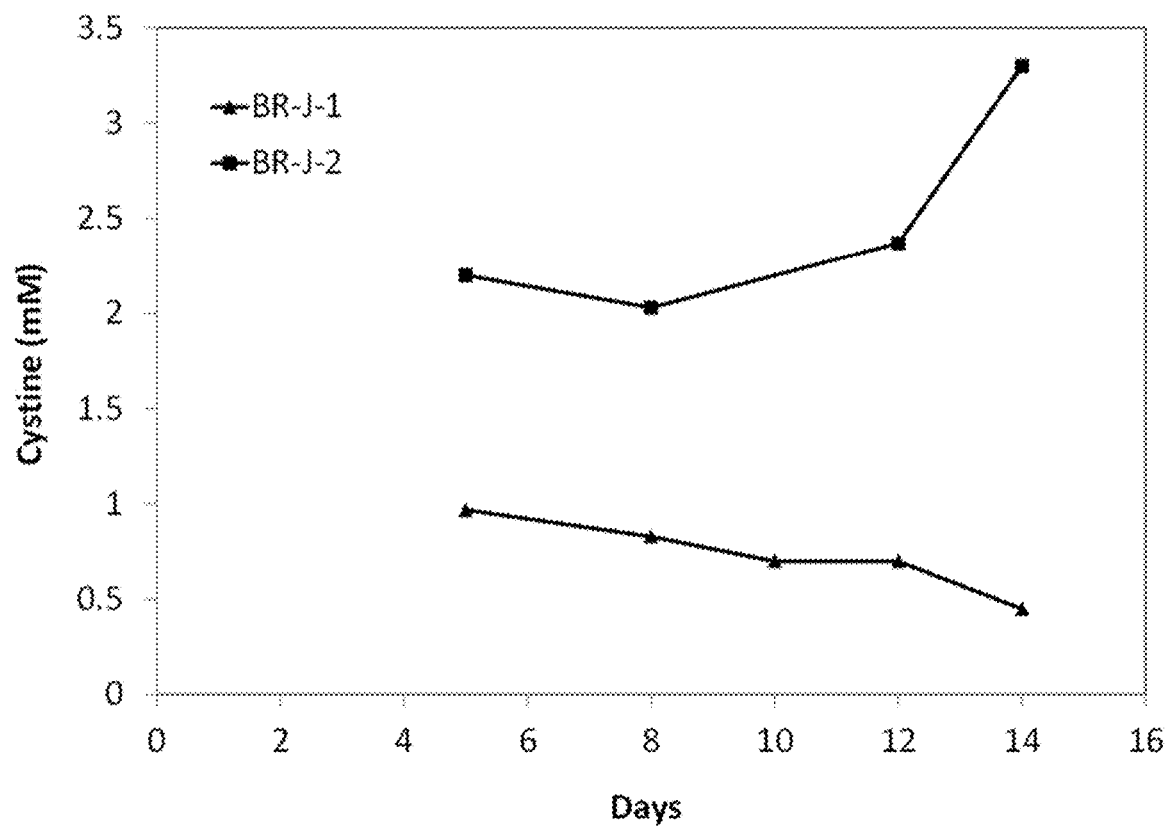

FIG. 10: Time course of Bioreactor cystine concentrations measured by UPLC-amino acid analysis for conditions with (BR-J2) and without increased nutrient feed BR-J1).

Figure 11:
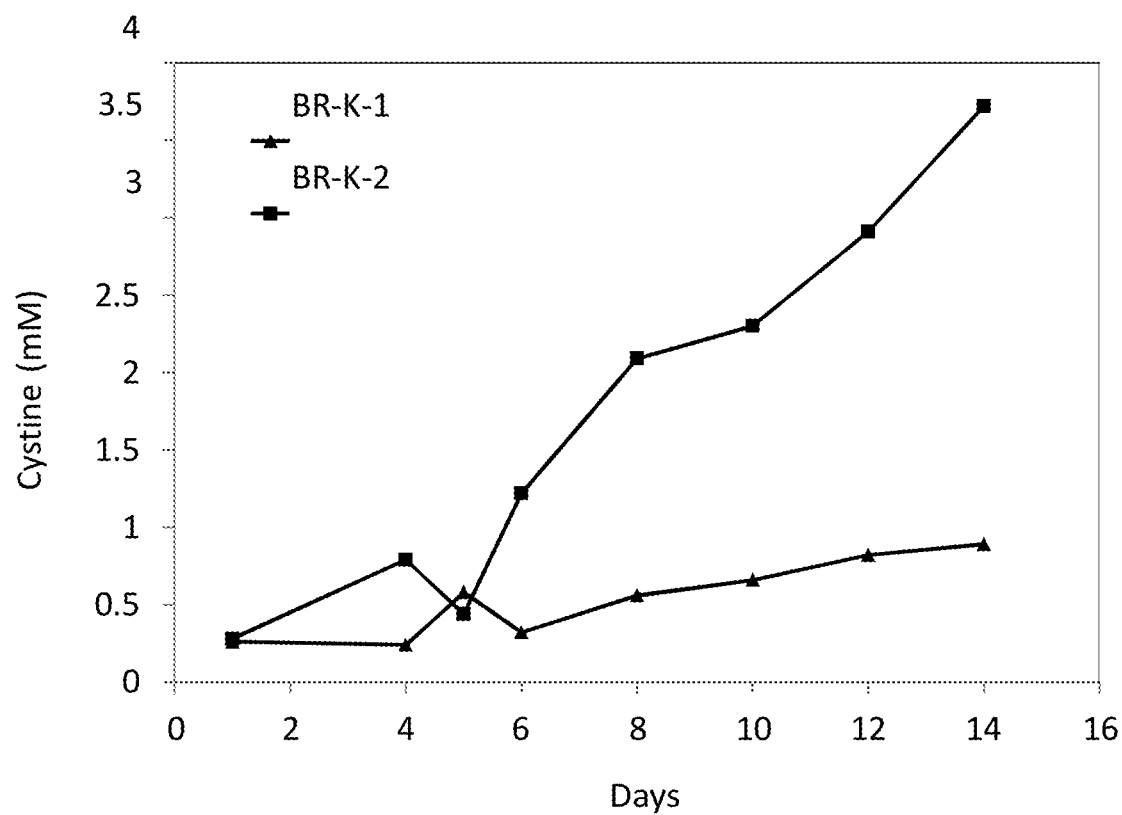

FIG. 11: Time course cystine concentrations measured by UPLC-amino acid analysis of BR-K bioreactor for conditions with (BR-K-2) and without increased nutrient feed (BR-K-1).

Figure 12A:
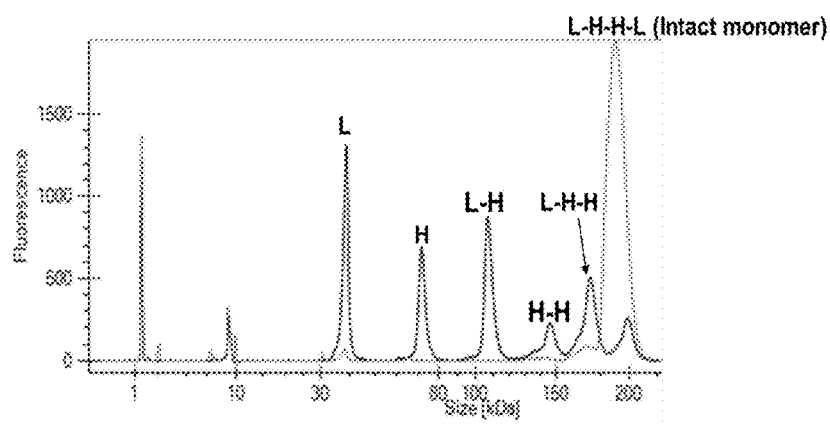
Figure 12B:
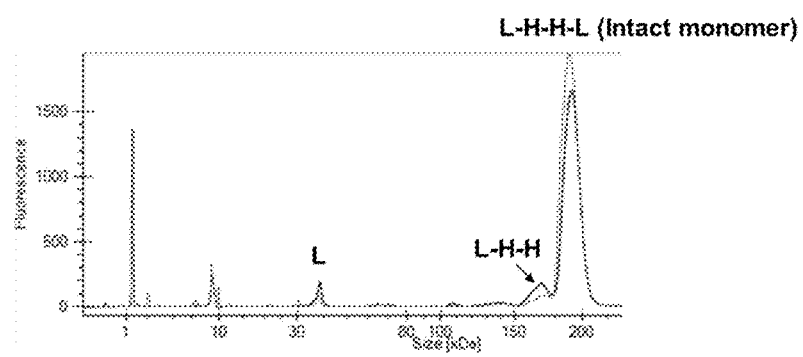
Figure 12C:
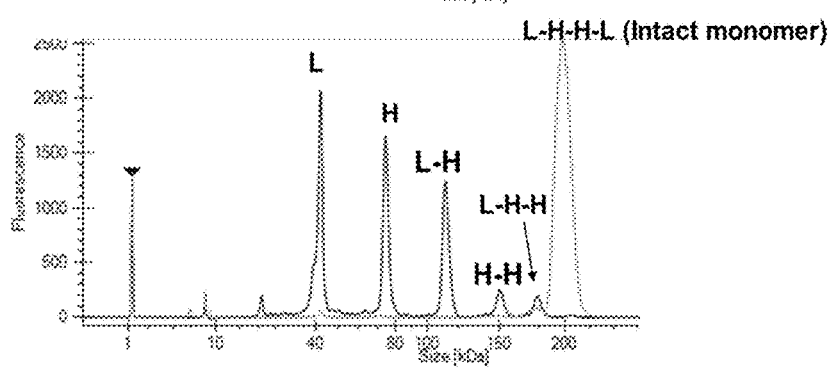

FIG. 12A to FIG. 12C: Non-Reduced GX (NR-GX) electropherograms of harvested cell culture fluid (HCCF) (FIG. 12A); Capture product (FIG. 12B); and Final polishing product (FIG. 11C). Grey trace: Reference standard; Black Trace: sample.

Figure 13:
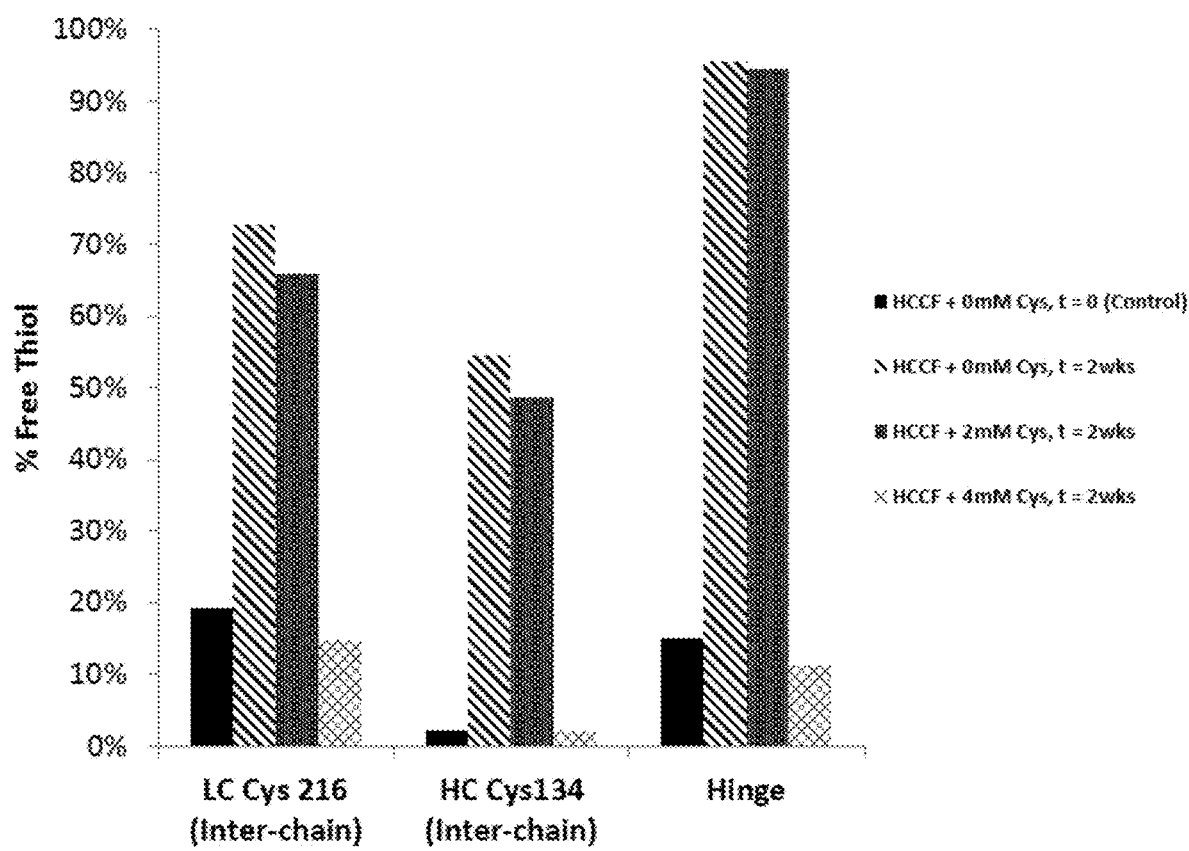

FIG. 13: Percent of free thiol obtained from mass spectrometry quantification of HCCF held for 2 weeks in the absence of cystine, or the presence of 2 mM cystine, and 4 mM cystine in the locations of the molecule where reduction occurred.

Figure 14A:
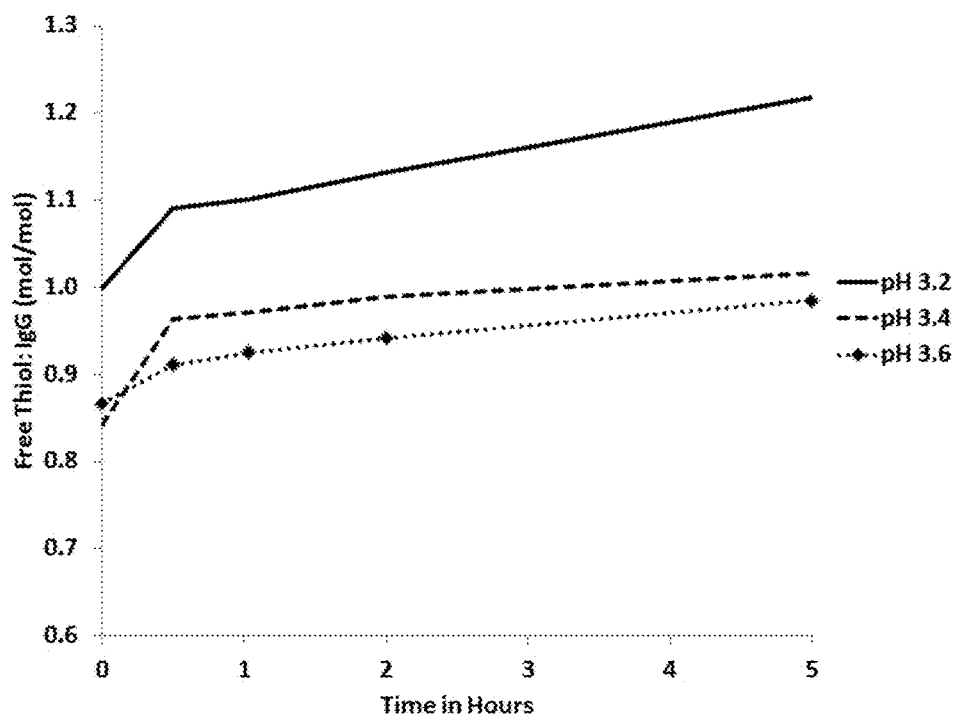
Figure 14B:
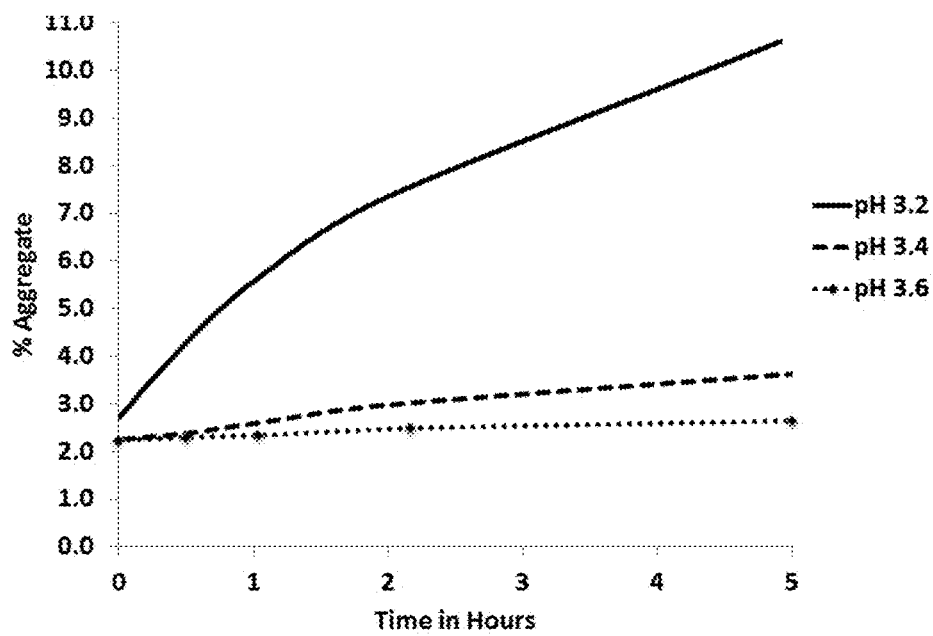

FIG. 14A and FIG. 14B: Changes in free thiol and aggregation ratio with changing pH. FIG. 14A Change of the ratio of free thiol to IgG concentration with time when the HCCF is incubated at pH 3.2, pH 3.4, and pH 3.6. FIG. 14B: Change in aggregate with time when HCCF is incubated at pH 3.2, pH 3.4, and pH 3.6.

Figure 15:
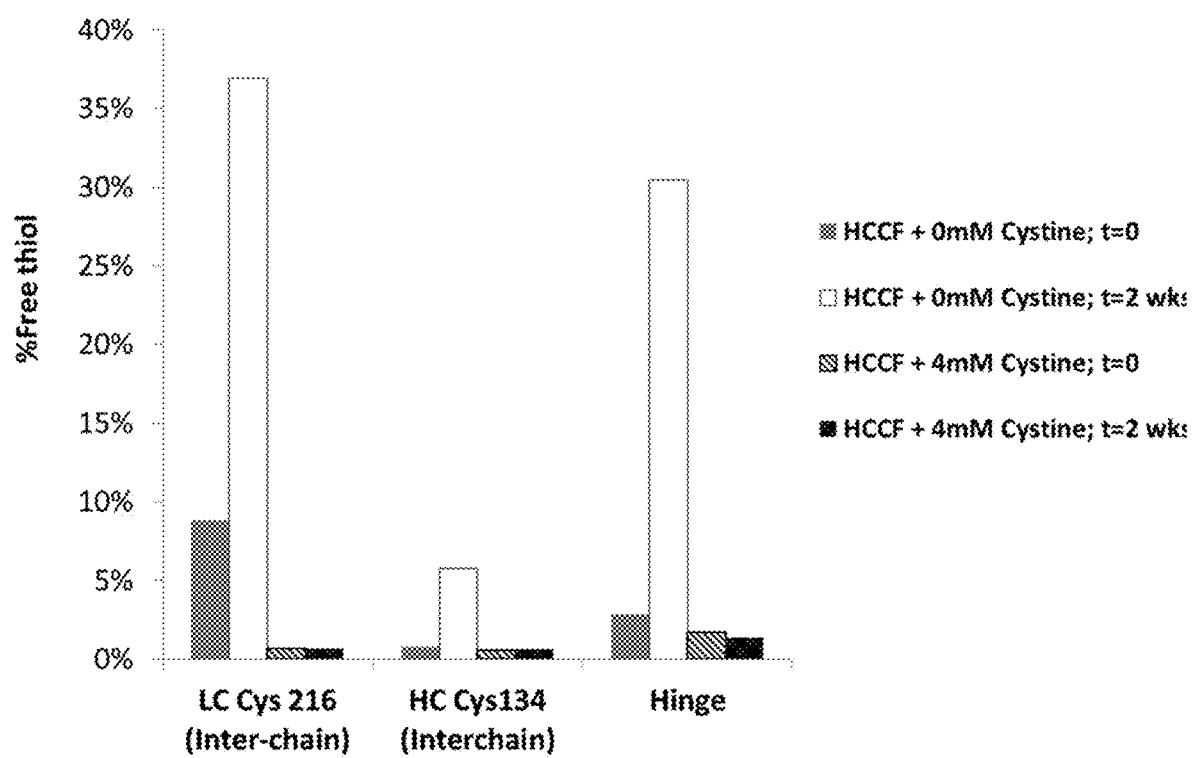

FIG. 15: Percent of inter-chain free thiol levels obtained by spectrometry quantification of HCCF across a 2 week hold in the presence of no cystine (0 mM) and 4 mM cystine.

Figure 16:
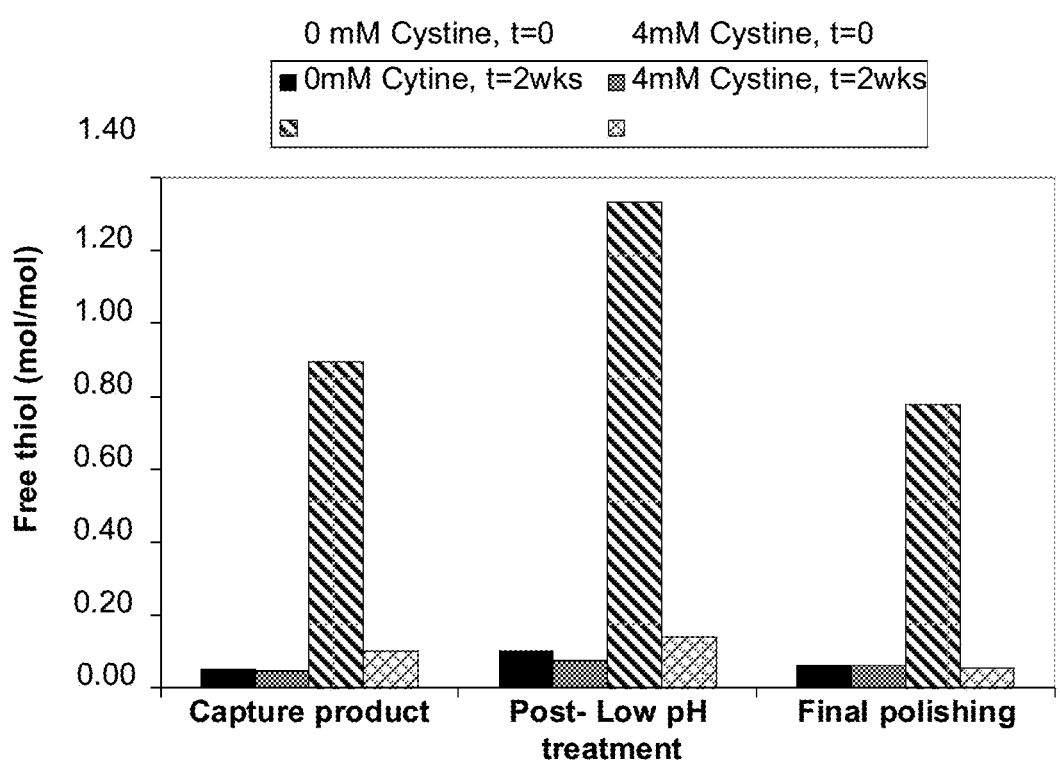

FIG. 16: Free thiol levels obtained by DNTB quantification of purification process intermediates generated from HCCF purified immediately, or held for two weeks in the presence of no cystine (0 mM) and 4 mM cystine.

Figure 17A:
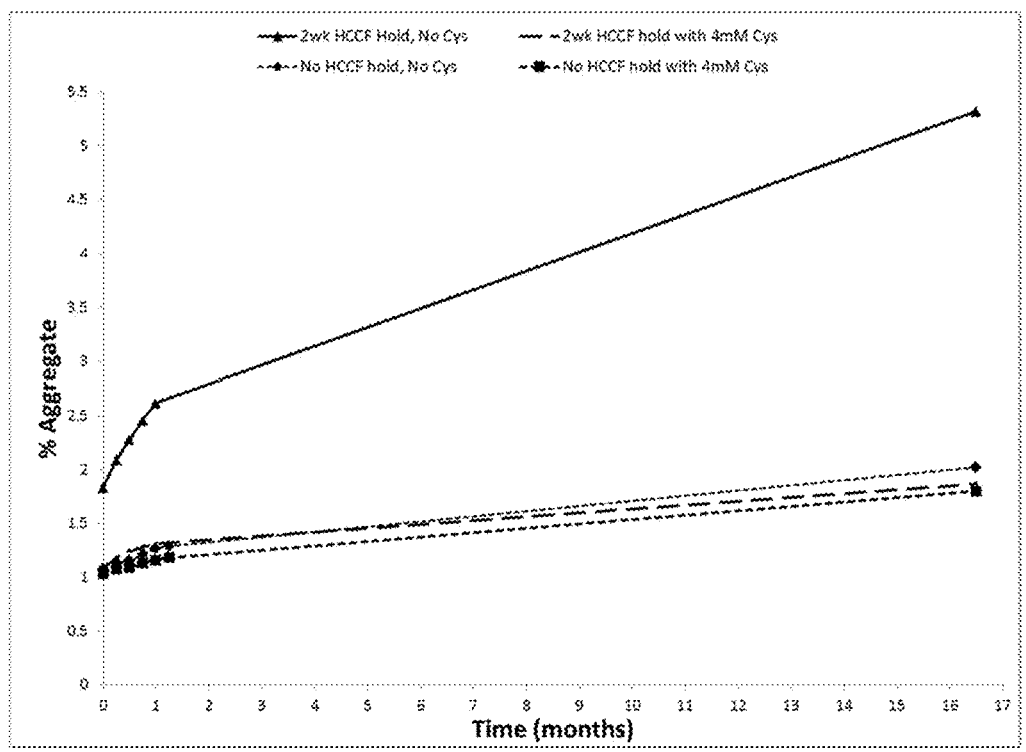
Figure 17B:
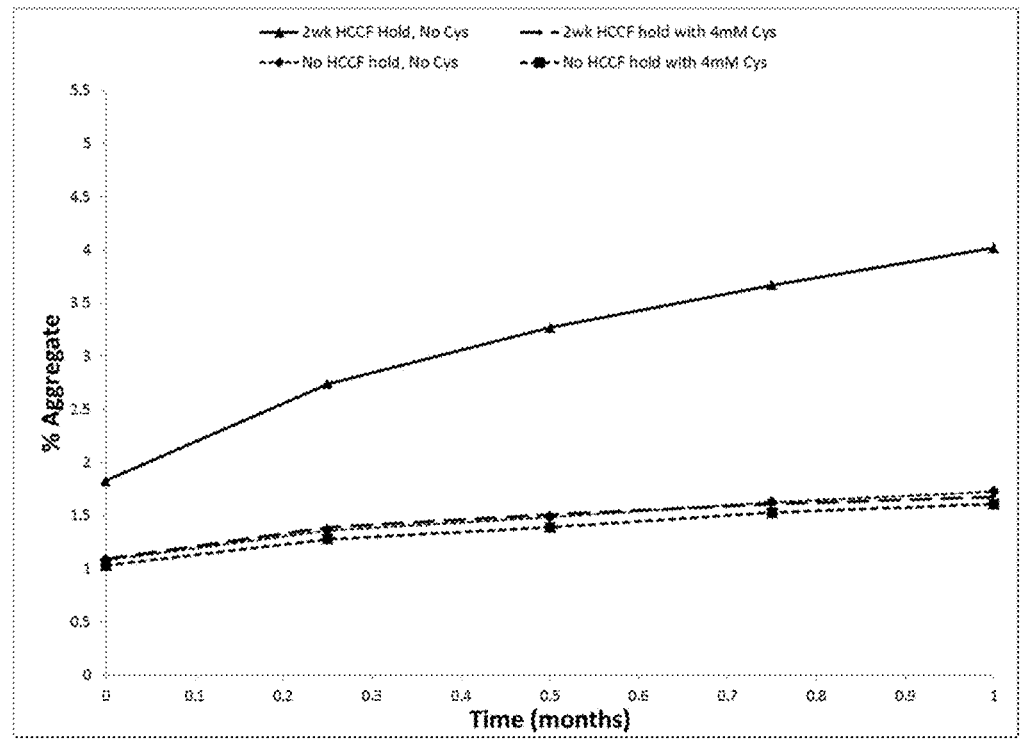
Figure 17C:
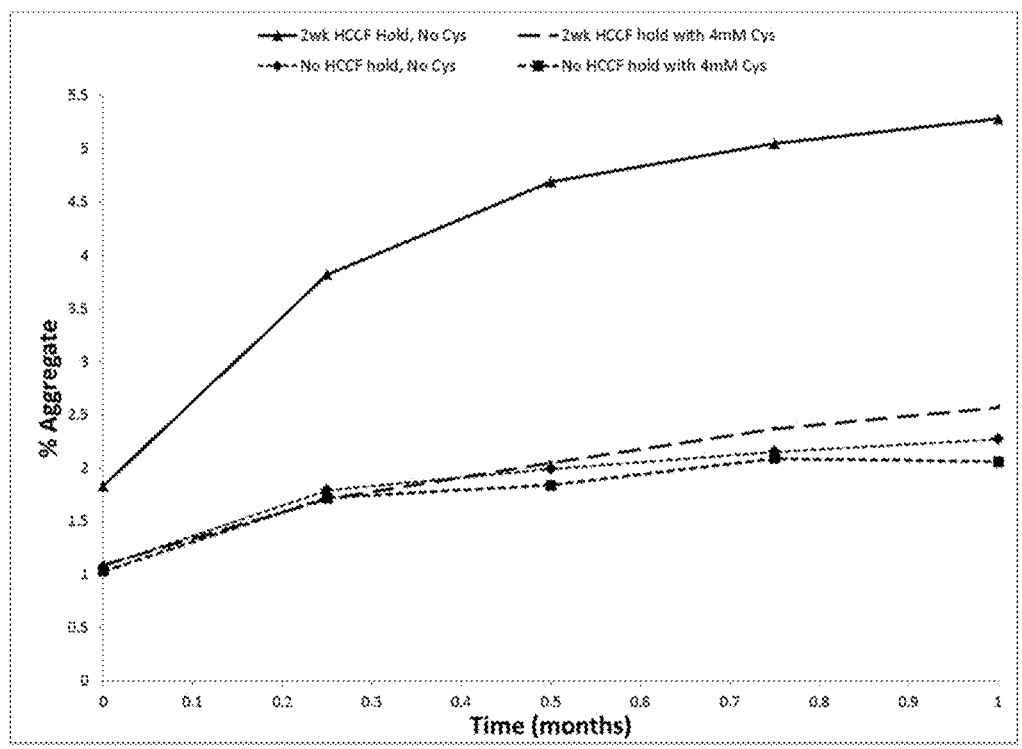

FIG. 17A to FIG. 17C: Change in percent aggregate levels over time for formulated bulk product generated from HCCF. FIG. 17A: Formulated bulk product generated from HCCF that was held at 2-8° C. for 2 weeks in the absence of cystine (0 mM) or in the presence of 4 mM cystine. FIG. 17B: Formulated bulk product generated from HCCF that was held at 25° C. for 2 weeks in the absence of cystine (0 mM) or in the presence of 4 mM cystine. FIG. 17C: Formulated bulk product generated from HCCF that was held at 40° C. for 2 weeks in the absence of cystine (0 mM) or in the presence of 4 mM cystine.

Figure 18A:
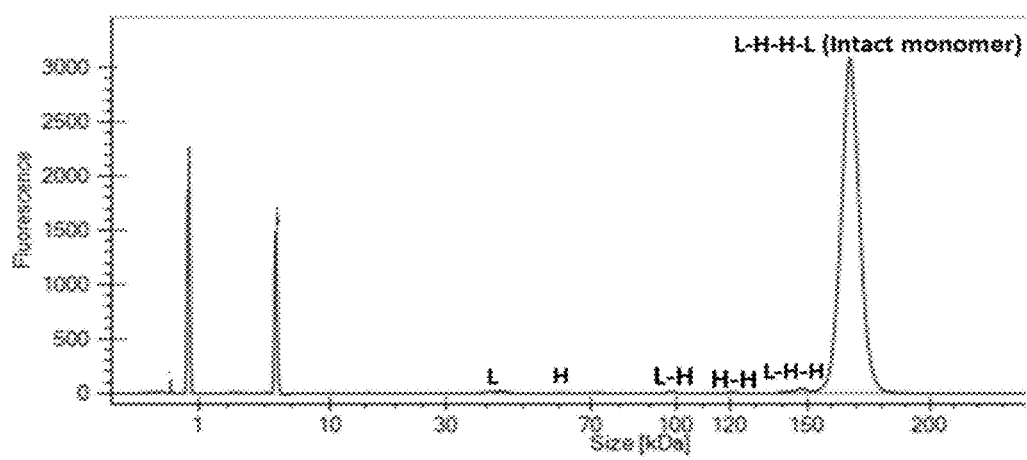
Figure 18B:
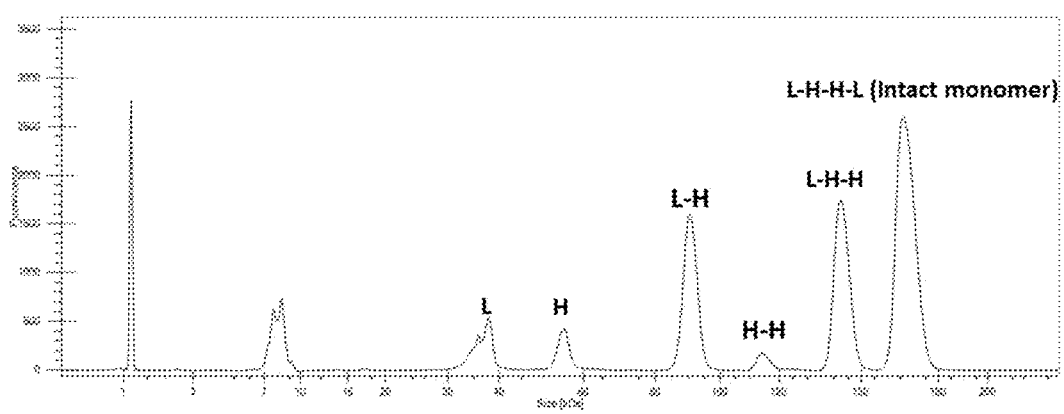
Figure 18C:
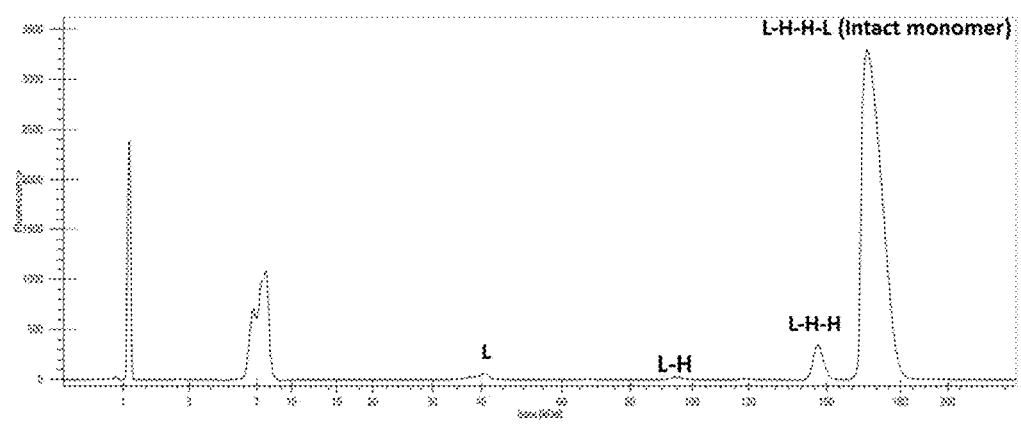

FIG. 18A to FIG. 18C: Non-Reduced GX (NR-GX) electropherograms of Protein A capture productS purified from BRX-L-1 (FIG. 18A), BRX-L-2 (FIG. 18B) BRX-L-3 (FIG. 18C)

Figure 19:
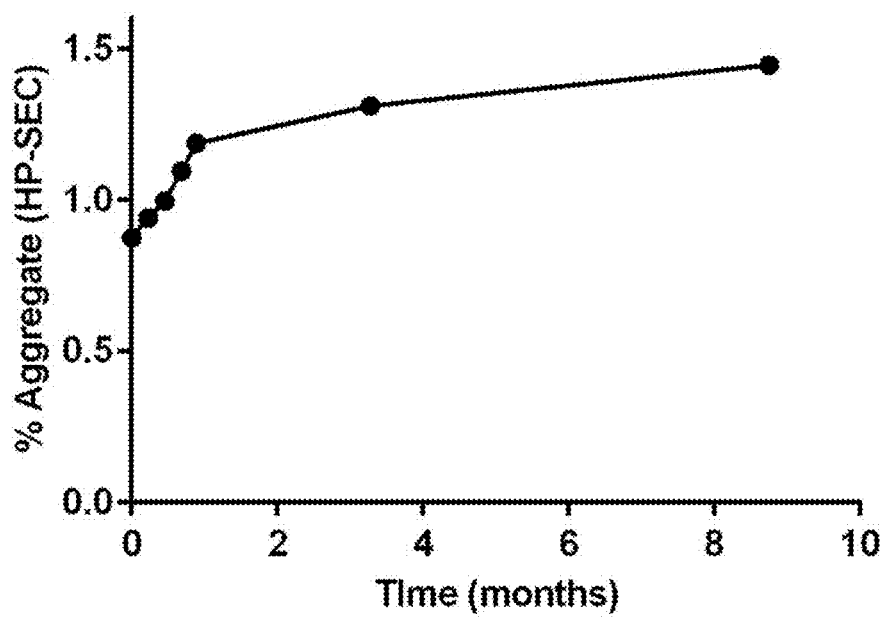

FIG. 19: Time course of percent aggregate at 2-8° C. of mAb A drug substance generated from 14 day fed-batch process.

Figure 20:
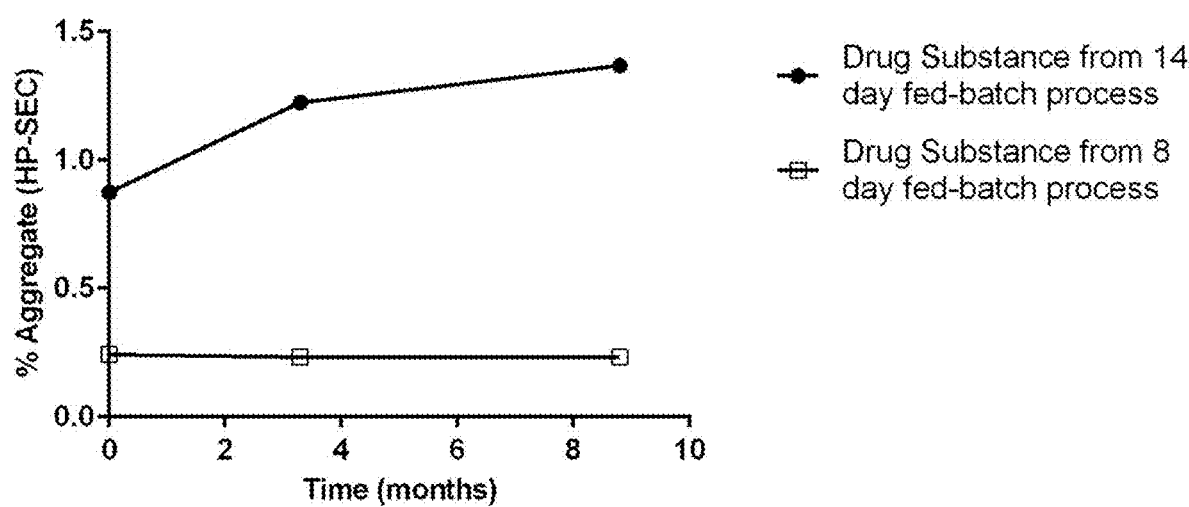

FIG. 20: Time course of percent aggregate at 2-8° C. of mAb A drug substance generated from 14 day or 8 day fed batch process.

Figure 21A:
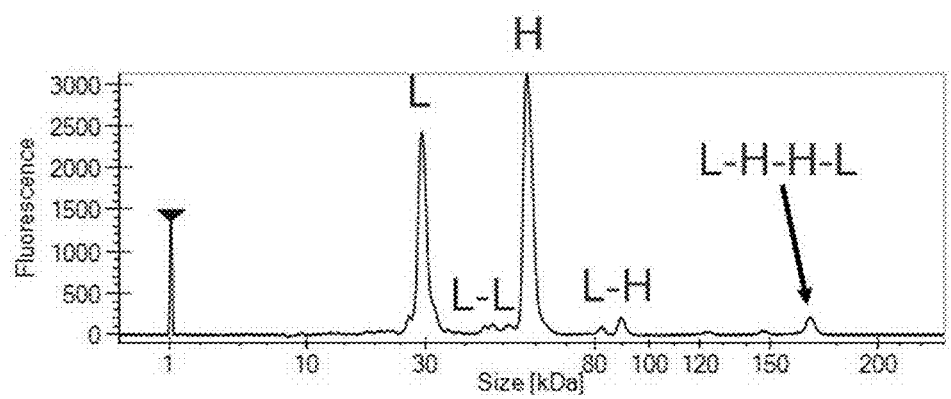
Figure 21B:
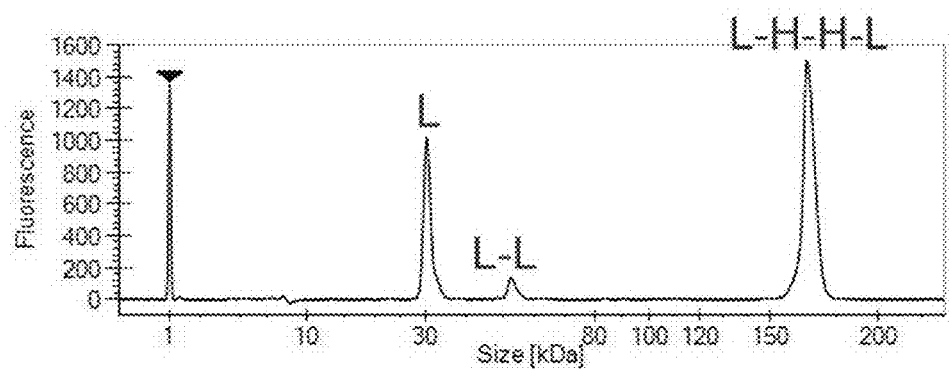
Figure 21C:
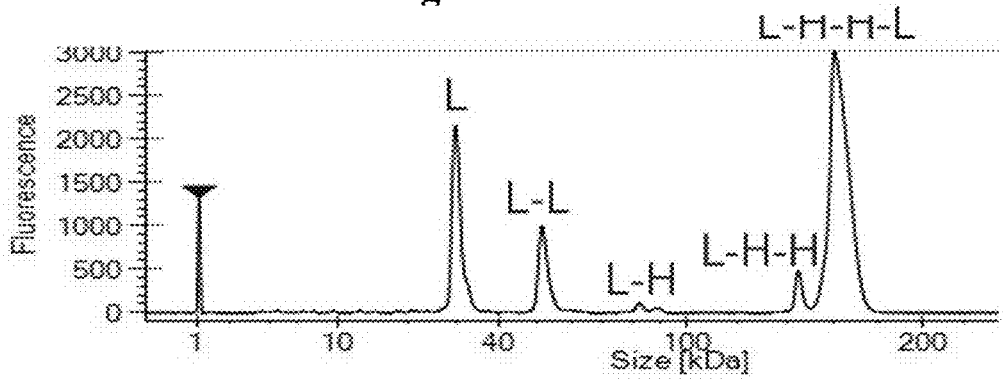

FIG. 21A to FIG. 21C: Electropherograms from non-reduced (NR) GXII analysis of end of run cell culture sample exposed to reduction potential analysis. FIG. 21A: Cell culture sample from 14 day fed-batch process. FIG. 21B: Cell culture sample from 8 day fed-batch process. FIG. 21C: Cell culture sample from a 14 day fed-batch process with additional copper and cystine. L=Light Chain; H=Heavy Chain.

Figure 22:
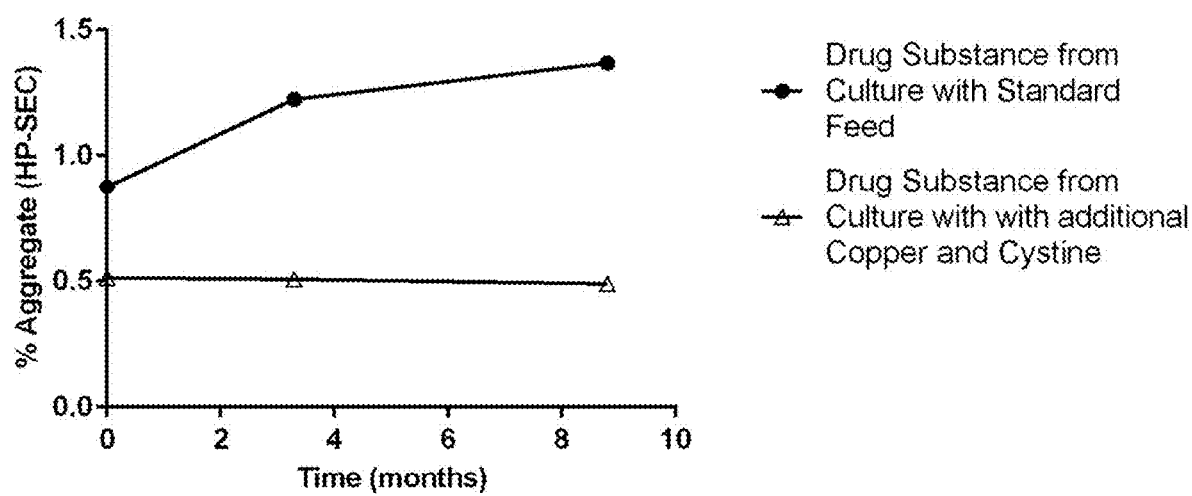

FIG. 22: Time course of percent aggregate at 2-8° C. of mAb A drug substance from culture with and without additional copper and cystine in feeds.

DETAILED DESCRIPTION

Definitions

It is to be noted that the term "a" or "an" entity refers to one or more of that entity; for example, "a binding molecule," is understood to represent one or more binding molecules. As such, the terms "a" (or "an"), "one or more," and "at least one" can be used interchangeably herein.

Furthermore, "and/or" where used herein is to be taken as specific disclosure of each of the two specified features or components with or without the other. Thus, the term and/or" as used in a phrase such as "A and/or B" herein is intended to include "A and B," "A or B," "A" (alone), and "B" (alone). Likewise, the term "and/or" as used in a phrase such as "A, B, and/or C" is intended to encompass each of the following aspects: A, B, and C; A, B, or C; A or C; A or B; B or C; A and C; A and B; B and C; A (alone); B (alone); and C (alone).

Unless defined otherwise, technical and scientific terms used herein have the same meaning as commonly understood by one of ordinary skill in the art to which this disclosure is related.

Units, prefixes, and symbols are denoted in their Systeme International de Unites (SI) accepted form. Numeric ranges are inclusive of the numbers defining the range. The headings provided herein are not limitations of the various aspects or aspects of the disclosure, which can be had by reference to the specification as a whole. Accordingly, the terms defined immediately below are more fully defined by reference to the specification in its entirety.

As used herein, the terms "polypeptide" and "protein" are intended to encompass a singular "polypeptide" or "protein," as well as plural "polypeptides," or "proteins" and refers to a molecule composed of monomers (amino acids) linearly linked by amide bonds (also known as peptide bonds). The terms "polypeptide" and "protein" refer to any chain or chains of two or more amino acids, and does not refer to a specific length of the product and are used interchangeably herein. Thus, peptides, dipeptides, tripeptides, oligopeptides, "amino acid chain," or any other term used to refer to a chain or chains of two or more amino acids are included within the definition of "polypeptide," or "protein" and the terms can be used instead of, or interchangeably with any of these terms. The terms "polypeptide" and "protein" are also intended to refer to the products of post-expression modifications of the polypeptide or protein, including without limitation glycosylation, acetylation, phosphorylation, amidation, and derivatization by known protecting/blocking groups, proteolytic cleavage, or modification by non-naturally occurring amino acids. A polypeptide or protein can be derived from a biological source or produced by recombinant technology, but is not necessarily translated from a designated nucleic acid sequence.

As used herein, the terms "protein of interest" and "disulfide bond-containing protein of interest" are used interchangeably and refer to a protein that contains at least one disulfide bond. The term "protein of interest" refers to the active form of the protein, e.g., the properly folded, properly assembled form of the protein that can achieve the commercial and/or therapeutic purpose. A "protein of interest" can be manufactured according to the methods provided herein. A protein of interest can be, e.g., a therapeutic protein such as an antibody or antigen-binding fragment thereof or a decoy receptor protein. "Increasing the yield" of a protein of interest means increasing the amount of the intact and properly folded protein that can achieve the commercial and/or therapeutic purpose, e.g., by maintaining a higher proportion of the protein in its intact and properly folded, properly assembled form.

The term "polynucleotide" is intended to encompass a singular nucleic acid as well as plural nucleic acids, and refers to an isolated nucleic acid molecule or construct, e.g., messenger RNA (mRNA), cDNA, or plasmid DNA (pDNA). A polynucleotide can comprise a conventional phosphodiester bond or a non-conventional bond (e.g., an amide bond, such as found in peptide nucleic acids (PNA)). The term "nucleic acid" refers to any one or more nucleic acid segments, e.g., DNA or RNA fragments, present in a polynucleotide. A "nucleic acid sequence" is the sequence of nucleotides found in the cited nucleic acid.

By an "isolated" nucleic acid or polynucleotide is intended any form of the nucleic acid or polynucleotide that is separated from its native environment. For example, gel-purified polynucleotide, or a recombinant polynucleotide encoding a polypeptide or protein contained in a vector would be considered to be "isolated." Also, a polynucleotide segment, e.g., a PCR product, which has been engineered to have restriction sites for cloning is considered to be "isolated." Further examples of an isolated polynucleotide include recombinant polynucleotides maintained in heterologous host cells or purified (partially or substantially) polynucleotides in a non-native solution such as a buffer or saline. Isolated RNA molecules include in vivo or in vitro RNA transcripts of polynucleotides, where the transcript is not one that would be found in nature. Isolated polynucleotides or nucleic acids further include such molecules produced synthetically. In addition, polynucleotide or a nucleic acid can be or can include a regulatory element such as a promoter, ribosome binding site, or a transcription terminator.

As used herein, the term "a non-naturally occurring polynucleotide" or any grammatical variants thereof, is a conditional definition that explicitly excludes, but only excludes, those forms of the nucleic acid or polynucleotide that are, or might be, determined or interpreted by a judge, or an administrative or judicial body, to be "naturally-occurring."

The terms "antibody" and "immunoglobulin" can be used interchangeably herein. An antibody (or a fragment, variant, or derivative thereof as disclosed herein) includes at least the variable domain of a heavy chain (for camelid species) or at least the variable domains of a heavy chain and a light chain. Basic immunoglobulin structures in vertebrate systems are relatively well understood. Unless otherwise stated, the term "antibody" encompasses anything ranging from a small antigen-binding fragment of an antibody to a full sized antibody, bispecific antibodies, fusion proteins, and antibody drug conjugates. A full-sized antibody may be an IgG antibody that includes two complete heavy (H) chains and two complete light (L) chains, an IgA antibody that includes four complete heavy chains and four complete light chains and optionally includes a J chain and/or a secretory component, or an IgM antibody that includes ten or twelve complete heavy chains and ten or twelve complete light chains and optionally includes a J chain.

The term "fragment" as disclosed herein includes any antibody reduced species. An intact antibody has two heavy chains and two light chains (LHHL); an antibody fragment may have two heavy chains and one light chain (LHH); or two heavy chains (HH); or one light chain and one heavy chain (LH); or one heavy chain (H); or one light chain (L).

As will be discussed in more detail below, the term "immunoglobulin" comprises various broad classes of polypeptides or proteins that can be distinguished biochemically. Those skilled in the art will appreciate that immunoglobulin heavy chains are classified as gamma, mu, alpha, delta, or epsilon, ($\gamma$, $\mu$, $\alpha$, $\delta$, $\varepsilon$) with some subclasses among them (e.g., $\gamma1$-$\gamma4$ or $\alpha1$-$\alpha2$)). It is the nature of this chain that determines the "isotype" of the antibody as IgG, IgM, IgA IgG, or IgE, respectively. The immunoglobulin subclasses (subtypes) e.g., $IgG_1$, $IgG_2$, $IgG_3$, $IgG_4$, $IgA_1$, $IgA_2$, etc. are well characterized and are known to confer functional specialization. Modified versions of each of these immunoglobulins are readily discernible to the skilled artisan in view of the instant disclosure and, accordingly, are within the scope of this disclosure.

Immunoglobulin light chains are classified as either kappa or lambda ($\kappa$, or $\lambda$). Each immunoglobulin heavy chain class can be bound with either a kappa or lambda light chain by covalent disulfide linkages. In general, the light and heavy chains are covalently bonded to each other by disulfide linkages, and the "tail" portions of the two heavy chains are bonded to each other by covalent disulfide linkages or non-covalent linkages when the immunoglobulins are expressed, e.g., by hybridomas, B cells, or genetically engineered host cells. In the heavy chain, the amino acid sequences run from an N-terminus at the forked ends of the Y configuration to the C-terminus at the bottom of each chain. The basic structure of certain antibodies, e.g., IgG antibodies, includes two heavy chain subunits and two light chain subunits covalently connected via disulfide bonds to form a "Y" structure, also referred to herein as an "H2L2" or "LHHL" structure, or a "binding unit."

The terms "valency," "bivalent," "multivalent" and grammatical equivalents, refer to the number of binding domains in given binding molecule or binding unit. As such, the terms "bivalent", "tetravalent", and "hexavalent" in reference to a given binding molecule, e.g., an IgM antibody or fragment thereof, denote the presence of two binding domains, four binding domains, and six binding domains, respectively. A bivalent or multivalent binding molecule can be monospecific, i.e., all of the binding domains are the same, or can be bispecific or multispecific, e.g., where two or more binding domains are different, e.g., bind to different epitopes on the same antigen, or bind to entirely different antigens.

The term "epitope" includes any molecular determinant capable of specific binding to an antibody. In certain aspects, an epitope can include chemically active surface groupings of molecules such as amino acids, sugar side chains, phosphoryl, or sulfonyl, and, in certain aspects, can have a three dimensional structural characteristics, and or specific charge characteristics. An epitope is a region of a target that is bound by an antibody.

Both, the light and heavy immunoglobulin chains are divided into regions of structural and functional homology. The terms "constant" and "variable" are used functionally. In this regard, it will be appreciated that the variable domains of both the variable light (VL) and variable heavy (VH) chain portions determine antigen recognition and specificity. Conversely, the constant domains of the light chain (CL) and the heavy chain (e.g., CH1, CH2 or CH3) confer biological properties such as secretion, transplacental mobility, Fc receptor binding, complement binding, and the like. By convention the numbering of the constant region domains increases as they become more distal from the antigen binding site or amino-terminus of the antibody. The N-terminal portion is a variable region and at the C-terminal portion is a constant region; the CH3 (or CH4 in the case of IgM) and CL domains actually comprise the carboxy-terminus of the heavy and light chain, respectively.

Antibodies or antigen-binding fragments, variants, or derivatives thereof include, but are not limited to, polyclonal, monoclonal, human, humanized, or chimeric antibodies, single chain antibodies, epitope-binding fragments, e.g., Fab, Fab' and F(ab')2, Fd, Fvs, single-chain Fvs (scFv), single-chain antibodies, disulfide-linked Fvs (sdFv), fragments comprising either a VL or VH domain, fragments produced by an Fab expression library.

By "specifically binds," it is generally meant that an antibody or fragment, variant, or derivative thereof binds to an epitope via its antigen binding domain, and that the binding entails some complementarity between the antigen binding domain and the epitope. According to this definition, an antibody or antigen-binding fragment thereof is said to "specifically bind" to an epitope when it binds to that epitope, via its antigen binding domain more readily than it would bind to a random, unrelated epitope. The term "specificity" is used herein to qualify the relative affinity by which a certain binding molecule binds to a certain epitope. For example, binding molecule "A" can be deemed to have a higher specificity for a given epitope than binding molecule "B," or binding molecule "A" can be said to bind to epitope "C" with a higher specificity than it has for related epitope "D."

Antibody fragments including single-chain antibodies or other binding domains can exist alone or in combination with one or more of the following: hinge region, CH1, CH2, CH3, or CH4 domains, J chain, or secretory component. Also included are antigen-binding fragments that can include any combination of variable region(s) with one or more of a hinge region, CH1, CH2, CH3, or CH4 domains, a J chain, or a secretory component. Binding molecules, e.g., antibodies, or antigen-binding fragments thereof can be from any animal origin including birds and mammals. The antibodies can be human, murine, donkey, rabbit, goat, guinea pig, camel, llama, horse, or chicken antibodies. In another aspect, the variable region can be cartilaginous in origin (e.g., from sharks). As used herein, "human" antibodies include antibodies having the amino acid sequence of a human immunoglobulin and include antibodies isolated from human immunoglobulin libraries or from animals transgenic for one or more human immunoglobulins and can in some instances express endogenous immunoglobulins and some not.

As used herein, the term "heavy chain subunit" includes amino acid sequences derived from an immunoglobulin heavy chain, e.g., an antibody comprising a heavy chain subunit can include at least one of: a VH domain, a CH1 domain, a hinge (e.g., upper, middle, and/or lower hinge region) domain, a CH2 domain, a CH3 domain, a CH4 domain, or a variant or fragment thereof. For example, a binding molecule, e.g., an antibody or fragment, variant, or derivative thereof can include without limitation, in addition to a VH domain: a CH1 domain; a CH1 domain, a hinge, and a CH2 domain; a CH1 domain and a CH3 domain; a CH1 domain, a hinge, and a CH3 domain; or a CH1 domain, a hinge domain, a CH2 domain, and a CH3 domain. In certain aspects a binding molecule, e.g., an antibody or fragment, variant, or derivative thereof can include, in addition to a VH domain, a CH3 domain and a CH4 domain; or a CH3 domain, a CH4 domain, and a J chain. Further, a binding molecule for use in the disclosure can lack certain constant region portions, e.g., all or part of a CH2 domain. It will be understood by one of ordinary skill in the art that these domains (e.g., the heavy chain subunit) can be modified such that they vary in amino acid sequence from the original immunoglobulin molecule.

As used herein, the term "light chain subunit" includes amino acid sequences derived from an immunoglobulin light chain. The light chain subunit includes at least a VL, and can further include a CL (e.g., Cκ or Cλ) domain.

As previously indicated, the subunit structures and three dimensional configuration of the constant regions of the various immunoglobulin classes are well known. As used herein, the term "VH domain" includes the amino terminal variable domain of an immunoglobulin heavy chain and the term "CH1 domain" includes the first (most amino terminal) constant region domain of an immunoglobulin heavy chain. The CH1 domain is adjacent to the VH domain and is amino terminal to the hinge region of a typical IgG heavy chain molecule.

The term "manufacturing process" includes techniques used to grow cells, e.g., recombinant cells, in culture and to obtain a protein of interest produced by the cultured cells in an appropriate form for use. The manufacturing process can include various steps, including, but not limited to one or more of the following: inserting of a gene of interest into a host cell to create an engineered host cell, culturing the host cell to expand the number of cells, inducing expression of the protein of interest by the host cell, screening for host cells expressing the protein of interest, harvesting the protein of interest, e.g., by separating the protein of interest from the cultured cells and cell culture medium, and/or purifying the protein of interest. The protein of interest can be an endogenous protein expressed by the native cell, or a recombinant heterologous protein encoded in an expression vector inserted into the cell (either transiently or stably).

As used herein the term "engineered" includes manipulation of nucleic acid or polypeptide molecules by synthetic means (e.g. by recombinant techniques, in vitro peptide synthesis, by enzymatic or chemical coupling of peptides or some combination of these techniques).

The term "expression" as used herein refers to a process by which a gene produces a biochemical, for example, a polypeptide or protein. The process includes any manifestation of the functional presence of the gene within the cell including, without limitation, gene knockdown as well as both transient expression and stable expression. It includes without limitation transcription of the gene into RNA, e.g., messenger RNA (mRNA), and the translation of such mRNA into polypeptide(s) or protein(s). If the final product is a biochemical, expression includes the creation of that biochemical and any precursors. Expression of a gene produces a "gene product." As used herein, a gene product can be either a nucleic acid, e.g., a messenger RNA produced by transcription of a gene, or a polypeptide or protein that is translated from a transcript. Gene products described herein further include nucleic acids with post transcriptional modifications, e.g., polyadenylation, or polypeptides and proteins with post translational modifications, e.g., methylation, glycosylation, the addition of lipids, association with other protein subunits, proteolytic cleavage, and the like.

As used herein the term "disulfide bond" or "disulfide bridge" or "S—S bond" includes the covalent bond formed between two sulfur atoms. The amino acid cysteine comprises a thiol group that can form a disulfide bond or bridge with a second thiol group. The second thiol group can be found in the side chain of a residue on the same polypeptide or protein (intra-disulfide bond), or on a different polypeptide or protein (inter-disulfide bond). Such bonds are created during protein biosynthesis and/or by oxidation of sulfhydryl groups, a process referred to as oxidative protein folding.

The terms "disulfide bond-containing protein" and "disulfide bond-containing protein" are used interchangeably herein and refer to a protein that in its properly folded state contains one or more disulfide bridges. The disulfide bond-containing protein can have a disulfide bond that is inter- or intra-molecular. Such inter- or intra-molecular disulfide bonds are present in a properly folded disulfide bond-containing protein. The activity of the disulfide bond-containing protein can be dependent on the presence and reduction state of the disulfide bonds. Many molecules function best with the formation of stable inter- and intra-molecular disulfide bonds that contribute to proper folding, such as immunoglobulins and cell surface receptors containing immunoglobulin domains, ribonucleases, lactalbumin, insulin, keratin, hemagglutinin, viral membrane proteins, neuroendocrine protein 7B2, epidermal growth factor (EGF), androgenic gland hormone, sulfide dehydrogenase, and lysozyme. Many therapeutic proteins, such as antibodies, EGF, and insulin, contain disulfide bonds. Manufacturing a therapeutic protein of interest under conditions that increase disulfide bond reduction can result in low yield of the intact protein of interest. As stated herein, term "yield" refers to the amount of protein of interest obtained that is intact, active, properly folded, and with the correct pairing of disulfide bonds. A process may produce a high overall amount of protein of interest, but if significant reduction of the disulfide bonds occurs in the protein of interest, the yield of intact protein may be low.

The term "reduced protein" means a protein that is exposed to reducing conditions sufficient to reduce a reducible residue in the protein structure, such as a cysteine. If the reduced protein contains a thiol group, or sulfur-containing residue, then the thiol group in the reduced protein exists in a state in which it is reduced. For instance, a reduced protein that contains a cysteine residue will exist in a state in which the sulfur atom of the cysteine residue is in the reduced state, often indicated as "—SH." A reduced protein can be a disulfide bond-containing protein. A disulfide bond-containing protein can become a reduced protein by exposure to reducing conditions that cause one or more disulfide bonds (disulfide bridges) in the disulfide bond-containing protein to break, which can contribute to destabilization of the disulfide bond-containing protein and potential loss of activity or function of the disulfide bond-containing protein.

The term "oxidized protein" means a protein that is exposed to oxidizing conditions sufficient to oxidize an oxidizable moiety in the protein structure. If the oxidized protein contains a thiol group, or sulfur-containing side chain, then the thiol group in the oxidized protein exists in a state in which it is oxidized. An oxidized protein can be a disulfide bond-containing protein. A disulfide bond-containing protein can become an oxidized protein by exposure to oxidizing conditions that cause one or more disulfide bonds (disulfide bridges) in the disulfide bond-containing protein to form. Oxidizing conditions during protein manufacture can contribute to stabilization of a disulfide bond-containing protein of interest, can contribute to proper folding, can contribute to retention of activity or function of the disulfide bond-containing protein, and can thereby increase the yield of the protein of interest during a manufacturing process.

The term "properly folded" or "intact protein" mean the native conformation, or native state, of a protein or polypeptide, which has a tertiary structure that provides the protein or polypeptide with its intended optimal wild type activity. A protein biochemical or polypeptide folds into its proper tertiary structure during or after biosynthesis. Misfolding of proteins results in dysfunctional or non-functional proteins or polypeptides. Proper tertiary structure leading to proper folding is governed by many factors including the formation of inter-molecular and intra-molecular disulfide bonds that help to stabilize the tertiary structure of the protein or polypeptide. Thus, a properly folded protein is one that possesses the disulfide bonds normally found in the native form of the protein or polypeptide.

The term "reduction potential" refers to the propensity of a properly-folded disulfide bond-containing protein of interest to undergo reduction at any point during a manufacturing process or during the storage time or "shelf life" of the protein following expression, purification, formulation and/ or packaging. The reduction potential at any point in time can be measured by subjecting a protein sample obtained at a desired time point to storage under vacuum for a given period of time (e.g., for a portion of an hour, for one hour, for a portion of a day (such as 8 hours, 10 hours, or 12 hours), one day, two days, 36 hours, or more) to induce reduction of the disulfide containing protein of interest in the absence oxygen. The sample is then analyzed for fragmentation using, e.g., a bioanalyzer to separate protein fragments under non-reducing conditions.

"LabChip GX assay" and "GX assay" are used interchangeably herein. These terms relate to the assays used to visualize antibodies and antibody fragments using LabChip GX II instrument and software.

The term "thioredoxin system" means the enzymes thioredoxin reductase-1 (TrxR1), and thioredoxin-1 (Trx-1), and the cofactor NADPH. These three components make up the thioredoxin system which supports several processes needed for eukaryotic cell function including cell proliferation, antioxidant defense, and redox signaling (Lu et al., 2014, *Free Radic. Biol. Med.*, 66:75-87).

The term "glutathione system" means the components glutathione, glutathione reductase (GR), glutaredoxin (Grx), and the cofactor NADPH (Lillig et al., 2008, *Biochim. Biophys. Acta—Gen. Subj.*, 1780:1304-1317).

The glutathione system and the thioredoxin system are collectively and alternatively referred to herein as "reductase system" or "reductase systems." That is, the term "reductase systems" encompasses both the glutathione system and/or the thioredoxin system.

A specific inhibitor is an agent that decreases or eliminates entirely the activity of a target enzyme to the exclusion of other, unrelated, enzymes, such as reductase enzymes. For instance, a specific inhibitor of glutathione reductase is an inhibitor that predominantly or exclusively inhibits glutathione reductase enzymes. A specific inhibitor of thioredoxin reductase is an inhibitor that predominantly or exclusively inhibits thioredoxin reductase enzymes. A thioredoxin reductase-specific inhibitor is ineffective in inhibiting glutathione reductase enzymes. Likewise, a glutathione reductase-specific inhibitor is ineffective in inhibiting thioredoxin reductase enzymes. A non-specific inhibitor is an agent that decreases or eliminates the activity of multiple enzymes. That is, a non-specific inhibitor is indiscriminate and can decrease or eliminate the activity of multiple different enzymes, such as both glutathione reductase and thioredoxin reductase.

Indirect inhibitors are inhibitors that decrease or eliminate the activity of a target enzyme by acting on a component other than the target enzyme itself. For instance, an indirect inhibitor can act on an upstream substrate of the target enzyme, an upstream enzyme that produces a substrate of the target enzyme, or bind and sequester or remove from access a cofactor of the target enzyme, thereby decreasing or eliminating the activity of the target enzyme.

Reduction of Disulfide Bond-Containing Proteins of Interest in Manufacturing Processes A cell culture manufacturing process for producing a disulfide bond-containing protein of interest can lead to reduction of protein disulfide bonds, and thereby reduce the yield of the intact protein of interest. Reduction of protein disulfide bonds or disulfide bridges can lead to misfolding of the protein of interest and loss of activity. Eukaryotic cells contain reductase enzyme systems that control reduction and oxidation within the cell. For instance, reduced thioredoxin 1 (Trx1) is thought to be the enzyme responsible for antibody disulfide bond reduction (Hutterer et al., 2013, mAbs, 5:608-613; Kao et al., 2010, *Biotechnol. Bioeng.*, 107:622-632; Koterba et al., 2012, 1 *Biotechnol.*, 157:261-267; and Magnusson et al., 1997, *Mol. Immunol.*, 34:709-717).

Eukaryotic cells contain a thioredoxin system and a glutathione system that support several processes needed for eukaryotic cell function including cell proliferation, antioxidant defense, and redox signaling. FIG. 1 depicts a schematic representation of the enzymes and chemical intermediates of the thioredoxin system and the glutathione system. The glutathione system is composed of glutathione, glutathione reductase (GR), glutaredoxin (Grx), and NADPH, which share a number of similarities and roles with the thioredoxin system (Lillig et al., 2008, *Biochim. Biophys. Acta—Gen. Subj.*, 1780:1304-1317). As seen in this figure, Grx can be reduced non-enzymatically in the glutathione system by the oxidation of reduced glutathione (GSH) while oxidized glutathione (GSSG) can be reduced enzymatically by GR using NADPH as a cofactor. As indicated in this figure, thioredoxin (Trx1) is reduced by thioredoxin reductase-1 (TrxR1) using NADPH as an electron donor. These three molecules, TrxR1, Trx1, and NADPH, make up the thioredoxin system.

Together, the thioredoxin system and the glutathione system protect eukaryotic cells from oxidative stress and maintain the intracellular redox environment. An imbalance in the intracellular redox state leads to increased oxidative stress, degradation of proteins, DNA damage, and eventually cell death. The thioredoxin system and the glutathione system, found in nearly all living cells, control the cellular redox environment.

It was surprisingly found that, contrary to the conclusion provided by Hutterer et al. (cited above), during protein manufacturing disulfide bonds present in a protein are sensitive to the activity and quantity of both the thioredoxin system and the glutathione system present in the cell culture or solution. In the present experiments it was determined that both systems are present in Chinese Hamster Ovary (CHO) cell lines. The present experiments also showed that both, the thioredoxin system and the glutathione system, are capable of reducing disulfide bonds in a disulfide bond-containing protein of interest. In the experiments described herein, it was determined that 2-AAPA is a specific inhibitor of the glutathione system activity at concentrations from 50 $\mu M$ to 200 $\mu M$, and ATG is a specific inhibitor of thioredoxin system activity at concentrations from 0.5 $\mu M$ to 1 $\mu M$. Thus, the experiments described herein show that one enzymatic system can be selectively inhibited without affecting the activity of the other enzymatic system.

Controlling Reductase Activity to Prevent Reduction of a Disulfide Bond-Containing Protein of Interest This disclosure provides a method for increasing the yield of an intact disulfide bond-containing protein of interest in a manufacturing process, where the method includes preventing reduction-based degradation of the protein of interest by manufacturing the protein of interest, e.g., culturing a host cell, inducing expression of the protein of interest in the host cell, harvesting the protein of interest from the host cell and/or cell culture supernatant, and/or purifying the protein of interest, in the presence of a thioredoxin reductase inhibitor, a glutathione reductase inhibitor, or both a thioredoxin reductase inhibitor and a glutathione reductase inhibitor. In certain aspects, inhibitors of thioredoxin reductase and glutathione reductase can be included at one or more steps of a manufacturing process for the disulfide bond-containing protein of interest to diminish the activity of thioredoxin reductase or glutathione reductase on the protein of interest, thereby increasing the yield of the protein of interest.

Both, thioredoxin reductase and glutathione reductase, can be active at varying levels in host cell lines commonly used for protein manufacturing. Moreover, the relative amount and activity of each of these reductases can vary between different host cell lines, or within the same host cell line depending on the cell culture conditions. In addition, the extent to which each of the reductases is "associated with" the protein of interest, i.e., is available to interact with and use the protein of interest as a substrate, can vary with the host cell, the properties of the protein of interest, and/or the time point in the manufacturing process. Accordingly in certain aspects the method for increasing the yield of a disulfide bond-containing protein of interest in a manufacturing process as discussed above further includes detecting whether the protein of interest is associated with specific reductases at any point during the manufacturing process, e.g., the growth phase, the production phase, the pre-harvest phase, the harvest phase, the purification phase, or any combination phases. Similarly mitigation of specific reductases can occur at any point during the manufacturing process.

Provided is a method of increasing the yield of an intact disulfide bond-containing protein of interest in a cell culture or solution, the method comprising manufacturing the disulfide bond-containing protein of interest, e.g., culturing a host cell, inducing expression of the protein of interest in the host cell, harvesting the protein of interest from the host cell and/or cell culture supernatant, and/or purifying the protein of interest, in the presence of one or more reductase inhibitors, such as inhibitors of thioredoxin reductase and/or inhibitors of glutathione reductase. In certain aspects, the presence of active thioredoxin reductase and/or active glutathione reductase can be determined for the cell line expressing the protein of interest. During the manufacturing process for the protein of interest, the amounts and identities of the inhibitors of thioredoxin reductase and/or inhibitors of glutathione reductase can be optimized depending on which reductase activities are present in the cell line.

For example, if the thioredoxin system is active in the cell line expressing the protein, then one or more inhibitors of thioredoxin reductase can be added during the manufacturing process to increase the yield of the intact disulfide bond-containing protein of interest. Likewise, if the glutathione system is active in the cell line expressing the protein, then one or more inhibitors of glutathione reductase can be added during the manufacturing process to increase the yield of the intact disulfide bond-containing protein of interest. Similarly, if both, the thioredoxin system and the glutathione system, are active in the cell line, then one or more inhibitors for both reductases can be added during the manufacturing process. Example 1, below, provides exemplary assays useful for detecting the components of the thioredoxin system and the glutathione system, such as, but not limited to, Western blot techniques and other immunochemical techniques.

In certain aspects, the activity of the thioredoxin system and/or glutathione system associated with the disulfide bond-containing protein of interest can be quantitated, and at certain points of the manufacturing process one or more inhibitors can be included in proportion to the levels of reductase activities detected in the vicinity of the protein of interest. For example, if it is determined that the quantity and/or activity of the thioredoxin system associated with the protein of interest is high at one or more points in a given manufacturing process, then a proportionally higher amount of one or more thioredoxin reductase inhibitors can be added during the manufacturing process to increase the yield of the disulfide bond-containing protein of interest expressed in the manufacturing process. Likewise, if it is determined that the quantity and/or activity of the glutathione system associated with the protein of interest is high at one or more points in a given manufacturing process, then a proportionally higher amount of one or more glutathione reductase inhibitors can be added during the manufacturing process to increase the yield of the disulfide bond-containing protein of interest expressed in the manufacturing process. Similarly, if it is determined that the quantity and/or activity of both the thioredoxin system and the glutathione system associated with the protein of interest is high at one or more points in a given manufacturing process, then a proportionally higher amount of one or more thioredoxin reductase inhibitors and one or more glutathione reductase inhibitors can be added during the manufacturing process to increase the yield of the disulfide bond-containing protein of interest expressed in the manufacturing process. In certain aspects, the amount of reductase inhibitor(s) added during the manufacturing process can be proportional to the quantity of each reductase system associated with the protein of interest at any point during the manufacturing process.

As noted above, the presence and activity of each of the thioredoxin system and glutathione system can be determined by various assay methods. In one such assay method, quantitating the activity of thioredoxin reductase and/or glutathione reductase associated with a disulfide bond-containing protein of interest during a manufacturing process includes adding 5,5'-dithio-bis(2-nitrobenzoic acid) (DTNB) to a sample obtained during the manufacturing process, e.g., lysed cells, in cell culture medium, cell culture medium cleared of cells, or a solution containing the protein of interest in a downstream purification step; monitoring the reduction of DTNB in the sample at a wavelength of 412 nm; and repeating these steps in the presence of a thioredoxin reductase inhibitor, or a glutathione reductase inhibitor. In certain aspects, components such as NADPH, oxidized glutathione, and buffer can be added to the sample prior to monitoring the wavelength. The difference between the reduction of DTNB in the sample with the added inhibitor and the reduction of DTNB in the sample without the added inhibitor indicates the activity of thioredoxin reductase and/or glutathione reductase, respectively. That is, both the thioredoxin system and the glutathione system can reduce DTNB under the appropriate assay conditions. The increase in absorbance at 412 nm is an indication of the reductase activity of a given sample. The total reductase activity of a sample is first determined in the absence of any reductase inhibitor. Then, a thioredoxin system-specific inhibitor, such as ATG, can be added and the amount of reductase activity determined. The difference in reductase activity between the sample with the thioredoxin system-specific inhibitor and the sample assayed without any thioredoxin system-specific inhibitor represents the reductase activity in the sample attributable to the thioredoxin system. Similarly, the sample can be analyzed in the presence of a glutathione system-specific inhibitor, such as 2-AAPA, and in the presence of no reductase inhibitor. The difference in activity between the sample assayed with the glutathione system-specific inhibitor and the sample without any glutathione system-specific inhibitor represents the reductase activity attributable to the glutathione system. Other exemplary methods for detecting reductase system components and increasing the yield of intact disulfide bond-containing protein in cell cultures are disclosed in Examples 2 to 8, below.

Specific inhibitors of thioredoxin reductase include, but are not limited to, aurothioglucose (ATG), aurothiomalate (ATM), Auranofin, and 2-[(1-methylpropyl)dithio]-1H-imidzole (PX 12). In certain aspects, a combination of thioredoxin inhibitors can be included in the manufacturing process. In certain aspects, the thioredoxin inhibitor added during protein manufacturing can be ATG. For a review of thioredoxin reductase inhibitors see, e.g., Cai, et al., 2012, *Free Radic. Biol. Med.*, 52:257-265.

Specific inhibitors of glutathione reductase include, but are not limited to, carmustine, 2-Acetylamino-3-[4-(2-acetylamino-2-carboxyethylsulfanylthiocarbonylamino)-phenylthiocarbamoylsulfanyl]propionic acid (2-AAPA), $Ni^{2+}$ salts, $Ca^{2+}$ salts, and $Cu^{2+}$ salts (at concentrations of about 50 µM or lower). In certain aspects, a combination of glutathione inhibitors can be added during the manufacturing process. In certain aspects, the glutathione inhibitor added during protein manufacturing can be 2-AAPA, a $Cu^{2+}$ salt, or both 2-AAPA and a $Cu^{2+}$ salt.

Non-specific inhibitors of both the glutathione system and thioredoxin system, or inhibitors that are not specific for either the glutathione system or the thioredoxin system, include, but are not limited to, cystine, and various metal ions, such as $Cu^{2+}$ (at concentrations higher than about 50 µM), $Hg^{2+}$, $Zn^{2+}$, $Co^{2+}$, $Fe^{2+}$, $Cd^{2+}$, $Pb^{2+}$, and $Mn^{2+}$. Indirect inhibitors of both the glutathione system and the thioredoxin system include, but are not limited to, metal chelators such as ethylenediamine tetraacetic acid (EDTA) or ethylene glycol tetraacetic acid (EGTA) to inhibit hexokinase, sorbose-1-phosphate, polyphosphates, 6-deoxy-6-fluoroglucose, 2-C-hydroxy-methylglucose, xylose, and lyxose. Methods of indirect inhibition of the glutathione system or the thioredoxin system include, but are not limited to, air or oxygen sparging, chilling, and decreasing pH during harvest. Such indirect methods of decreasing reduction of a disulfide-bond containing protein of interest during a manufacturing process can be combined with the inclusion of specific inhibitors during the manufacturing process, as discussed above. For instance, in certain aspects, specific thioredoxin system- and/or glutathione system-specific inhibitors can be combined with inhibitors of enzymes that are responsible for biosynthesis of NADPH in the cell. For example, NADPH biosynthetic enzyme inhibitors (indirect inhibitors) can be employed during and/or after harvest (e.g., during a hold phase between harvest and purification) to prevent toxicity caused by the inhibitors during the growth of the cells.

The amount of reductase inhibitor included during a manufacturing process can be any amount effective for inhibiting the detected thioredoxin system and/or glutathione system activity, and in certain aspects is the minimum amount effective for inhibiting the detected thioredoxin system and/or glutathione system activity. The effective amount of reductase inhibitor(s) can be empirically determined using the assays provided herein, such as in Examples 10-13. In certain aspects, one or more reductase-specific inhibitors can be added during the manufacturing process in the amounts provided below.

In certain aspects, the amount of 2-AAPA included in a manufacturing process with detected glutathione system activity can be from about 0.01 mM, 0.02 mM, 0.03 mM, 0.04 mM, 0.05 mM, 0.06 mM, 0.07 mM, 0.08 mM, 0.09 mM, 0.1 mM, 0.11 mM, 0.12 mM, 0.13 mM, 0.14 mM, 0.15 mM, 0.16 mM, 0.17 mM, 0.18 mM, or 0.19 mM to about 0.2 mM, 0.21 mM, 0.22 mM, 0.23 mM, 0.24 mM, 0.25 mM, 0.26 mM, 0.27 mM, 0.28 mM, 0.29 mM, 0.3 mM, 0.4 mM, or 0.5 mM final concentration. The amount of 2-AAPA included in a manufacturing process with detected glutathione system activity can be from about 0.05 mM to about 0.3 mM final concentration, from about 0.1 mM to about 0.25 mM final concentration, or from about 0.15 mM to about 0.22 mM final concentration. For example, the amount of 2-AAPA included in a manufacturing process with detected glutathione system activity can be about 0.2 mM final concentration.

$Cu^{2+}$ salt (copper ion) can specifically inhibit the glutathione system or both, the glutathione system and thioredoxin system, in a concentration-dependent manner. Copper ion can be added by any means known in the art, such as by addition of copper chloride ($CuCl_2$), cupric sulfate ($CuSO_4$, pentahydrate or anhydrous), copper acetate, and combinations thereof. To inhibit the glutathione system, the final concentration of $Cu^{2+}$ salt (copper ion) included in a manufacturing process with detected glutathione system activity can be about 0.1 µM, 0.2 µM, 0.3 µM, 0.4 µM, 0.5 µM, 0.6 µM, 0.7 µM, 0.8 µM, 0.9 µM, 1.0 µM, 1.5 µM, 2.0 µM, 2.5 µM, 3.0 µM, 3.5 µM, 4.0 µM, 4.5 µM, 5.0 µM, 5.5 µM, 6.0 µM, 6.5 µM, 7.0 µM, or 7.5 µM to about 8 µM, 9 µM, 10 µM, 11 µM, 12 µM, 13 µM, 14 µM, 15 µM, 16 µM, 18 µM, 20 µM, 25 µM, 30 µM, 35 µM, 40 µM, 45 µM, or 50 µM. In certain aspects, the final concentration of copper ion included in a manufacturing process with detected glutathione system activity can be from about 0.5 µM to less than about 50 µM final concentration.

In certain aspects both, the thioredoxin system and the glutathione system, can be inhibited by addition of copper ion during the manufacturing process. To inhibit both, the thioredoxin system and the glutathione system, the final concentration of $Cu^{2+}$ salt included in a manufacturing process can be from about 5 µM, 10 µM, 20 µM, 30 µM, 40 µM, 50 µM, or 75 µM to about 100 µM, 110 µM, 120 µM, 130 µM, 140 µM, 150 µM, 175 µM, or 200 µM. In certain aspects, the final concentration of copper ion included in a manufacturing process can be from about 5 µM to about 200 µM, from about 5 µM to about 200 µM, from about 10 µM to about 175 µM, from about 20 µM to about 150 µM, from about 40 µM to about 150 µM, or from about 5 µM to about 200 µM. In certain aspects, the final concentration of copper ion included in a manufacturing process can be about 50 µM.

In certain aspects, the amount of ATG included in a manufacturing process with detected thioredoxin system activity can be from about 0.01 mM, 0.02 mM, 0.03 mM, 0.04 mM, 0.05 mM, 0.06 mM, 0.07 mM, 0.08 mM, 0.09 mM, 0.1 mM, 0.11 mM, 0.12 mM, 0.13 mM, 0.14 mM, 0.15 mM, 0.16 mM, 0.17 mM, 0.18 mM, or 0.19 mM to about 0.2 mM, 0.21 mM, 0.22 mM, 0.23 mM, 0.24 mM, 0.25 mM, 0.26 mM, 0.27 mM, 0.28 mM, 0.29 mM, 0.3 mM, 0.4 mM, 0.5 mM, 0.6 mM, 0.7 mM, 0.8 mM, 0.9 mM, 1.0 mM, 1.5 mM, 2.0 mM, 2.5 mM, 3.0 mM, 3.5 mM, 4.0 mM, 4.5 mM, or 5.0 mM final concentration. In certain aspects, the amount of ATG included in a manufacturing process with detected thioredoxin system activity can be from about 0.05 mM to about 5 mM final concentration. In certain aspects, the amount of ATG included in a manufacturing process with detected thioredoxin system activity can be from about 0.10 mM to about 1 mM final concentration. In certain aspects, the amount of ATG included in a manufacturing process with detected thioredoxin system activity can be from about 0.1 mM to about 0.5 mM final concentration. In certain aspects, the amount of ATG included in a manufacturing process with detected thioredoxin system activity can be from about 0.10 mM to about 0.20 mM final concentration. In certain aspects, the amount of ATG included in a manufacturing process with detected thioredoxin system activity can be about 0.1 mM final concentration.

Manufacture of a Disulfide Bond-Containing Protein of Interest

Any cell culture technique known in the art can be used to grow host cells that express a disulfide bond-containing protein of interest using any cell lines known in the art. Standard techniques for culturing cell lines are available.

Manufacture of a disulfide bond-containing protein of interest can include culturing a host cell that is amenable to culturing and biosynthesizes the disulfide bond-containing protein of interest. Cell culture conditions vary depending on the type of cell. Cell culture media can include, without limitation, buffers, salts, carbohydrates, amino acids, vitamins, and trace essential elements. The term "serum-free" medium applies to a cell culture medium that does not contain animal sera, such as fetal bovine serum. Various tissue culture media, including defined culture media, are commercially available and can be used in the manufacture of the disulfide bond-containing protein of interest. Eukaryotic cells can be either adherent or suspended in culture, and such cells can be grown in containers such as test tubes, flasks, roller bottles, plates, bags, fluidized bed reactors, hollow fiber bed reactors, or stirred tank bioreactors (single-use and standard stainless steel and glass vessel bioreactors). Cell culture can be performed on a small or a large scale, where cells are incubated for growth in containers of varying sizes from a few milliliters to thousands of liters or more.

Cell culture systems are commercially available that allow for incubation under optimal conditions of temperature, pH, $O_2$ and $CO_2$. Basic equipment useful in culturing cells includes a laminar-flow hood, incubator, centrifuge, refrigerator and freezer, cell counter, microscope, autoclave (sterilizer), vacuum or pump, pH meter, and flow cytometer. Cells can be grown in a batch culture, where nutrients and media are not replaced during cell growth; fed-batch culture, where nutrients are added during the cell growth; or perfusion culture, where fresh nutrients and media are continuously added to the cell culture and spent media is continuously removed. Cell cultures can be grown using commercially available automated systems designed to maximize cell growth under specific conditions.

The manufacturing process of a disulfide bond-containing protein of interest can include multiple phases. For example, in a multiple stage process, cells are cultured in two or more distinct phases. In a multi-phase production process, cells are cultured first in one or more growth phases, under environmental conditions that maximize cell proliferation and viability, then transferred to a production phase, under conditions that maximize protein production. In a commercial process for production of a protein of interest by mammalian cells, there are commonly multiple, for example, at least about 2, 3, 4, 5, 6, 7, 8, 9, or 10 growth phases that occur in different culture vessels preceding a final production culture. The growth and production phases can be preceded by, or separated by, one or more transition phases. In multiple phase processes, the method provided by this disclosure can be employed at least during the growth and production phase of the final production phase of a commercial cell culture, although it can also be employed in a preceding growth phase. A production phase can be conducted at large scale. A large scale process can be conducted in a volume of at least about 50, 100, 500, 1000, 2000, 3000, 5000, 7000, 8000, 10,000, 15,000, 20,000, 25,000 liters. In a preferred embodiment production is conducted in a 500 L, 1000 L, 2000 L, 12000 L and/or 20000 L bioreactor.

Manufacture of a Protein of Interest from Cell Culture

Cells can be cultured in a stirred tank bioreactor system and a fed batch culture procedure can be employed. For example, mammalian host cells and culture medium can be supplied to a culturing vessel initially and additional culture nutrients can be fed, continuously or in discrete increments, to the culture during culturing, with or without periodic cell and/or product harvest before termination of culture. A fed batch culture can include, for example, a semi-continuous fed batch culture, wherein the partial or entire culture (including cells and medium) is removed and replaced by fresh medium. Fed batch culture can be distinguished from simple batch culture in which all components for cell culturing (including the cells and all culture nutrients) are supplied to the culturing vessel at the start of the culturing process. Fed batch culture can be further distinguished from perfusion culturing, where the supernatant is not removed from the culturing vessel during the process (in perfusion culturing, the cells are restrained in the culture by, e.g., filtration, encapsulation, anchoring to microcarriers, etc. and the culture medium is continuously or intermittently introduced and removed from the culturing vessel).

In certain aspects, fed batch or continuous cell culture conditions can be used to enhance growth of the mammalian cells in the growth phase of the cell culture. In the growth phase cells are grown under conditions and for a period of time that is maximized for growth. Culture conditions, such as temperature, pH, dissolved oxygen ($dO_2$) and the like, are those used with the particular host and will be apparent to the ordinarily skilled artisan. Generally, the pH is adjusted to a desired level using either an acid (e.g., $CO_2$) or a base (e.g., $Na_2CO_3$ or NaOH). A suitable temperature range for culturing mammalian cells such as CHO cells is between about 30° C. and 38° C.; a suitable pH is between about 6.5 and 7.5; and a suitable $dO_2$ is between 5 and 90% of air saturation.

At a particular stage the cells may be used to inoculate a production phase or step of the cell culture. Alternatively, as described above the production phase or step may be continuous with the inoculation or growth phase or step.

The cell culture environment during the production phase of the cell culture is typically controlled. Thus, if a glycoprotein is produced, factors affecting cell specific productivity of the mammalian host cell may be manipulated such that the desired sialic acid content is achieved in the resulting glycoprotein. In certain aspects, the production phase of the cell culture process is preceded by a transition phase of the cell culture in which parameters for the production phase of the cell culture are engaged.

Suitable host cells include, but are not limited to, bacteria, plant cells, mammalian cells, yeast cells, and insect cells. Eukaryotic cells from many different animals are amenable to cell culturing and commercially available, including, but not limited to, fibroblast cell lines such as BALB/3T3, and BHK-21; epithelial cell lines such as the Human Embryonic Kidney cell line HEK293 (293), the HeLa cell line, Madin-Darby canine kidney (MDCK) cells, A549, HepG2, VERO, Caco-2, Chinese Hamster Ovary (CHO), COS-1; lymphoblasts such as Daudi, Jurkat, and H9; myeloblasts cells such as NS0, KG-1; endothelial cell lines such as HUVEC; retinal cells such as the PER.C6 cell line; insect cell lines such as Sf9, BTI-TN-5B1-4, and D.Mel-2; and yeast cell lines, such as *Pichia pastoris* strains SMD1168, and X-33; and *Saccharomyces cerevisiae* strains S288C, W303, D273-10B, X2180, A364A, E1278B, AB972, SK1, and FL100, and any of the cell lines available from the American Type Culture Collection (ATCC, Manassas, VA), or any international depository authority. Common prokaryotic cells useful in manufacturing of proteins are *Escherichia coli, Streptomyces*, coryneform bacteria, and halophilic bacteria, among others.

In creating an engineered host cell, the nucleic acid encoding the disulfide bond-containing protein of interest is inserted into the host cell either transiently or stably, for expression. After introduction of the nucleic acid into the cells, and culturing of the cells to expand their numbers, the expression of the protein from the nucleic acid can be triggered, for instance by culturing the host cells under conditions that facilitate expression of the gene. Prior to harvest, a manufacturing process can include pre-harvest steps such as, e.g., addition of reagents to facilitate purification and protein stability.

After the disulfide bond-containing protein of interest is expressed, it can be harvested, e.g., separated from other components of the cell culture, and purified in a protein purification process. Harvesting of the protein of interest can be accomplished by many different means that achieve separation of the protein of interest from other cell culture components. For instance, secretion of a recombinant protein into the culture medium is achieved by engineering a protein of interest to be secreted outside the cell into the culture medium. One such engineering technique includes designing an expression vector to include a signal peptide that causes the recombinant protein to be secreted outside of the host cell upon expression. Vectors comprising protein secretion signal sequences are commercially available. When the protein of interest is expressed by the cell line and secreted into the cell culture medium, the protein of interest can be isolated from the culture medium. Separation of the secreted protein of interest from the cells and cell culture medium can be accomplished by known techniques such as centrifugation, ultrafiltration/diafiltration, and/or chromatography. If the protein of interest is not secreted by the host cell, host cells can be separated from the cell culture medium, e.g., by centrifugation or filtration, and then lysed by various known means and the protein can be separated from other cell components in the cell lysate by various methodologies, such as centrifugation, column chromatography, and/or precipitation and dialysis techniques.

Further purification techniques can include various chromatography methodologies such as ion exchange, size exclusion, hydroxylapatite, and affinity chromatography. These can be performed in small scale on HPLC, FPLC, and capillary systems, or on a large scale using large batch chromatography techniques known in the art. For instance, the protein of interest can be applied to the column and in some instances bound to the column. In some instances the protein of interest will pass through the column, while other cell line components remain behind, bound to the column. Bound protein can be eluted from the column by application of an elution agent that interferes with binding of the protein of interest to the column media. For example, purification of antibodies can be achieved by binding secreted proteins, such as antibodies, in the culture medium to a protein-A affinity column.

In certain aspects, the disulfide bond-containing protein of interest can be an endogenous disulfide bond-containing protein. In other aspects, the disulfide bond-containing protein of interest can be a recombinant heterologous disulfide bond-containing protein encoded on an expression vector and transiently transfected into the host cell, or stably transfected into the host cell. In certain aspects, the disulfide bond-containing protein of interest can be an antibody or antigen-binding fragment thereof. In certain aspects, the disulfide bond-containing protein of interest can be a human, chimeric, or humanized antibody or fragment thereof. In certain aspects, the antibody can be an IgG antibody or fragment thereof. In certain aspects, the disulfide bond-containing protein of interest can be a human, humanized, or chimeric antibody of IgG subtype $IgG_1$, $IgG_2$, $IgG_3$, or $IgG_4$. In certain aspects, the immunoglobulin or fragment thereof can be monovalent or bivalent. In certain aspects, the antibody can be an IgA, IgM, IgD, or IgE. In certain aspects, the antibody or fragment thereof can be an Fab, Fab', F(ab')2, or disulfide-linked Fvs (sdFv). In certain aspects, the antibody or fragment thereof can be a monoclonal antibody or part of a polyclonal mixture of antibodies.

Following harvest, the protein of interest can be immediately purified or alternatively, the harvested cell culture fluid (HCCF) containing the protein of interest can be held or stored for a period time, e.g., for at least one hour, at least one day, at least four days, at least one week, at least 10 days, or at least two weeks following the harvest phase and prior to the purification phase. For many disulfide bond-containing proteins prone to reduction, reduction of the disulfide bonds does not occur until the harvesting steps. The harvest steps of the manufacturing process occurs when the cells are separated from the supernatant containing the protein of interest. The process of separating the cells from the supernatant can cause cell lysis, which releases reductase pathway components into the supernatant where they can associate with the protein and catalyze protein disulfide bond reduction of the disulfide bond-containing protein of interest. The harvest step is typically at about day 14 of the manufacturing process, but can vary depending, e.g., on the identity of the cell line employed, the cell culture conditions, and/or the characteristics of the protein of interest. Reductase inhibitors can be added before the harvest step, during the harvest step, during a hold period following harvest and prior to purification, and/or during the purification process. In certain aspects, following harvest (e.g., just after harvest, during a hold period following harvest, or during purification), a solution is provided containing cell culture media, one or more components of one or more reductase pathways, the disulfide bond-containing protein of interest, and one or more reductase inhibitors.

Manufacturing processes for disulfide bond-containing proteins of interest can likewise exhibit disulfide bond reduction in the bioreactor towards the end of the cell culture but prior to harvest, e.g., day 8-14 for a two week culture. In this case, the reductase inhibitors can be added earlier than at harvest, e.g., at day 2, 3, 4, 5, 6, 7, 8, 9, 10, 11, 12, 13, or 14 of a typical cell culture process, or can be present throughout the cell culture process. The precise day on which inhibitors are added to the culture can vary depending, e.g., on the identity of the cell line used and the characteristics of the disulfide bond-containing protein of interest being manufactured. In either case, the reductase inhibitors can be added before reduction occurs. In certain aspects, during cell culture a solution can be provided comprising one or more reductase inhibitors.

A thioredoxin and/or glutathione reductase inhibitor discussed above can be added at any point during the protein manufacturing process. In certain aspects, the reductase inhibitor(s) can be added prior to cell harvest. In certain aspects, the reductase inhibitor(s) can be added at the start of the cell culture. In certain aspects, the reductase inhibitor(s) can be present throughout the manufacturing process and can be eliminated at the end of the process, e.g., through certain protein purification steps. In certain aspects, the reductase inhibitor(s) can be added at cell harvest and removed in the first protein purification step. In another aspect, different reductase inhibitors can be present at different times in the manufacturing process.

Methods of Increasing the Yield of an Intact Protein of Interest

Reductase-specific inhibitors can be screened and their optimal concentrations determined in assays employing purified recombinant mammalian reductases as shown below. The reductase screening assays disclosed below (see Examples 2 and 3) can be helpful in detecting both the activity and amount of reduction of the disulfide bond-containing protein of interest individually caused by the thioredoxin system and the glutathione system. Using reductase inhibitors that are specific for either the glutathione system or the thioredoxin system, it can be possible to determine the individual contributions of the thioredoxin system and the glutathione system to reduction of the disulfide bond-containing protein of interest at various points during the manufacturing process. In certain aspects, the quantity, or amount, of an intact disulfide bond-containing protein of interest reduced by the glutathione system and/or the thioredoxin system can be determined with these assays.

The methods described herein utilize the correlation between reductase enzyme activity and protein reduction activity in cell cultures. The amounts of the thioredoxin system and glutathione system components associated with a disulfide bond-containing protein of interest during a manufacturing process can vary for reasons described elsewhere herein. For instance, in the Examples below, it was found that a manufacturing process employing CHO cell line A (CHO CAT-S) to express mAb A exhibited glutathione reductase activity during the manufacturing process, and the reduction of mAb A in this process was thus sensitive to specific inhibition of the glutathione system. On the other hand, a manufacturing process employing CHO cell line C (CHO-K1SV) to express mAb C exhibited thioredoxin reductase activity during the manufacturing process, and the reduction of mAb C produced by this cell line was thus sensitive to specific inhibition of the thioredoxin system. Further, a manufacturing process employing CHO cell line B (CHO-K1SV) to express mAb B and CHO cell line D (CHO CAT-S) to express mAb D exhibited nearly equivalent reductase activity levels from both the thioredoxin system and the glutathione system during the manufacturing process, and the reduction of both mAb B and mAb D produced by these cell lines was thus sensitive to inhibition of both systems. Additionally, the manufacturing process employing cell line B to express mAb B exhibited the highest overall reductase activity, which correlated with the observation that mAb B exhibited the highest overall percent of reduction as compared to the other processes tested.

Thus, in certain aspects, methods are provided in which either glutathione system-specific inhibitors are added, or thioredoxin system-specific inhibitors are added, or both, glutathione system-specific inhibitors and thioredoxin system-specific inhibitors are added depending on the determination of whether enzymes in these systems are associated with the protein of interest at any point during the manufacturing process, and the amount of activity of each system present. Thus, in certain aspects, the cocktail of inhibitors added during the manufacturing process can be tailored to the specific reductase systems associated with the protein of interest during the manufacturing process. Testing for the presence of the thioredoxin system or the glutathione system in the vicinity of the protein of interest, and including inhibitors specific for these reductase systems in the manufacturing process, can measurably improve the yield of disulfide bond-containing proteins in such manufacturing processes.

By "increase in yield of an intact protein" is meant an increase in active, properly folded, non-reduced, disulfide bond-containing protein of interest. As shown, for example, in FIG. 7, the percent of increase in yield of the intact disulfide bond-containing protein of interest can be from 20% to 100% depending on the type of reductase inhibitor, or combination of reductase inhibitors, employed during the manufacturing process and the amount of thioredoxin system and/or glutathione system activity associated with the disulfide bond-containing protein of interest during the manufacturing process. In certain aspects, when adding the inhibitor ATG, the percent increase in yield of the, disulfide bond-containing protein of interest can be from about 30% to about 90%, from about 40% to about 80%, from about 50% to about 70%, or higher than 20%, 30%, 40%, 50%, 60%, 70%, 80% or 90%. In certain aspects, when adding the inhibitor $Cu^{2+}$ to the manufacturing process, the percent increase in yield of the disulfide bond-containing protein of interest can be from about 20% to about 100%, from about 30% to about 90%, from about 40% to about 80%, or higher than 20%, 30%, 40%, 50%, 60%, 70%, 80% or 90%.

In certain aspects, including glutathione system inhibitor (s) to the manufacturing process in addition to thioredoxin system inhibitor(s) can provide a higher yield of properly folded, disulfide bond-containing protein of interest as compared to the same manufacturing process performed in the presence of only a thioredoxin system inhibitor. For example, as shown in FIG. 7, the inclusion of a copper ion to inhibit glutathione reductase, in addition to the inclusion of a thioredoxin system-specific inhibitor, such as ATG, provided an increase in yield of properly folded, disulfide bond-containing protein of interest of over 20%, 30%, 40%, 50%, or even 60%. Thus, inclusion of a glutathione system-specific inhibitor in a manufacturing process for a disulfide bond-containing protein of interest can result in a marked increase in yield of that protein of interest as compared to an identical manufacturing process performed in the presence of only a thioredoxin system-specific inhibitor.

Thus, as shown below, the inhibition of the glutathione system during a manufacturing process can substantially, or completely, prevent reduction of disulfide bonds of a disulfide-bond containing protein of interest, thereby increasing the yield of that protein. As shown herein, enzyme assays can be employed to determine the relative amount of each reduction system, and their imputed impact, on protein disulfide bond reduction. This information can be used to select the best disulfide-bond containing protein manufacturing process reduction mitigation strategy for the protein of interest.

The methods described herein balance the risks and benefits of thioredoxin system and glutathione system inhibitors to maximize the production yield of a disulfide bond-containing protein of interest. Reduction mitigation strategies often have unique drawbacks. For example, excessive addition of copper ion can decrease cell growth, reduce titer, lower the activity of a disulfide bond-containing protein of interest, trigger increased environmental disposal concerns, or increase the burden of monitoring the clearance of metal ions during the downstream processing (protein purification) of the protein of interest. Consequently, in certain aspects, the presence and quantity of the thioredoxin system and the glutathione system associated with a protein of interest during a manufacturing process can be detected, and then mitigation strategies can be designed based on that information. According to the methods provided herein, where a reduction mitigation strategy does not increase the yield of a disulfide bond-containing protein of interest, the mitigation strategy, as well as the drawbacks of that strategy, can be avoided, reducing protein manufacturing costs and reducing production time while maintaining and/or increasing the overall yield of the disulfide bond-containing protein of interest. According to the methods provided herein, detrimental side-effects of too much of any glutathione system and thioredoxin system inhibitor(s) can be avoided by limiting the concentration of the inhibitors employed during the manufacturing process to the minimum required to increase the yield of the disulfide bond-containing protein of interest.

Mitigating the Potential for Disulfide Bond Reduction During a Protein Manufacturing Process This disclosure provides a method for increasing the yield of an intact disulfide bond-containing protein of interest, and/or decreasing or mitigating the reduction potential of the disulfide bond-containing protein in a manufacturing process. The method provides improvements to a manufacturing process that mitigates, e.g., prevents or reduces, the potential for disulfide bond reduction at one or more time points during the process. The manufacturing process can include expressing the protein of interest in a cultured eukaryotic host cell grown and maintained in cell culture fluid (CCF). As described above, a manufacturing process according to the method provided herein can include a growth phase, a production phase, a pre-harvest phase, a harvest phase, a hold phase, a purification phase, or any combination thereof. As described above, in certain aspects the production phase can include maintaining the cells in CCF for any period of time, at least one day, at least 8 days, at least 10 days, at least 12 days, at least 14 days, or at least 16 days.

According to the method provided herein, the manufacturing process includes maintaining an effective amount of cystine in the CCF during the production bioreactor or any portion thereof, e.g., late in the production phase, thereby mitigating the potential for disulfide bond reduction. By "mitigating the potential for disulfide bond reduction" is meant that the potential for reduction is decreased relative to a control manufacturing process in which an effective amount of cystine is not maintained in the CCF at any given point in the production phase. In certain aspects reduction of the disulfide bond-containing protein of interest is prevented entirely. In certain aspects the amount of disulfide bond reduction is less than observed in the control CCF, e.g., about 5% less, about 10% less, about 20% less, about 30% less, about 40% less, about 50% less, about 60% less, about 70% less, about 80% less, about 90% less, or about 99% less than that observed in the control CCF. Reduction potential can be measured by the vacuum/bioanalyzer assay described elsewhere herein. For example, reduction potential can be measured by a method comprising: storing a sample of the CCF obtained at a selected time point during the manufacturing process in a vacuum chamber, and measuring the level of fragmentation of the protein of interest relative to control sample. In certain aspects, samples recovered from the CCF at various time points during the production phase can be centrifuged to remove cells, and the supernatants can be immediately frozen, e.g., at −80° C. Once all the samples are collected they can be thawed and subjected to vacuum treatment at the same time. In certain aspects the level of fragmentation is measured on a bioanalyzer under non-reducing conditions.

Since protein fragmentation or misfolding due to disulfide bond reduction results in a decreased amount of the intact and stable active form of the protein of interest, the method provided herein can increase the yield of the intact disulfide containing protein of interest, and/or can decrease the reduction potential of the disulfide bond-containing protein during storage. Yield can be increased, e.g., about 5%, about 10%, about 20%, about 30%, about 40%, about 50%, about 60%, about 70%, about 80%, about 90%, or about 99% more than relative to the yield of a control manufacturing process.

In certain aspects, a modified manufacturing process according to the method provided herein further includes maintaining an effective amount of cystine in the CCF during the harvesting phase or any portion thereof, during the purification phase or any portion thereof, e.g., before the protein is separated from the CCF by one or more purification steps described elsewhere herein, or any combination thereof. An effective amount of cystine can also be maintained in a solution of the protein of interest in one or more purification and/or formulation steps following separation of the protein of interest from the CCF. Certain harvesting methods can increase the potential for disulfide bond reduction in the protein of interest, e.g., centrifugation or ultrafiltration techniques that promote cell lysis can release reductase enzymes into the CCF. Accordingly, in certain aspects the harvest phase of the manufacturing process is modified to minimize cell lysis.

An effective amount of cystine to be maintained during a production phase or portion thereof can be easily determined by a person of ordinary skill in the art using the methods provided herein, e.g., measuring the cystine concentration in CCF at any point, or one or more points, during the manufacturing process, determining the reduction potential of the disulfide bond-containing protein of interest at the same point or points, and determining the concentration of cystine required to decrease or eliminate the propensity of the protein of interest to undergo reduction at that time point. In certain aspects, the effective amount of cystine can be from about 0.5 mM to about 1 mM; from about 0.9 mM to about 3 mM; from about 2.5 mM to about 4.5 mM. In certain aspects, the effective amount of cystine can be at least about 0.5 mM; at least about 1 mM; at least about 2.0 mM, at least about 2.5 mM, at least about 3.0 mM, at least about 3.5 mM, at least about 4.0 mM, at least about 4.5 mM, at least about 5.0 mM, or at least about 5.5 mM. The concentration of cystine in the CCF can be determined, e.g., by amino acid analysis using UPLC at any one or more time points during the manufacturing process, or at regular intervals during the manufacturing process, e.g., at regular intervals during the production phase.

In certain aspects, a method for mitigating the potential for disulfide bond reduction includes changing the redox potential of the solution during any step of the manufacturing process (including bioreactor) by adding redox modifiers including metal ions (including $Zn^{2+}$, $Mn^{2+}$, $Fe^{3+}$, $Cu^{2+}$, $Se^{2+}$), cystine, dissolved oxygen, beta mercaptoethanol, glutathione, or a combination thereof.

In certain aspects, a method for mitigating the potential for disulfide bond reduction is controlled via an online cell culture redox potential. The control system, based on the cell culture redox potential, is used to increase the concentration of $Zn^{2+}$, $Mn^{2+}$, $Fe^{3+}$, $Cu^{2+}$, $Se^{2+}$, cystine, dissolved oxygen, beta mercaptoethanol, or glutathione in response to a decrease in the cell culture redox potential. Use of a control system based on the cell culture redox potential prevents the unnecessary over-addition of the chemical mitigator (or increase in DO set point). This is advantageous as the chemical required to prevent reduction must be cleared by the downstream purification process and elevated DO can reduce the final process titer.

In certain aspects, a production phase according to the methods provided herein can be a "fed batch" process, in which a nutrient feed solution that includes cystine is added to the CCF during the production phase. The nutrient feed solution containing cystine can include one or more additional nutrients to facilitate expression of the protein of interest in functional form. The nutrient feed solution may contain, for example, at least one amino acid. In certain aspects the nutrient feed solution includes L-cystine by itself or with one or more additional components. In certain aspects, the nutrient feed solution that includes cystine is added to the CCF at regular intervals during the production phase, e.g., about every day, about every two days, about every three days, about every four days, or about every five days during the production phase. Thus, throughout the production phase one, two, three, four, five, six, seven, or eight additions of the nutrient feed solution containing cystine can occur. In certain aspects, two or more different nutrient feed solutions can be added during the production phase. An additional nutrient feed solution can include at least one additional nutrient to facilitate expression of the protein of interest in functional form, for example, amino acids, glucose, vitamins, protein hydrolysate, or any combination thereof. One or more nutrient feed solutions can be added according to the same schedule that the nutrient feed solution comprising cystine is added. This second nutrient feed solution can be added using a different schedule than the one used for the first nutrient feed solution.

In certain aspects, the nutrient feed solution containing cystine is added to the CCF about every two days, and five or six additions of the nutrient feed solution occur during the production phase. In certain aspects an effective amount of cystine can be maintained in the CCF throughout the production phase, and/or during other phases of the manufacturing process. In certain aspects, however, the effective amount of cystine need only be maintained in the CCF during the later portions of the production phase, e.g., the part of the production phase occurring just before the pre-harvest and/or harvest phases. For example in certain aspects the effective amount of cystine can be maintained in the CCF for the last 14 days of the production phase, the last 12 days of the production phase, the last 10 days of the production phase, the last 8 days of the production phase, the last 6 days of the production phase, the last 4 days of the production phase, the last 2 days of the production phase, or the last day of the production phase. For example, in a batch-feeding production phase as described elsewhere herein, additional cystine can be included in the last and/or the next to last additions of a nutrient feed solution (NF), e.g., the fifth NF addition where the process includes five batch feedings, or the fifth and/or sixth NF additions. Relative to a standard control manufacturing process, the amount of cystine in the later feedings can be at least about 10% more, at least about 20% more, at least about 30% more, at least about 40% more, at least about 50% more, at least about 60% more, at least about 70% more, at least about 80% more, at least about 90% more, or at least about 100% more. For example the concentration of cystine in the control CCF at a certain time point in the production phase can be about 2.0 mM where at the same time point, the concentration of cystine in the CCF according to the method provided herein can be 3.5 mM, 4.0 mM, or 4.5 mM. In some aspects, the same nutrient feed solution as is used in the earlier feedings is used, but an increased volume is added in the later feedings to increase the amount of cystine added to the CCF. In other aspects, a modified nutrient feed solution can be used in the later feedings, where the remaining ingredients in the solution are kept at the same concentration but the concentration of cystine is increased. According to this aspect, the volume of NF solution added can remain constant.

Embodiments

Embodiment 1A: A method for increasing the yield of an intact disulfide bond-containing protein of interest in a cell culture or solution, comprising manufacturing the disulfide bond-containing protein of interest in the presence of a glutathione reductase inhibitor, a thioredoxin reductase inhibitor, or both a glutathione reductase inhibitor and a thioredoxin reductase inhibitor, whereby the amount of intact disulfide bond-containing protein is higher in the cell culture or solution manufactured in the presence of a glutathione reductase inhibitor, a thioredoxin reductase inhibitor, or a glutathione reductase inhibitor and a thioredoxin reductase inhibitor as compared to the amount of intact disulfide bond-containing protein in a cell culture or solution not manufactured in the presence of a glutathione reductase inhibitor, a thioredoxin reductase inhibitor, or a glutathione reductase inhibitor and a thioredoxin reductase inhibitor.

Embodiment 2A: A method for increasing the yield of an intact disulfide bond-containing protein of interest in a culture or solution in a manufacturing process, comprising: detecting the presence of glutathione reductase and/or thioredoxin reductase in the culture or solution containing the protein of interest, and adding a glutathione reductase and/or thioredoxin reductase inhibitor to the manufacturing process to mitigate reduction of the disulfide bond-containing protein of interest.

Embodiment 3A: The method of embodiment 2A, further comprising determining the activity of the glutathione reductase and/or thioredoxin reductase in the culture or solution.

Embodiment 4A: The method of embodiment 3A, wherein determining the activity of the glutathione reductase and/or thioredoxin reductase comprises: adding 5,5'-dithio-bis(2-nitrobenzoic acid) (DTNB) to a sample obtained during the manufacturing process; adding at least one of thioredoxin reductase inhibitor and glutathione reductase inhibitor to a portion of the sample containing DTNB; and monitoring reduction of DTNB at a wavelength of 412 nm in the sample; wherein a higher reduction of DTNB in the samples without at least one of thioredoxin reductase inhibitor and glutathione reductase inhibitor, indicates activity of thioredoxin reductase and/or glutathione reductase.

Embodiment 5A: The method of embodiment 4A, wherein NADPH, oxidized glutathione, and buffer are added to the sample prior to monitoring reduction of DTNB (or reductase activity).

Embodiment 6A: The method of any one of embodiments 3A to 5A, wherein the amount of thioredoxin reductase and/or glutathione reductase inhibitor added to the cell culture is proportional to the amount of thioredoxin reductase and/or glutathione reductase activity detected.

Embodiment 7A: The method of any one of embodiments 1A to 6A, wherein the disulfide bond-containing protein of interest is manufactured in the presence of a glutathione reductase inhibitor and a thioredoxin reductase inhibitor, and wherein the presence of the glutathione reductase inhibitor and the thioredoxin reductase inhibitor increases yield of intact disulfide bond-containing protein by at least 5 percent, at least 10 percent, at least 20 percent, at least 30 percent, or at least 40 percent as compared to manufacturing the disulfide bond-containing protein in the absence of the glutathione reductase inhibitor and the thioredoxin reductase inhibitor.

Embodiment 8A: The method of any one of embodiments 1A to 6A, wherein the disulfide bond-containing protein of interest is manufactured in the presence of a thioredoxin reductase inhibitor and not in the presence of a glutathione reductase inhibitor, and wherein the presence of the thioredoxin reductase inhibitor increases yield of intact disulfide bond-containing protein by at least 5 percent, at least 10 percent, at least 20 percent, at least 30 percent, or at least 40 percent as compared to manufacturing the disulfide bond-containing protein in the absence of the thioredoxin reductase inhibitor.

Embodiment 9A: The method of any one of embodiments 1A to 6A, wherein the disulfide bond-containing protein of interest is manufactured in the presence of a glutathione reductase inhibitor and not in the presence of a thioredoxin reductase inhibitor, and wherein the presence of the glutathione reductase inhibitor increases yield of intact disulfide bond-containing protein by at least 5 percent, at least 10 percent, at least 20 percent, at least 30 percent, or at least 40 percent as compared to manufacturing the disulfide bond-containing protein in the absence of the glutathione reductase inhibitor.

Embodiment 10A: The method of any one of embodiments 1A to 8A, wherein the thioredoxin reductase inhibitor is at least one of aurothioglucose (ATG), aurothiomalate (ATM), Auranofin, 2-[(1-methylpropyl)dithio]-1H-imidazole (PX 12), or any combinations thereof.

Embodiment 11A: The method of embodiment 10A, wherein the thioredoxin reductase inhibitor comprises ATG, ATM, or a combination of ATG and ATM.

Embodiment 12A: The method of embodiment 11A, wherein the thioredoxin reductase inhibitor comprises ATG and ATG and wherein the final concentration of ATG in the cell culture is about 0.1 to about 0.5 mM and the final concentration of ATM is about 0.1 to about 0.5 mM; or the final concentration of ATM is about 0.1 to about 0.5 mM and the concentration of ATG is about 0.1 to about 0.5 mM.

Embodiment 13A: The method of any one of embodiments 1A to 9A, wherein the glutathione reductase inhibitor is at least one of carmustine, 2-Acetylamino-3-[4-(2-acetylamino-2-carboxyethylsulfanylthio-carbonyl amino)phenylthiocarbamoylsulfanyl] propionic acid (2-AAPA), a $Cu^{2+}$ salt, a $Ni^{2+}$ salt, a $Ca^{2+}$ salt, or any combinations thereof.

Embodiment 14A: The method of embodiment 13A, wherein the glutathione reductase inhibitor comprises 2-AAPA, a $Cu^{2+}$ salt, or a combination of 2-AAPA and a $Cu^{2+}$ salt.

Embodiment 15A: The method of embodiment 14A, wherein the glutathione reductase inhibitor comprises 2-AAPA and a $Cu^{2+}$ salt, and wherein the final concentration of 2-AAPA is about 0.1 mM to about 0.25 mM, the final concentration of $Cu^{2+}$ salt is about 0.5 μM to less than about 50 μM, or the final concentration of 2-AAPA is about 0.1 mM to about 0.25 mM and the final concentration of $Cu^{2+}$ salt is about 1 μM to less than about 50 μM.

Embodiment 16A: The method of any one of embodiments 1A to 15A, further comprising manufacturing the disulfide bond-containing protein of interest in the presence of cystine, $Hg^{2+}$, $Zn^{2+}$, $Co^{2+}$, $Fe^{2+}$, $Cd^{2+}$, $Pb^{2+}$, $Mn^{2+}$, more than about 50 μM $Cu^{2+}$, or any combination thereof.

Embodiment 17A: The method of any one of embodiments 1A to 16A, further comprising manufacturing the disulfide bond-containing protein of interest in the presence of ethylenediamine tetraacetic acid (EDTA), ethylene glycol tetraacetic acid (EGTA), sorbose-1-phosphate, polyphosphates, 6-deoxy-6-fluoroglucose, 2-C-hydroxy-methylglucose, xylose, lyxose, or any combination thereof.

Embodiment 18A: The method of any one of embodiments 1A to 17A, further comprising manufacturing the disulfide-bond protein of interest under conditions of air or oxygen sparging, chilling, decreased pH during harvest, or any combination thereof.

Embodiment 19A: The method of any one of embodiments 1A to 18A, further comprising purifying the disulfide bond-containing protein of interest.

Embodiment 20A: The method of any one of embodiments 1A to 19A, wherein the disulfide bond-containing protein of interest is a recombinant protein manufactured in a host cell.

Embodiment 21A: The method of embodiment 20A, wherein the host cell is a Chinese Hamster Ovary (CHO) cell or an NS0 cell.

Embodiment 22A: The method of any one of embodiments 1A to 21A, wherein the thioredoxin reductase inhibitor and/or the glutathione reductase inhibitor are added during the harvesting step.

Embodiment 23A: The method of any one of embodiments 1A to 21A, wherein the thioredoxin reductase inhibitor and/or the glutathione reductase inhibitor are added during at least one of the purification steps.

Embodiment 24A: The method of embodiments 22A or 23A, wherein the thioredoxin reductase inhibitor and/or the glutathione reductase inhibitor are added during at least the harvesting step and during at least one of the purification steps.

Embodiment 25A: The method of any one of embodiments 1A to 24A, wherein the thioredoxin reductase inhibitor and/or the glutathione reductase inhibitor are present throughout the manufacturing process.

Embodiment 26A: The method of any one of embodiments 1A to 25A, wherein the manufacturing process comprises a harvesting step and or at least one purification step.

Embodiment 27A, the method of embodiment 26A, wherein the thioredoxin reductase inhibitor is ATG, wherein the ATG is added during the harvesting step, and wherein the yield of the intact disulfide bond-containing protein of interest is increased by about 20% to at least about 100%, as compared to the yield of the intact disulfide bond-containing protein of interest in the same manufacturing process in the absence of ATG.

Embodiment 28A, the method of embodiment 26A or 27A, wherein the thioredoxin reductase inhibitor is ATG, wherein the ATG is added during at least one purification step, and wherein the yield of the intact disulfide bond-containing protein of interest is increased by about 20% to at least about 100%, as compared to the yield of the intact disulfide bond-containing protein of interest in the same manufacturing process in the absence of ATG.

Embodiment 29A: The method of embodiment 26A, wherein the glutathione reductase inhibitor is a $Cu^{2+}$ salt, wherein the $Cu^{2+}$ salt is added during the harvesting step, and wherein the yield of the intact disulfide bond-containing protein of interest is increased by about 20% to about at least 100%, as compared to the yield of intact disulfide bond-containing protein manufactured by the same manufacturing process in the absence of the $Cu^{2+}$ salt.

Embodiment 30A. The method of embodiments 26A or 27A, wherein the glutathione reductase inhibitor is a $Cu^{2+}$ salt, wherein the $Cu^{2+}$ salt is added during at least one purification step, and wherein the yield of the intact disulfide bond-containing protein of interest is increased by about 20% to about at least 100%, as compared to the yield of intact disulfide bond-containing protein manufactured by the same manufacturing process in the absence of the $Cu^{2+}$ salt.

Embodiment 31A: The method of any one of embodiments 1A to 30A, wherein the disulfide bond-containing protein of interest is an antibody or antigen-binding fragment thereof.

Embodiment 32A: The method of embodiment 31A, wherein the antibody or fragment thereof is a monoclonal antibody, a bispecific antibody, a fusion protein, or an antibody drug conjugate, or fragment thereof.

Embodiment 33A: The method of embodiment 32A, wherein the antibody or fragment thereof is a monoclonal antibody or fragment thereof.

Embodiment 34A: The method of embodiment 33A, wherein the monoclonal antibody or fragment thereof is an IgG1, IgG2, or IgG4 antibody or fragment thereof.

Embodiment 35A: The method of any one of embodiments 1A to 17A, where the method for mitigating the potential for disulfide bond reduction is controlled via a redox probe measuring the cell culture redox potential where the control loop adjusts the reduction mitigation strategy in response to a decrease in the cell culture redox potential.

Embodiment 1B: A method for increasing the yield of an intact disulfide bond-containing protein of interest or diminishing the reduction potential of the disulfide bond-containing protein of interest in a cell culture or fermentation process by adding cystine to maintain the extracellular cystine levels in the cell culture or fermentation process above 0 during the production phase compared to the yield of the intact disulfide bond-containing protein or the reduction potential of the disulfide bond-containing protein in a cell culture or fermentation process in which the extracellular cystine levels are not maintained above 0 during the production phase.

Embodiment 2B: The method of embodiment 1B, wherein the intact disulfide bond-containing protein of interest is released into the cell culture fluid (CCF).

Embodiment 3B: The method of embodiment 2B, wherein the production phase comprises maintaining the cells in CCF for at least 2 days, at least 8 days, at least 10 days, at least 12 days, at least 14 days, or at least 16 days.

Embodiment 4B: The method of any one of embodiments 1B to 3B, wherein the cell culture process is a mammalian or insect cell culture process, and fermentation is a bacterial, yeast, or fungi process.

Embodiment 5B: The method of any of embodiments 1B to 4B, wherein cystine is added to the culture or fermentation to maintain the cystine levels above 0.

Embodiment 6B: The method of embodiment 5B, wherein the cystine levels are maintained above 0 during the production phase to prevent disulfide bond reduction.

Embodiment 7B: The method of embodiment 6B, wherein the potential for disulfide bond reduction is decreased relative to a process in which cystine levels are not maintained above 0 in the CCF.

Embodiment 8B: The method of any one of embodiments 1B to 7B, wherein the cystine levels are maintained at about 0.2 mM, at least 2.0 mM, at least about 2.5 mM, at least about 3.0 mM, at least about 3.5 mM, or at least about 4.0 mM.

Embodiment 9B: The method of any one of embodiments 1B to 8B, wherein the cystine levels are maintained above 0 in the CCF during the last 14 days, the last 12 days, the last 10 days, the last 8 days, the last 6 days, the last 4 days, the last 2 days, or the last day of the production phase.

Embodiment 10B: The method of any one of embodiments 1B to 9B, wherein the amount of cystine in the CCF is determined by ultra-performance liquid chromatography amino acid analysis of CCF samples taken at regular intervals during the production phase.

Embodiment 11B: The method of any one of embodiments 1B to 10B, wherein the production phase comprises adding a nutrient feed solution to the CCF, wherein the nutrient feed solution comprises cystine.

Embodiment 12B: The method of embodiment 11B, wherein the nutrient feed solution is added to the CCF at regular intervals during the production phase.

Embodiment 13B: The method of embodiment 12B, wherein the nutrient feed solution is added to the CCF about every day, about every two days, about every three days, about every four days, or about every five days during the production phase, and wherein one, two, three, four, five, six, seven, or eight additions of the nutrient feed solution occur during the production phase.

Embodiment 14B: The method of embodiment 13B, wherein the nutrient feed solution is added to the CCF about every two days, and wherein nutrient feed solution is added five or six times during the production phase.

Embodiment 15B: The method of any one of embodiments 10B to 14B, wherein the nutrient feed solution added in the second or later feeds comprises an increased cystine level relative to the nutrient feed solution added in the earlier feeds.

Embodiment 16B: The method of any one of embodiments 10B to 15B, wherein the cystine levels are maintained by increasing the cystine concentration in the starting medium or one of more of the nutrient feeds.

Embodiment 17B: The method of embodiment 16B, wherein composition of the nutrient feed solution is uniform throughout the production phases, and wherein an additional volume of nutrient feed solution is added throughout the additions, resulting in an increased amount of cystine in the culture or fermentation process.

Embodiment 18B: The method of embodiment 16B, wherein composition of the nutrient feed solution is uniform throughout the production phases, and wherein an additional volume of nutrient feed solution is added in the fifth addition, the sixth addition, or the fifth and sixth additions, resulting in an increased amount of cystine in the culture or fermentation process.

Embodiment 19B: The method of embodiment 16B or 17B, wherein the nutrient feed solution added in at least one of the fifth or sixth additions comprises at least about 10% more, at least about 20% more, at least about 30% more, at least about 40% more, at least about 50% more, at least about 60% more, at least about 70% more, at least about 80% more, at least about 90% more, or at least about 100% more cystine than the nutrient feed solution added in the first to fourth or first to fifth additions.

Embodiment 20B: The method of any one of embodiments 10B to 19B, wherein the nutrient feed solution further comprises at least one additional nutrient.

Embodiment 21B: The method of embodiment 20B, wherein the at least one additional nutrient comprises amino acids, glucose, vitamins, protein hydrolysate, or any combination thereof.

Embodiment 22B: The method of embodiment 20B or 21B, wherein the at least one additional nutrient is added to facilitate expression of the protein of interest in functional form.

Embodiment 23B: The method of any one of embodiments 10B to 22B, wherein the production phase further comprises adding an additional nutrient feed solution to the CCF, wherein the additional nutrient feed solution comprises at least one additional nutrient.

Embodiment 24B: The method of embodiment 23B, wherein the at least one additional nutrient comprises amino acids, glucose, vitamins, protein hydrolysate, or any combination thereof.

Embodiment 25B: The method of embodiment 23B or 24B, wherein the at least one additional nutrient is added to facilitate expression of the protein of interest in functional form.

Embodiment 26B: The method of any one of embodiments 5B to 25B, wherein the yield of the disulfide bond-containing protein of interest is increased by about 20% to 100%, relative to the yield of the disulfide bond-containing protein of interest manufactured in a process in which an effective amount of cystine is not maintained above 0 in the CCF.

Embodiment 27B: The method of any one of embodiments 5B to 26B, wherein the potential for disulfide bond reduction is measured by a method comprising storing a sample of the CCF obtained at a selected time point during the manufacturing process in a vacuum chamber, and measuring the level of fragmentation of the protein of interest relative to control sample.

Embodiment 28B: The method of embodiment 27B, wherein the level of fragmentation is measured using a bioanalyzer under non-reducing conditions.

Embodiment 29B: The method of embodiment 28B, wherein the bioanalyzer comprises a GX LabChip.

Embodiment 30B: The method of any one of embodiments 1B to 29B, wherein the disulfide bond-containing protein of interest is a recombinant protein.

The method of embodiment 30B, wherein the recombinant protein is obtained from transfecting a host cell with an expression plasmid encoding the disulfide-bond containing protein of interest.

Embodiment 31B: The method of embodiment 30B, wherein the protein of interest is secreted from the host cell.

Embodiment 32B: The method of embodiment 30B or 31B, wherein the host cell is a Chinese Hamster Ovary (CHO) cell or an NS0 cell.

Embodiment 33B: The method of any of embodiments 1B to 30B, wherein the disulfide bond-containing protein of interest is an antibody or antigen-binding fragment thereof.

Embodiment 34B: The method of any embodiment 33B, wherein the antibody or antigen-binding fragment thereof is monoclonal antibody or fragment thereof.

Embodiment 35B: The method of embodiment 34B, wherein the monoclonal antibody or fragment thereof is an IgG antibody or fragment thereof.

Embodiment 36B: The method of embodiment 35B, wherein the IgG is an IgG1, an IgG2, an IgG3, or an IgG4.

Embodiment 37B: The method of embodiment 33B, wherein the antibody or antigen-binding fragment thereof is an Fab, Fab', F(ab')2, or disulfide-linked Fvs (sdFv).

Embodiment 38B: The method of any one of embodiments 33B to 37B, wherein the antibody or fragment thereof is chimeric, human, or humanized.

Embodiment 39B: The method of any one of embodiments 1B to 38B, wherein the disulfide bond in the protein of interest is intermolecular or intramolecular.

Embodiment 40B: The method of any of embodiments 1B to 39B wherein the culture process is a batch process, a fed batch process, a repeated fed batch process, a perfusion process, a continuous process, or a combination thereof.

Embodiment 41B: The method of any one of embodiments 1B to 40B, wherein cystine levels are maintained in the culture or fermentation by directly adding at least one of a cystine solution, a nutrient feed, a nutrient solution, a solution containing monomeric cysteine, or a solution containing cystine.

Embodiment 42B: The method of embodiment 41B, wherein monomeric cysteine is converted to cystine under oxidizing conditions.

Embodiment 43B: The method of embodiment 1B, wherein cystine is added to the cell culture process to maintain cystine levels above 0 and/or Cu is added to the cell culture process to maintain levels above 0, and/or EDTA is added to the cell culture process prior to harvest to increase the yield of an intact disulfide bond-containing protein of interest or diminish the reduction or reduction potential of a disulfide bond-containing protein of interest in a cell culture or fermentation process.

Embodiment 44B: The method of embodiment 1B, wherein EDTA is added to the cell culture process at >9.5, >19, or >38 mM prior to harvest to increase the yield of an intact disulfide bond containing protein of interest or diminish the reduction or reduction potential of a disulfide bond containing protein of interest in a cell culture or fermentation process.

Embodiment 45B: The method of embodiment 1B, wherein cystine is added to the cell culture process at >4 or >8 mM prior to harvest to increase the yield of an intact disulfide bond containing protein of interest or diminish the reduction or reduction potential of a disulfide bond containing protein of interest in a cell culture or fermentation process Embodiment 1C: A method for improving stability of a purified disulfide bond-containing protein of interest, comprising using a manufacturing process that maintains the disulfide bond-containing protein of interest in a form with minimal free thiols, thereby mitigating reduction or reduction potential of the disulfide bond-containing protein of interest during the manufacturing process.

Embodiment 2C: The method of embodiment 1C, wherein the manufacturing process comprises a cell culture phase, a harvest phase, at least one hold phase, a purification phase, or any combination thereof.

Embodiment 3C: The method of embodiment 2C, wherein the hold phase comprises storing the material in any of the phases during the manufacturing process.

Embodiment 4C: The method of embodiment 3C, wherein the hold phase comprises storing harvested cell culture fluid (HCCF) for a period of up to one day, at least four days, at least one week, at least 10 days, at least two weeks, at least one month, or at least three months following the harvest phase and prior to the purification phase.

Embodiment 5C: The method of embodiment 4C, wherein minimizing free thiols in the disulfide bond-containing protein of interest comprises mitigating disulfide bond reduction throughout the manufacturing process.

Embodiment 6C: The method of any one of embodiments 4C or 5C, wherein the HCCF is stored at 2-8° C. in airtight bags during the hold phase.

Embodiment 7C: The method of any one of embodiments 2C to 6C, wherein the free thiol in the disulfide bond-containing protein of interest is maintained at less than 20%, less than 15%, less than 10%, less than 5%, or less than 1% throughout the hold phase.

Embodiment 8C: The method of embodiment 7C, wherein the free thiol in the disulfide bond-containing protein of interest is measured by mass spectrometry at the drug substance stage.

Embodiment 9C: The method of any one of the preceding embodiments, wherein the disulfide bond-containing protein of interest is an antibody or antigen-binding fragment thereof.

Embodiment 10C: The method of embodiment 9C, wherein free thiols are measured in the antibody in the light chain, in the heavy chain, in the hinge region, or in a combination thereof.

Embodiment 11C: The method of any one of embodiments 4C to 10C, wherein mitigating disulfide bond reduction comprises maintaining an effective amount of cystine, $Cu^{++}$, or cystine and $Cu^{++}$ in the HCCF during the hold phase or any portion thereof.

Embodiment 12C: The method of embodiment 11C, wherein the effective amount of cystine comprises at least about 2.0 mM, at least about 2.5 mM, at least about 3.0 mM, at least about 3.5 mM, or at least about 4.0 mM.

Embodiment 13C: The method of embodiment 11C or 12C, wherein the effective amount of $Cu^{++}$ comprises at least about 2.0 ppm, at least about 3.0 ppm, at least about 4.0 ppm, at least about 4.5 ppm, at least about 5.0 ppm, or at least about 5.5 ppm.

Embodiment 14C: The method of any one of embodiments 1C to 13C, wherein minimizing free thiols in the disulfide bond-containing protein of interest further comprises mitigating disulfide bond reduction in the harvest cell culture fluid (HCCF) during the production phase or any portion thereof, during the pre-harvesting phase or any portion thereof, during harvesting phase or any portion thereof, or any combination thereof.

Embodiment 15C: The method of embodiment 14C, wherein the mitigation of disulfide bond reduction comprises maintaining an effective amount of cystine, $Cu^{++}$, or cystine and $Cu^{++}$ in the CCF during the manufacturing process or any portion thereof.

Embodiment 16C: The method of embodiment 15C, wherein the manufacturing process comprises a cell culture phase, a harvest phase, at least one hold phase, a purification phase, or any combination thereof.

Embodiment 17C: The method of any one of embodiment 15C or 16C, wherein the effective amount of cystine comprises at least about 2.0 mM, at least about 2.5 mM, at least about 3.0 mM, at least about 3.5 mM, or at least about 4.0 mM.

Embodiment 18C: The method of any one of embodiments 15C to 17C, wherein the amount of cystine is adjusted to effectively mitigate disulfide bond reduction while minimizing the formation of cys adducts on the disulfide bond-containing protein of interest.

Embodiment 19C: The method of any one of embodiments 15C to 18C, wherein the effective amount of $Cu^{++}$ comprises at least about 2.0 ppm, at least about 3.0 ppm, at least about 4.0 ppm, at least about 4.5 ppm, at least about 5.0 ppm, or at least about 5.5 ppm.

Embodiment 20C: The method any one of embodiments 15C to 19C, wherein the effective amount of cystine, $Cu^{2+}$, or cystine and $Cu^{++}$ is maintained in the CCF during the last 14 days, the last 12 days, the last 10 days, the last 8 days, the last 6 days, the last 4 days, the last 2 days, or the last day of the manufacturing process.

Embodiment 21C: The method any one of embodiments 15C to 20C, wherein the effective amount of cystine, $Cu^{++}$, or cystine and $Cu^{++}$ is maintained during the entire manufacturing process.

Embodiment 22C: The method of any one of embodiments 15C to 21C, wherein the effective amount of cystine, $Cu^{++}$, or cystine and $Cu^{++}$ is maintained in the CCF by adding cystine, $Cu^{++}$, or cystine and $Cu^{++}$ supplements at regular intervals during the manufacturing process.

Embodiment 23C: The method of any one of embodiments 1C to 22C, wherein the manufacturing process comprises maintaining the cells in CCF for at least 8 days, at least 10 days, at least 12 days, at least 14 days, or at least 16 days.

Embodiment 24C: The method of embodiment 23C, wherein supplement addition occurs at least about every day, at least bout every two days, at least about every three days, at least about every four days, or at least about every five days during the manufacturing process.

Embodiment 25C: The method of embodiment 23C or 24C, wherein the supplement addition comprises adding a nutrient feed solution, wherein the nutrient feed solution comprises a sufficient amount of cystine, $Cu^{++}$, or cystine and $Cu^{++}$ to maintain the effective amount of cystine, $Cu^{++}$, or cystine and $Cu^{++}$ in the CCF.

Embodiment 26C: The method of embodiment 25C, wherein the nutrient feed solution further comprises at least one additional nutrient.

Embodiment 27C: The method of embodiment 26C, wherein the at least one additional nutrient comprises amino acids, glucose, vitamins, protein hydrolysate, or any combination thereof.

Embodiment 28C: The method any one of embodiments 14C to 27C, wherein the effective amount of cystine, $Cu^{++}$, or cystine and $Cu^{++}$ is maintained in the HCCF during the pre-harvest phase.

Embodiment 29C: The method any one of embodiments 14C to 28C, wherein the effective amount of cystine, $Cu^{++}$, or cystine and $Cu^{++}$ is maintained in the HCCF during the harvest phase or a portion thereof.

Embodiment 30C: The method of embodiment 29C, wherein the effective amount of cystine, $Cu^{++}$, or cystine and $Cu^{++}$ is maintained in the CCF throughout the harvest phase.

Embodiment 31C: The method of embodiment 30C, wherein the harvest phase is conducted so as to minimize cell lysis.

Embodiment 32C: The method of any one of embodiments 5C to 31C, wherein mitigation of disulfide bond reduction is measured using a Lab Chip.

Embodiment 33C: The method of embodiment 32C, wherein the Lab Chip is a non-reducing LabChip.

Embodiment 34C: The method of any one of embodiments 1C to 33C, wherein the disulfide bond containing protein of interest is expressed in a host cell transfected with an expression plasmid encoding the disulfide bond-containing protein of interest.

Embodiment 35C: The method of any one of embodiments 1C to 34C, wherein the minimizing free thiols on the purified disulfide bond-containing protein of interest results in minimized protein aggregation.

Embodiment 36C: The method of embodiment 35C, wherein protein aggregation is minimized by minimizing the extent of protein aggregation, the rate of aggregation, or a combination thereof.

Embodiment 37C: The method of embodiment 34C or 35C, wherein aggregation of the purified protein of interest is measured over time using size-exclusion chromatography, mass spectroscopy, or a combination thereof.

Embodiment 38C: The method of any one of embodiments 24C to 37C, wherein the purified disulfide bond-containing protein of interest is stored in bulk following purification, and aggregation is measured over the approved shelf-life of the protein of interest.

Embodiment 39C: The method of embodiment 38C, wherein the purified disulfide bond-containing protein of interest is stored at 5° C., and wherein the rate of aggregation is less than about 0.4% per month, less than about 0.3% per month, less than about 0.2% per month, less than about 0.1% per month, or less than about 0.05% per month.

Embodiment 40C: The method of embodiment 38C, wherein the purified disulfide bond-containing protein of interest is stored at 40° C., and wherein the rate of aggregation is less than about 2% per month, less than about 1.5% per month, less than about 1% per month, less than about 0.8% per month, or less than about 0.5% per month.

Embodiment 41C: The method of any of embodiments 1C to 40C, wherein the disulfide bond-containing protein of interest is a recombinant protein.

Embodiment 42C: The method of embodiment 41C, wherein recombinant protein is expressed in a host cell.

Embodiment 43C: The method of embodiment 42C, wherein the disulfide bond-containing protein of interest is secreted from the host cell.

Embodiment 44C: The method of embodiment 42C or 43C, wherein the host cell is a Chinese Hamster Ovary (CHO) cell or an NS0 cell.

Embodiment 45C: The method of any of embodiments 34C to 44C, wherein the disulfide bond-containing protein of interest is an antibody or antigen-binding fragment thereof.

Embodiment 46C: The method of embodiment 45C, wherein the antibody or fragment thereof is a monoclonal antibody or fragment thereof.

Embodiment 47C: The method of embodiment 46C, wherein the antibody or fragment thereof is an IgG1 antibody, an IgG2 antibody, an IgG3 antibody, an IgG4 antibody, or a fragment thereof.

Embodiment 48C: The method of any one of embodiments 45C to 47C, wherein the antibody or fragment thereof is an Fab, Fab', F(ab')2, or disulfide-linked Fvs (sdFv).

Embodiment 49C: The method of any one of embodiments 45C to 48C, wherein the antibody or fragment thereof is a chimeric antibody, a human antibody, a humanized antibody, or a fragment thereof.

Embodiment 50C: The method of any one of embodiments 1C to 49C, wherein the disulfide bond in the disulfide bond-containing protein of interest is intermolecular or intramolecular.

Embodiment 51C: The method of any one of embodiments 1C to 50C, wherein the disulfide bond-containing protein of interest comprises at least two disulfide bonds when properly folded.

Embodiment 52C: The method of any one of embodiments 1C to 34C, wherein the minimization of antibody disulfide bond reduction in the manufacturing process lowers free thiol levels on the purified disulfide bond-containing protein of interest and results in minimized protein aggregation.

Embodiment xx: The method of any one of claim where the minimization of disulfide bond reduction and/or disulfide bond reduction potential and/or free thiols is achieved by increasing Cu, Cystine, EDTA, or redox potential (by adding redox modifiers including metal ions (including $Zn^{2+}$, $Mn^{2+}$, $Fe^{3+}$, $Cu^{2+}$, $Se^{2+}$), cystine, dissolved oxygen, beta mercaptoethanol, glutathione, or a combination thereof) during any step of the manufacturing process (including bioreactor and harvest).

This disclosure employs, unless otherwise indicated, conventional techniques of cell biology, cell culture, molecular biology, transgenic biology, microbiology, recombinant DNA, and immunology, which are within the skill of the art. Such techniques are explained fully in the literature.

General principles of antibody engineering, protein engineering, antibodies and antibody-hapten binding, and standard methods in immunology are well known in the art. All of the published literature, patents, and patent applications cited herein, are incorporated herein by reference in their entireties.

The following examples are offered by way of illustration and not by way of limitation.

EXAMPLES

Reagents

Reduced β-nicotinamide adenine dinucleotide phosphate (NADPH), β-nicotinamide adenine dinucleotide phosphate hydrate ($NADP^+$), oxidized glutathione (GSSG), cupric sulfate ($CuSO4$), 5,5'-Dithiobis(2-nitrobenzoic acid) (DTNB), aurothioglucose (ATG), and 2-Acetylamino-3-[4-(2-acetylamino-2-carboxyethylsulfanylthiocarbonylamino)phenylthio-carbamoylsulfanyl]propionic acid hydrate (2-AAPA) are available from commercial sources (e.g., Sigma-Aldrich, St. Louis, MO). Rat recombinant Thioredoxin reductase 1 (TrxR1) is commercially available (e.g., Cayman Chemical, Ann Arbor, MI). Affinity resin 2'5' adenine dinucleotide phosphate (ADP) Sepharose 4B can be obtained from GE Healthcare, Pittsburgh, PA Anti-thioredoxin antibody, anti-glutathione reductase antibody, anti-glutaredoxin antibody, human recombinant thioredoxin (Trx1) and human recombinant glutathione reductase (GR) are available from Abcam, Cambridge, MA Anti-thioredoxin reductase antibody is available from Santa Cruz Biotechnology, Dallas, TX Reagents are used as received and without further purification.

Preparation of the Equipment

The 3 L autoclaveable bioreactor vessels (Applikon Biotechnology; Delft, The Netherlands) were connected with all peripheral equipment including probes, feed bottles, and other equipment with all ports sealed to form a closed, but vented system. The vessels were autoclaved for greater than 30 minutes at greater than 121° C. When the cycle was completed the sterile vessels were cooled to room temperature. The vessels were then charged with 1 L of sterile batch growth medium. Supervisory Control and Data Acquisition (SCADA) controllers were used to monitor and control process parameters. The 3 L bioreactors, each with 1 pitched blade impellor, were agitated at 280-300 RPM. Air was sparged into the 3 L reactors at a flow rate of 94 mL/min and $CO2$ was sparged into the reactors at 6 mL/min. The reactors were heated to the temperature setpoint. When the temperature, pH, and $CO_2$ reached steady state, the dissolved oxygen probes were calibrated to 94% air saturation and the pH was adjusted to the offline measurement using a blood gas analyzer (BGA). Applikon or Braun 50 L (steam-in-place) bioreactors were used for the larger scale runs. The 50 L bioreactors used a programmable logic controller (PLC) and human machine interface (HMI) from Allen Bradley for process control. The 50 L bioreactors, with two pitched blade impellors, were agitated at 70 RPM (Braun) or 110 RPM (Applikon).

Vial Thaw and Inoculum Expansion

A 1 mL vial of the Development Working Cell Bank (DWCB) of investigational IgG2 monoclonal antibody-A (mAb-A) was thawed from liquid nitrogen storage into 30 mL of the inoculum expansion medium in a 250 mL Nalgene vented-cap shake flask. The shake flasks were placed in a 37° C., 6% $CO_2$ incubator on a shaker platform at an agitation rate of 120 RPM. When the culture reached a viable cell density (VCD) of >2.5^6/mL the culture was split to 0.5-1.0^6/mL. The culture volume was expanded using successively larger shake flasks including 500 mL and 1 L Nalgene vented-cap shake flasks and Nalgene 2 L baffled vented-cap shake flasks to produce inoculum for the bioreactors. For expansion to 50 L bioreactors an additional expansion step was performed using 10 L Sartorius cultibags on a rocker platform with a 6% $CO_2$ sparge at 0.25 L/min. The temperature of the cultibags was controlled at 37° C., the rocker angle was 8°, and the rock rate was 25 RPM.

Production Bioreactor Operation (mAb-A)

The medium in the bioreactor was the same growth medium used for the inoculum expansion. The initial working volume was 1.5 L (45 L in the 50 L bioreactors). The split ratio of cells into the production bioreactor was 1:5 by volume (1 part cells and 4 parts medium) so at the time of inoculation 300 mL cells and an additional 200 mL of growth medium was charged into the 3 L vessels where temperature, pH, and DO were controlled. The culture was analyzed for growth using periodic viable cell counts using a ViCell XR cell counter. Offline measurements were collected periodically using a BGA Rapidpoint 400 to measure pH and pCO$_2$; using a Nova Bioprofile 400 Bioanalyzer to measure Glucose, Lactate, and Ammonia; using an Advanced Instruments Model 2020 freezing point osmometer to measure osmolality; using an Agilent 1100 HPLC with a Protein-A column to measure titer; and using an Waters Ultra Performance Liquid Chromatography (UPLC) Amino Acid Analysis System with the AccQ tag assay to measure amino acids. The culture was grown in the batch phase until the viable cell density reached 2.5^6/mL, the criteria to begin the supplemental nutrient feed scheme. The fed-batch process duration was about 14 days.

Feeding Scheme

The first nutrient feed (NF) was administered on the first day that the production bioreactor met the VCD criteria of 2.5^6 viable cells/mL. After the initial nutrient feed addition, subsequent nutrient feed additions were performed every other day. A total of 5 or 6 nutrient feed additions were administered to the bioreactor, each consisting of Part A and Part B. Nutrient feed Part A consisted of the majority of nutrient feed components including amino acids, vitamins, and other cell culture nutrients. Nutrient Feed Part B contained a basic solution of L-cystine and an additional component. Each nutrient feed addition consisted of different amounts of nutrient feed parts A and B, as noted in Table 1, below.

TABLE 1

Original (Control) Nutrient Feed Strategy.

| Nutrient Feed Part | Percent of Initial Bioreactor Working Volume | | | | | |
|---|---|---|---|---|---|---|
| | NF1 | NF2 | NF3 | NF4 | NF5 | NF6 |
| A | 2.7% | 3.35% | 3.35% | 3.35% | 3.0% | 3.0% |
| B | 0.16% | 0.2% | 0.2% | 0.2% | 0.18% | 0.18% |

Antibody Reduction Potential Assay (BioA/Vacuum)

Bioreactor samples (1 mL) were obtained daily and centrifuged at 3000-4000 RPM and the supernatant was frozen immediately at −80° C. On the day prior to the assay, the samples were removed from −80° C. storage, thawed, and placed in a vacuum chamber at room temperature overnight to induce reduction of the monoclonal antibody without the interference of oxygen. After the vacuum hold, the samples were analyzed for protein fragmentation under non-reducing conditions using a BioAnalyzer system (Agilent Technologies) or a LABCHIP® GXII system (PerkinElmer) to detect antibody fragments resulting from the breakage of the antibody's interchain disulfide bonds. The LabChip GX II assay reports a purity value which indicates the percent of the intact antibody (two heavy chains and two light chains) present in the sample.

Fragmentation and Reduced Species Analysis

Where samples were subjected to vacuum analysis, they were thawed and vortexed. Aliquots of about 400 μL were transferred into glass tubes. The tubes were placed in a small vacuum chamber sealed by screw-cap Mininert™ valves (VICI Valco Instruments, Houston, TX) that can offer on/off control. Vacuum was applied into vacuum chamber through silicon tubing, and the chamber was sealed. Argon gas was then applied into the chamber through silicon tubing until argon pressure was established and the chamber was again sealed. The process was repeated for three cycles of vacuum/argon following the above procedures, and then the chamber was sealed with argon inside. The chamber was then incubated overnight at room temperature.

Samples were stored frozen until analyzed. Once thawed, 400-600 μL of each sample was transferred to culture tubes and mixed in non-reducing sample buffer containing N-Ethylmaleimide (NEM). After being denatured and the free thiols being capped by NEM, the samples were analyzed using a Perkin Elmer Labchip® GXII (Perkin Elmer, Waltham, MA) to perform size fractionation and quantification. Using the Labchip® GXII, the protein and fragments were detected by laser-induced fluorescence and translated into gel-like images (bands) and electropherograms (peaks).

Antibody Aggregation Analysis

The percent of antibody aggregates was determined using standard size exclusion chromatography (HP-SEC) methods. An Agilent 1200 series system was used with a Tosoh Bioscience TSKgel G3000SW XL column (Tosoh Bioscience LLC, King of Prussia, PA) (7.8 mm×300 mm) at 1 mL/min flow rate using a mobile phase buffer of 0.1 M sodium phosphate, 0.1 M sodium sulfate, pH 6.8. The absorbance chromatography at 280 nm was used to quantify the results.

Free Thiol Quantitation in Harvested Cell Culture Fluid (HCCF)

The amount of free thiol in harvested cell culture fluid was determined by matching predicted masses of disulfide-linked peptides to observed masses from non-reducing Lys-C peptide mapping. Briefly, the sample was denatured and diluted prior to digestion with a serine protease. Following protease digestion, half of each reaction mixture was reduced by the addition of DTT. The digests were separated by RP-HPLC using a C18 column and analyzed using a UV-detector and an on-line mass spectrometer. Disulfide-bond linked peptides are only present in non-reducing runs and will disappear under reducing conditions.

Free Thiol Quantitation Assay

The free thiol assay evaluates the integrity of the disulfide connections in a protein by measuring the levels of free thiol groups on unpaired cysteine residues. Samples are incubated under native and denatured conditions with a compound (5, 5'-dithiobis-(2-nitrobenzoic acid) or DTNB) that binds to free thiol and releases a colored thiolate ion. The colored thiolate ion is detected with a UV-visible spectrophotometer. The concentration of free thiol is interpolated from a standard curve and the free thiol-to-antibody molar ratio is reported.

Chinese Hamster Ovary (CHO) cells were cultured in 3 L glass stirred tank bioreactors under conditions representative of large scale manufacturing processes with initial volumes of 1.5 L each. Culture conditions (temperature, pH, DO, and agitation) were controlled and monitored on-line. Off-line measurements of pH, dissolved gases (pO$_2$, pCO$_2$), sodium and metabolite concentrations (glucose, lactate, ammonia) were obtained with a BIOPROFILE® Analyzer (NOVA Biomedical, Waltham, MA) and RAPIDPOINT® 500 BGA system (Siemens, Malvern, PA). Cell growth was monitored with a VI-CELL® (Beckman Coulter, Indianapolis, IN) and titer was measured using protein-A affinity chromatography.

The CHO cell lines used in the examples were stably transfected with polycucleotides encoding immunoglobulins.

Antibody Reduction Assay

To evaluate the role of the thioredoxin and glutathione systems on antibody reduction, antibody reduction was determined with and without enzyme-specific inhibitor(s). Day 14 culture samples (cells+media) from 3 L bioreactors were stored frozen until all samples were ready for analysis. After thawing, the samples were centrifuged, filtered through 0.2 μm filters, the indicated concentration of reductase inhibitor was added, and the samples were stored in an oxygen free environment at room temperature overnight.

Briefly, the culture samples were thawed on ice; followed by centrifugation of the samples to remove cell pellets (i.e., for 3 minutes at 12,000 rpm), filtered through 0.2 μm filters, and the supernatant samples were stored on ice. After the addition of either nothing, 0.1 mM ATG, 3 μM $Cu^{2+}$, or both 0.1 mM ATG and 3 μM $Cu^{2+}$, to the supernatant samples, the samples were transferred to culture tubes and the tubes were vortexed to ensure the sample and inhibitor were well mixed. Cell culture tubes were placed in a vacuum chamber to purge oxygen from the samples by connecting the vacuum chamber to N2 gas and vacuum lines, vacuum was pulled from the chamber, followed by a one minute wait. The vacuum line was closed and the N2 line opened briefly, and then the vacuum step and addition of N2 were repeated twice. The vacuum chamber was then stored at room temperature overnight. The vacuum chamber was then stored at room temperature overnight. Samples were analyzed using the 2100 Bioanalyzer using the standard non-reduced procedure.

Antibody reduction in cell culture supernatant samples was measured by detecting the presence of reduced species via capillary electrophoresis using standard procedures on a 2100 Bioanalyzer system (Agilent Technologies, Santa Clara, CA). Samples were diluted 1-6 fold depending on titer and analyzed under non-reducing conditions following 2100 Bioanalyzer standard protocols. Supernatant samples from 3 L bioreactors were stored frozen until all samples had been acquired and were ready for analysis. Samples were thawed on ice and analyzed immediately to evaluate the amount of reduced antibody in the reactor on each day of the run.

Reductase Activity Assay

This assay allows determination of the total reductase activity in a culture sample, as well as determination of the individual contribution made by thioredoxin reductase and glutathione reductase to the total reductase activity of the sample. In this assay, culture samples (cells+media) from 3 L bioreactors were stored frozen until the end of the run, after which the samples were centrifuged to remove the cell pellet then the resulting supernatant was diluted 20-fold into 100 mM tris buffer, pH 7.4, containing 0.4 mM NADPH, 0.15 mM oxidized glutathione, and 3 mM DTNB with the indicated concentration of specific reductase inhibitor. Addition of the enzyme specific inhibitors to the samples allowed the total reductase activity to be determined as well as the individual activity from the thioredoxin and glutathione systems. Reductase activity was monitored by spectroscopic measurement of the increase in absorbance at a wavelength of 412 nm. The reduction of DTNB is caused by interaction of DTNB with both the thioredoxin system and the glutathione system. The detected increase in absorbance at this wavelength is caused by the reduction of DTNB (Amer, E S J, Biochim. Biophys. Acta—Gen. Subj., 1790:495-526, 2009).

The total reductase activity was determined in the absence of any inhibitor. The thioredoxin reductase inhibitor, ATG, completely inhibits the reductase activity of the thioredoxin system. Thus, the difference in activity between a sample with ATG, and a sample without any inhibitor, indicates the amount of reductase activity contributed the thioredoxin system. Similarly, the glutathione reductase inhibitor, 2-AAPA, completely inhibits the reductase activity of the glutathione system. Thus, the difference in reductase activity between a sample with 2-AAPA, and a sample without any inhibitor, indicates the amount of reductase activity contributed by the glutathione system. Although ATG and 2-AAPA are provided as exemplary specific inhibitors, other specific inhibitors discussed above can be employed in this assay instead of ATG and 2-AAPA.

Briefly, culture samples were thawed on ice. Thawed samples were centrifuged to remove cell pellets (for instance, 3 minutes at 12,000 rpm), and the supernatant samples were stored on ice. To the wells of a 96-well, clear bottom plate, the following reagents were added: 100 mM Tris Buffer, pH 7.4 (160 μL-X-Y-Z), where X is the volume of sample, which was either 10 μL, or 0 μL for the background wells, Y is the volume of ATG, which was either 4.1 μL, or 0 μL. The 4.1 μL addition yielded a final concentration of 0.5 μM ATG, Z is the volume of 2-AAPA, which was either 5.2 μL, or 0 μL. The 5.2 μL addition yielded a final concentration of 100 μM 2-AAPA, 10 μL NADPH, at a final concentration of 0.2 mM, ATG and/or 2-AAPA (at the indicated concentrations, or any reductase-specific inhibitor), and 10 μL of the cell culture supernatant from step. The samples were then allowed to incubate 5 minutes. Then the following reagents were added: 10 μL of oxidized glutathione, to a final concentration of 0.15 mM, and 10 μL of DTNB, to a final concentration of 3 mM. Each well was quickly mixed with a multi-channel pipette. The total volume in each well was about 200 μL. The absorbance at a wavelength of 412 nm was determined every 30 seconds, for 20 minutes.

Analysis

Activity of the reductases was calculated as follows. The change in absorbance per minute ($\Delta_{412}$) for each well was determined. Typically, the first 1-3 minutes and last 5-10 minutes were excluded due to lag time at the onset of the experiment and saturation of the detector/exhaustion of the reagents in the well towards the end of the assay. Next, the background was subtracted from each cell culture sample well ($\Delta_{412}$, sample–$\Delta_{412}$, background) to obtain the corrected value of $\Delta_{412}$, corrected. The activity was then calculated by the following equation:

$$\text{Activity } (\mu\text{mol/min/mL}) = \frac{\Delta_{412,corrected} \times \text{sample dilution}}{\varepsilon_{TNB}}$$

where, $\varepsilon_{TNB}$=6.22 $mM^{-1}$ $cm^{-1}$.

Western Blot Assays

Western blots were performed in various Examples noted below to detect reductase enzymes. In the Western Blot procedures, cell pellets from 3 L bioreactors were stored frozen until the end of the run after which standard methods were used to conduct the western blot as previously described (Handlogten, et al., Chem. Biol., 21:1445-1451, 2014). The primary antibodies were used at the indicated concentrations: anti-TrxR1 at 1/333, anti-Trx1 at 1/1000, anti-Grx at 1/333, and anti-GR at 1/2000.

Enzyme Purification

Reductases were purified from cell samples to verify the specificity of reductase inhibitors. A day 14 culture of mAb B (IgG antibody produced by CHO cell line B CHO-K1 SV) was pelleted by centrifugation, washed once with PBS and re-suspended in 50 mM tris buffer, pH 7.5. The solution was homogenized and filtered at 0.2 μm prior to loading onto a column of 2'5'-ADP Sepharose 4B resin. The reductases were eluted using a linearly increasing gradient of 0 to 0.3 mM $NADP^+$ in the same tris buffer (Yadav, et al., Parasitol. Int., 62:193-198, 2013). The reductase activity of the collected fractions was determined using the assay described in Example 3. Additionally, western blot analysis was used to detect TrxR1 and GR in the collected fractions.

Harvested Cell Culture Fluid Purification

Purification was performed using Protein A resin (Mab-SelectSuRe, GE Healthcare) as a capture step to recover the mAb from the harvested cell culture fluid (HCCF), followed by low pH treatment for viral inactivation. Intermediate and final polishing chromatography steps include anion exchange (Super Q 650-M, Tosoh Bioscience) and cation exchange (POROS 50HS resin, Thermo Fisher Scientific) chromatography, respectively. The product was subsequently formulated into drug substance using ultrafiltration/diafiltration.

Example 1: Antibody Reduction During Manufacturing

To determine the amount of reduction experienced by disulfide bond-containing proteins during the cell culture phase of the manufacturing process, three different monoclonal antibodies were manufactured in three different cell lines and the degree of reduction of the molecules measured. In this experiment, three monoclonal antibodies, mAb A, mAb B, and mAb C, were produced in cell lines A (CHO CAT-S), B (CHO-K1SV), and C (CHO-K1SV), respectively. Monoclonal antibody mAb A is an IgG1 molecule, mAb B is an IgG2 molecule, and mAb C is an IgG4, molecule. All three processes have similar cell growth, cell viability, and titer production. Additionally, all three expression systems produced reductase activity during the manufacturing processes. The amount of reduced antibody in each cell culture supernatant was determined starting on day 6 of the culture. The degree of reduction of mAb molecules was determined by capillary electrophoresis following the procedure described above. As shown in FIG. 2A, in all three expression systems, the percent of intact antibody decreased with time starting at day 8, with cell line B yielding the highest degree of antibody reduction, and cell line C yielding the highest amount of intact antibody at day 14.

To determine if there was a correlation in each expression system between the amount of antibody reduction detected and reductase activity, the total reductase activity in each cell culture sample was evaluated using the colorimetric reductase assay protocol described in Example 3, above. As seen in FIG. 2B, all three expression systems produced increased reductase activity over the 14 day cell culture. Similar amounts of day 14 cell culture reductase activity was observed for cell lines A and C, while cell line B exhibited nearly twice the level of reductase activity as compared to cell lines A and C. The higher reductase activity associated with cell line B yielded a higher percent of reduced mAb B, as compared to mAb A and mAb C, each of which were produced by an expression system that produced approximately half the reductase activity of cell line B.

Example 2: Detection of Thioredoxin and Glutathione Systems

To confirm that the three cell lines analyzed expressed TrxR1, Trx1, G R, and Grx, Western blot analysis was conducted on cell pellets from days 6 and 10 of the individual cell cultures to detect the expression of the enzymes of the glutathione and thioredoxin systems. All three cell lines express TrxR1, Trx1, G R, and Grx, the molecules needed for active thioredoxin and glutathione systems. Previous work demonstrated that glutathione was present in CHO cells at concentrations exceeding 10 mM (Lin, et al., 1992, *Ann. N. Y. Acad. Sci.*, 665:117-126).

Example 3: Impact of Glutathione and Thioredoxin Systems on Antibody Reduction

The role of each enzymatic system in antibody reduction was evaluated by determining the conditions under which these reductase systems cause antibody reduction. Using purified recombinant mammalian reductases, the thioredoxin system was evaluated by spiking purified mAb B into five solutions containing: 1) no enzymes, 2) 1 µM TrxR1, 3) 0.1 µM TrxR1, 4) 2.5 µM Trx1, and 5) 0.1 µM TrxR1+2.5 µM Trx1. All samples contained 0.4 mM NADPH and were stored at room temperature overnight. Digital gel-like images were obtained from microchip-based capillary electrophoresis analysis. Consistent with the results above, mAb B was reduced only in the presence of both TrxR1 and Trx1, thereby demonstrating the necessity of both enzymes in the thioredoxin system (TrxR1 and Trx1) for reduction to occur.

Using the same approach with recombinant mammalian enzymes, the glutathione system was evaluated by spiking mAb B into five solutions containing: 1) no enzyme, 2) 1 mM GSSG (oxidized glutathione), 3) 0.2 µM GR (glutathione reductase), 4) 0.2 µM GR with 1 mM GSSG, and 5) 0.02 µM GR with 1 mM GSSG. As before, all samples were prepared in tris buffer, pH 7.4, containing 0.4 mM NADPH, and were stored at room temperature overnight. The results indicated a minimal mAb B reduction in the solutions containing GSSG alone. This is the result of an impurity in the GSSG. The oxidized glutathione, which does not cause reduction, contains ~2% reduced glutathione, which does cause reduction. The mAb A was reduced in the solutions containing both GR and GSSG. These results are consistent with a mechanism involving reduction of GSSG by GR to produce GSH (reduced glutathione), which subsequently reduces the disulfide bonds of mAb B.

Similar results were obtained when performing these assays in the presence of either mAb A or mAb C. In both cases the thioredoxin system and the glutathione system appear to have a role in antibody reduction during protein manufacturing processes.

Example 4: Evaluation of Specific Reductase Inhibitors

To determine the level of reductase activity of the thioredoxin and glutathione systems in cell culture samples, the specificities of various inhibitors for each of these enzymatic systems were evaluated. TrxR1 is the primary enzyme that reduces Trx1 and is therefore the central component of the thioredoxin system and a target for inhibition. GR is the analogous central component of the glutathione system. Consequently inhibition of the activity of TrxR1 causes inhibition of the entire thioredoxin system, and inhibition of the activity of GR causes inhibition of the entire glutathione system. There are several commercially-available inhibitors of TrxR1 and GR, and the specificities of these inhibitors can be empirically ascertained to allow for the quantification of the reductase activity from each enzymatic system. Several inhibitors were screened, and ATG was selected as the inhibitor of TrxR1, and 2-AAPA was initially selected as the inhibitor of GR.

The specificities of ATG and 2-AAPA were evaluated using purified recombinant reductases from human and rat. Solutions of the purified recombinant enzymes were prepared such that the reductase activity of the solutions was similar to the activity observed in the culture samples shown in FIG. 2B. Solutions containing recombinant TrxR1/Trx1, GR/GSSG, or both enzymatic systems were prepared with increasing concentrations of ATG ranging from 0.05 μM to 5 μM. All samples were prepared in Tris buffer, pH 7.4 containing 0.4 mM NADPH. Reductase activity was determined by monitoring the reduction of DTNB as explained above. As seen in FIG. 3A, the reductase activity of the solutions containing TrxR1/Trx1 decreased with increasing concentrations of ATG. At ATG concentrations higher than 0.1 μM the TrxR1/Trx1 reductase activity was negligible. The reductase activity of the solutions containing GR/GSSG were unaffected by ATG concentrations lower than 5 μM. The reductase activity of solutions containing both the thioredoxin and glutathione systems was approximately equal to the combined activity of the samples containing TrxR1/Trx1 and the samples containing GR/GSSG at all concentrations of ATG. This result supports the conclusion that one enzymatic system can be selectively inhibited without affecting the activity of the other enzymatic system.

In a similar manner the GR inhibitor, 2-Acetylamino-3-[4-(2-acetylamino-2-carboxyethylsulfanylthiocarbonylamino)phenylthiocarbamoylsulfanyl]propionic acid (2-AAPA, Seefeldt et al, 2009., *J. Biol. Chem.*, 284:2729-2737), was evaluated. Solutions containing TrxR1/Trx1, GR/GSSG, or both enzymatic systems, were prepared in the presence of increasing concentrations of 2-AAPA, ranging from no inhibitor (0 μM), or 10 μM to 200 μM, and the reductase activity was determined according to the protocol set forth above. As shown in FIG. 3B, over this concentration range, 2-AAPA had a minimal effect on the reductase activity of TrxR1/Trx1 solutions while completely inhibiting GR/GSSG activity at 100 μM and higher concentrations. Similar to the previous results, the activity of the solutions containing both enzymatic systems was approximately equal to the addition of the activity from the TrxR1/Trx1 and GR/GSSG solutions, providing further evidence that one enzymatic system can be selectively inhibited without affecting the reductase activity of the other reductase system. In summary, 2-AAPA was a specific inhibitor of the glutathione system activity at concentrations from 50 to 200 μM and ATG was a specific inhibitor of thioredoxin system activity at concentrations from 0.5 to 1 μM. Furthermore, the difference in the reductase activity without an inhibitor and with either ATG or 2-AAPA was the activity from the thioredoxin and glutathione systems, respectively.

Example 5: Impact of Specific Reductases on Protein Reduction

To confirm that the activity from a particular reductase system can translate into reduced antibody, a second method was developed to determine the impact of each reductase system on antibody reduction. The principle of the reduction assay is similar to the reductase activity assay described above. The percent of protein reduction without an inhibitor was compared to the percent of protein reduction in the presence of specific inhibitors for GR or TrxR1. In this assay, purified mAb B was spiked into solutions containing recombinant mammalian TrxR1/Trx1 or recombinant mammalian GR/GSSG and stored in an oxygen-free environment overnight. The percent of reduced mAb B antibody was evaluated using capillary electrophoresis, as set forth above.

The TrxR1 inhibitor, ATG, was evaluated at concentrations ranging from 0 to 1 mM. As seen in FIG. 4A, at 0.1 mM, ATG specifically inhibited reduction from the thioredoxin system as indicated by the complete inhibition of antibody reduction in the sample containing TrxR1/Trx1 (black bars) and the complete reduction of the antibody in the sample containing GR/GSSG (gray bars). At higher concentrations, ATG was no longer specific for the thioredoxin system, as indicated by the increasing amount of intact antibody in the GR/GSSG samples treated with 0.5 mM and 1 mM ATG. Consequently, to evaluate the amount of reduced antibody caused by the thioredoxin system, ATG was included in the cell culture samples at 0.1 mM, a concentration in which it specifically prevents reduction caused by TrxR1/Trx1.

The GR inhibitor, 2-AAPA, functions by forming a covalent bond to the cysteine residues in the active site of GR. 2-AAPA was initially evaluated using the same method described for ATG, above, but 2-AAPA directly caused antibody reduction making it unsuitable for this assay. Consequently, the GR inhibitor copper (II) sulfate (CuSO4), was used instead (Rafter, G. W., 1982, *Biochem. Med.*, 27:381-391). A concentration of $Cu^{2+}$ ranging from 0 to 100 μM was investigated. The results shown in FIG. 4B indicate that $Cu^{2+}$ concentrations from 3-100 μM prevented antibody reduction in the samples containing GR/GSSG (gray bars). However, antibody reduction from the thioredoxin system was only partially inhibited over the same concentration range (black bars). The greatest difference in the amount of antibody reduction caused by the two reductase systems occurred at 3 μM $Cu^{2+}$, where antibody reduction caused by GR/GSSG was almost completely inhibited while antibody reduction caused by TrxR1/Trx1 was partially inhibited, as indicated by the 20% intact antibody remaining in the TrxR1/Trx1 sample. These results show that while 3 μM $Cu^{2+}$ was not a perfectly specific inhibitor for GR, this concentration of $Cu^{2+}$ has a greater effect on inhibiting reduction caused by the glutathione system as compared to the thioredoxin system and is therefore suitable to evaluate the role of the glutathione system on antibody reduction.

Example 6: Correlation of Cellular Reductase Sensitivity with Reductase-Specific Inhibitors The reductase-specific inhibitors were evaluated above using purified recombinant mammalian enzymes from rat and human. To ensure that the reductase enzymes produced by cell cultures are similarly affected by the same inhibitor concentrations, GR and TrxR1 enzymes were purified from a day 14 culture of cell line B using a 2'5'-ADP affinity column. This column retains enzymes that use NADPH as a cofactor. The reductases were eluted with a linearly increasing gradient of $NADP^+$. Western blot analysis revealed that GR and TrxR1 co-eluted in column fractions B1-C2. As shown in FIG. 5A, using the specific reductase inhibitors, 0.5 μM ATG and 100 μM 2-AAPA, it was determined that 60-75% of the reductase activity was from TrxR1 and 25-40% was from glutathione reductase, depending on the fraction. The added activity from the two systems was approximately equal to the total activity detected in the absence of an inhibitor for each fraction. This further demonstrates the specificities of the inhibitors. That is, if the reductase inhibitors were non-specifically inhibiting both enzymatic systems, the added reductase activity would have been greater than the reductase activity detected without any added inhibitor. As a further confirmation, when both inhibitors ATG and 2-AAPA were added to the samples, reductase activity was completely inhibited. This result further demonstrates the effectiveness and specificity of the reductase inhibitors. The fractions with reductase activity were pooled and further evaluated at the inhibitor concentrations assayed in the antibody reduction assay.

Purified mAb B was spiked into several solutions containing different combinations of the pooled fractions (PF), recombinant Trx1, GSSG, NADPH, ATG, and $Cu^{2+}$. The solutions were incubated at room temperature overnight and the amount of intact antibody remaining was determined by capillary electrophoresis according to the protocol described above. In the first set of samples, purified mAb B was spiked into the pooled fractions with, and without, NADPH. As seen in FIG. 5B, neither of these samples exhibited antibody reduction activity, demonstrating that GR and TrxR1 alone cannot reduce antibodies, even in the presence of NADPH.

In the second set of samples, purified mAb B was spiked into solutions containing the pooled enzymes, NADPH, GSSG, and either no inhibitor, 3 µM $Cu^{2+}$, or 100 µM ATG. As shown in FIG. 5B, the solution containing the pooled enzymes, NADPH, and GSSG exhibited measurable antibody reduction. This solution contained GR, GSSG, and NADPH, which are needed for the glutathione system. Furthermore, $Cu^{2+}$ completely inhibited all antibody reduction, while ATG did not inhibit antibody reduction, indicating that 3 µM $Cu^{2+}$ is sufficient to completely prevent antibody reduction by the glutathione system, while 100 µM ATG has no effect on antibody reduction by GR isolated from CHO cell culture.

The third set of solutions contained the pooled enzymes, NADPH, Trx1, and either no inhibitor, 3 µM $Cu^{2+}$, or 100 µM ATG. As depicted in FIG. 5B, the solution containing the pooled enzymes, NADPH, and Trx1 exhibited complete antibody reduction, while $Cu^{2+}$ marginally prevented antibody reduction, and ATG completely prevented reduction. This result again confirms the specificity of ATG for TrxR1. In the final sample as a control, mAb B was spiked into a solution containing NADPH, Trx1, and GSSG. As seen in FIG. 5B, in this sample, no antibody reduction was detected, demonstrating that the GR or TrxR1 purified from CHO cell cultures were needed for antibody reduction.

Taken together, the results of this Example demonstrate that the reductase enzymes isolated from cell cultures possess similar sensitivities to the inhibitor concentrations as observed with the recombinant rat and human reductases. These results demonstrate that ATG and $Cu^{2+}$ can be reductase-specific inhibitors of protein reduction caused by the thioredoxin and glutathione systems, respectively. Further, in the sample containing the pooled enzymes with added NADPH, and GSSG, there was still ~30% intact mAb remaining in the sample at the end of the assay, while the antibody was completely reduced in the analogous sample containing Trx1. This was likely a reflection of the higher relative activity of TrxR1 (60-75%) to GR (25-40%) in the pooled fractions.

Example 7: Inhibition of Reductase Activity in Culture Samples

The reductase activities of the thioredoxin and glutathione systems were evaluated in day 14 culture samples of the same CHO cell lines A, B, C, and D, using the previously evaluated specific inhibitors 2-AAPA and ATG at 100 µM and 0.5 µM respectively. Data in FIG. 6A were normalized to viable cell density. Cell lines A, B, and C were described in Example 6, above. Cell line D is the cell line CHO CAT-S, and is stably transfected to produce an IgG1 mAb (mAb D).

The results shown in FIG. 6A indicate that in the absence of a reductase inhibitor, cell line B exhibited approximately twice the reductase activity of cell lines A and C, and cell line D exhibited about half the reductase activity of cell lines A and C. For all four cell lines, when both 2-AAPA and ATG were added, the reductase activity was negligible. This indicated that a combination of 2-AAPA and ATG was sufficient for complete inhibition of reductase activity.

The reductase activity with either ATG or 2-AAPA was compared to the activity without an inhibitor to determine the amount of activity from the thioredoxin and glutathione systems and the data is shown in FIG. 6B. Through the use of the TrxR1-specific inhibitor, ATG, it was determined that 35%, 60%, 87%, and 60%, respectively, of the total reductase activity in cell lines A, B, C, and D, was from the thioredoxin system. Similarly, the results with the GR-specific inhibitor, 2-AAPA, demonstrated that 70%, 45%, 5%, and 45%, of the total reductase activity was caused by the glutathione system in cell lines A, B, C, and D, respectively. The data show that the contribution of reductase activity from each reductase system varied from cell line to cell line.

These results demonstrated high variability in the activities of the thioredoxin and glutathione systems across different cell lines/processes. Cell line A had a high percent of reductase activity attributable to the glutathione system, cell lines B and D had relatively equivalent levels of reductase activity attributable to each of the thioredoxin and glutathione systems, while in contrast most of the reductase activity observed in cell line C was attributable to the thioredoxin system.

Example 8: Antibody Reduction Exhibited by Cell Culture Samples

The effect of the thioredoxin and glutathione systems on antibody reduction was determined using day 14 culture samples (cells+media) from cell lines A, B, C, and D as described in Example 2. Samples were prepared with and without inhibitors and were incubated overnight in an oxygen free environment and the percent of reduced antibody was determined using capillary electrophoresis and the results shown in FIG. 7. In the absence of a reductase inhibitor all four mAbs from the four cell lines were reduced. In the presence of 100 µM ATG, mAb A was completely reduced, while about 67.5%, about 87%, and about 35% of mAb B, mAb C, and mAb D remained intact, respectively. In the presence of 3 µM $Cu^{2+}$, mAb A remained intact, while mAb B and mAb C were each approximately 50% reduced and about 20% of mAb D remained intact. In the presence of both ATG and $Cu^{2+}$, the detectable antibody reduction was blocked for all three antibodies.

The TrxR1 inhibitor failed to prevent mAb A reduction yet the GR inhibitor prevented mAb A reduction. Similarly, the combination of both inhibitors prevented reduction. These results indicate that mAb A reduction was primarily caused by the glutathione system, with very little involvement of the thioredoxin system. The TrxR1 and GR inhibitors each partially prevented mAb B reduction, while the combination of both inhibitors completely prevented reduction. These results demonstrated the involvement of both enzyme systems in mAb B reduction.

Similarly, in the presence of the TrxR1 inhibitor, mAb D experienced substantial reduction (about 35% intact), and in the presence of the GR inhibitor mAb D also experienced substantial reduction (about 20% intact). However, when both inhibitors were included the percent of intact mAb D raised to about 80% demonstrating the involvement of both enzyme systems in mAb D reduction.

In the presence of the TrxR1 inhibitor, mAb C experienced minor reduction (about 87% intact), and in the presence of the GR inhibitor mAb C experienced significant reduction (about 46% intact). As determined above, $Cu^{2+}$ partially inhibited the thioredoxin system. Combined these results demonstrated mAb C is primarily reduced by the thioredoxin system.

Example 9: Reduction Potential During Protein Manufacturing

The potential for disulfide bond reduction was observed during the downstream processing of a 50 L bioreactor run producing an IgG2 monoclonal antibody (mAb-B). An investigation of reduction potential using the vacuum/GX assay described above showed the potential for the reduction of the monoclonal antibody interchain disulfide bonds during the fed-batch bioreactor process for at least this mAb. Different levels of reduction potential were observed in samples obtained at days 8 through 14 of the Bioreactor Run A (BR-A). As shown in Table 2, below, reduction potential was observed during days 11-13 in several bioreactor runs at different scales.

TABLE 2

Purity of Intact Mab-A in Bioreactor Samples by Vacuum/GX Assay.

| Run# | Bioreactor Scale | Purity (% intact MAb) | | | | | | |
|------|------|------|------|------|------|------|------|------|
| | | Day 8 | Day 9 | Day 10 | Day 11 | Day 12 | Day 13 | Day 14 |
| BR-A | 50 L | 75.3 | 77.3 | 78.2 | 33.1 | 17.1 | 9.4 | 80.6 |
| BR-B | 50 L | 73.1 | #N/A | #N/A | 36.6 | #N/A | #N/A | 37.4 |
| BR-C | 3 L  | 75.1 | #N/A | 82.9 | #N/A | 44.5 | #N/A | 84.8 |
| BR-D | 3 L  | 73.9 | #N/A | 81.4 | #N/A | 23.0 | #N/A | 84.0 |

N/A indicates no testing was performed.

The concentrations of all amino acids were determined by UPLC amino acid analysis according to manufacturer's specifications in bioreactor samples taken throughout runs BR-A through BR-D. These results showed that the reduced concentration of cysteine/cystine correlated with increased reduction potential. A comparison of the results in FIG. 8 with the fragmentation results shown in Table 2 indicates that the reduction potential correlated with the level of cystine in the cell culture medium. As the cystine was depleted or nearly depleted by days 11 to 13, an increase in reduction potential was observed. On Day 14, the cystine levels were elevated due to nutrient feed (NF) additions that occurred on Day 13, and a diminished reduction potential was observed.

Example 10: Preventing Antibody Reduction Via Cell Culture Redox Potential

The cell culture redox potential was used to monitor the likelihood of antibody interchain disulfide bond reduction occurring in a bioreactor.

The cell culture redox potential was measured online via a redox probe (Metler Toledo). An increase in the cell culture redox potential indicates a more oxidizing environment while a lower cell culture redox potential indicates a more reducing environment. Processes where the culture redox potential was maintained above −55 mV or above −70 mV had minimal amounts of reduced antibody for mAb A and mAb B, respectively. Processes where the cell culture redox potential was below −55 mV or below −70 mV had variable and high levels of reduced mAb A and mAb B respectively (FIG. 9A and FIG. 9B). This analysis included data from >20 different process at the 3 L scale where reduction was either not controlled or controlled through the addition of different concentrations of $Zn^{2+}$, $Mn^{2+}$, $Fe^{3+}$, $Cu^{2+}$, $Se^{2+}$, cystine, dissolved oxygen, beta mercaptoethanol, and glutathione. The results demonstrated that, irrespective of the reduction mitigation strategy used, as long as the cell culture redox potential was maintained above a threshold value of −55 mV for mAb A or −70 mV for mAb B, the amount of reduced antibody was minimized. The threshold value required to prevent reduction can be further calibrated if needed based on the characteristics of the therapeutic protein, cell line, basal medium, or redox probe calibration.

The methods disclosed can be used to evaluate the effectiveness of the reduction mitigation strategy via the online redox measurement. With maintenance of the redox potential above the identified threshold value, a reduction mitigation strategy is achieved. Additionally, the redox probe can be combined with a control system that automatically adjusts the reduction mitigation strategy to maintain the cell culture redox potential above the threshold where reduction is unlikely to occur. The control system can be used to increase the concentration of $Zn^{2+}$, $Mn^{2+}$, $Fe^{3+}$, $Cu^{2+}$, $Se^{2+}$, cystine, dissolved oxygen, beta mercaptoethanol, or glutathione in response to a decrease in the cell culture redox potential. Using a control system based on the cell culture redox potential prevents the unnecessary over-addition of the chemical mitigator (or increase in DO set point). This is advantageous as the chemical required to prevent reduction must be cleared by the downstream purification process and elevated DO can reduce the final process titer.

Example 11: Bioreactor Protein Manufacturing Run BR-E

In this example, a four-part small-scale (3 L) bioreactor study with mAb-B (BR-E), a fed-batch process was conducted whereby the amount of nutrient feed, including parts A and B as described above, was increased in the 5th of five NF additions (at day 11) as indicated in Table 3, below. Bioreactor samples were obtained on days 10, 12, 14, and 16 and were analyzed for reduction potential using the vacuum/GX assay. Images of intact antibodies and antibody fragments visualized using LabChip GX assays on samples from mAb-B from the BR-E 3 L Bioreactor Study, supplemented with different amounts of nutrient feed 5 (NF5), and analyzed at different time points of production bioreactor run indicated that the degree of fragmentation was lowered with increasing amounts of NF5. As shown by fewer and lighter fragment bands and increasing purity of the intact antibody in the bioreactor samples obtained at Days 12, 14, and 16. This data is summarized in Table 3, below.

TABLE 3

Purity of Intact mAb-A Measured by GX/Vacuum Assay of Bioreactor Study with Increased Nutrient Feed at NF5

| Run# | NF5 Part A/B Amount % of Control | Purity (% intact antibody) | | | |
|---|---|---|---|---|---|
| | | Day 10 | Day 12 | Day 14 | Day 16 |
| BR-E control | 100% | 82.0 | 3.6 | 2.9 | 1.2 |
| BR-E-150 | 150% | 83.7 | 4.4 | 1.5 | 17.7 |
| BR-E-200 | 200% | 83.8 | 85.1 | 29.5 | 4.1 |
| BR-E-250 | 250% | 84.1 | 79.3 | 49.5 | 33.2 |

Example 12: Bioreactor Protein Manufacturing Run BR-F

In this example, six 3 L scale bioreactors with mAb-B were operated in a fed-batch process with modifications to the nutrient feed protocol by increasing the amounts of NF Part B in the NF3, NF4, and NF5 additions to 125%, 200%, and 200% of the control volumes with and without an increase in the NF5 addition of NF Part A to 200% of the control amount as indicated in Table 4, below. Cell culture samples were retained and frozen on Day 10 for some runs, and Day 12 and Day 14 for all the samples of the bioreactor. Samples were later analyzed using the Vacuum/GX analytical assay described above. mAb-B BR-F stored under vacuum and sampled at days 10, 12, and 14 was visualized using LabChip GX assays. The vacuum assay results are summarized in Table 4, below. The purity of the intact MAb decreased significantly in the bioreactors receiving the control amount of NF Part B. However, conditions with increased amounts of NF Part B showed no antibody reduction or decrease in the purity of the intact antibody in samples from Day 12 or Day 14 after vacuum treatment, as measured by the non-reduced GX assay.

TABLE 4

Purity (%) of Intact mAb-A in Bioreactor Samples as Measured by Vacuum/GX assay with Increased Amounts of NF Parts A and B or Increased Amounts of NF Part B Only.

| | Nutrient Feed Amount (% of Control Volume) | | | | | | Vacuum/GX Assay Result | | |
|---|---|---|---|---|---|---|---|---|---|
| | NF3 | | NF4 | | NF5 | | Purity (%) | | |
| Run# | Part A | Part B | Part A | Part B | Part A | Part B | Day 10 | Day 12 | Day 14 |
| BR-F-1 | 100 | 100 | 100 | 100 | 100 | 100 | 83.4 | 22.5 | 8.4 |
| BR-F-2 | | | | | | | 84.2 | 77.4 | 49.6 |
| BR-F-3 | 100 | 125 | 100 | 200 | 100 | 200 | 83.8 | 85.1 | 86.7 |
| BR-F-4 | | | | | | | 86.1 | 86.8 | 87.0 |
| BR-F-5 | 100 | 125 | 100 | 200 | 200 | 200 | #n/a | 83.6 | 82.4 |
| BR-F-6 | | | | | | | #n/a | 84.7 | 84.8 |

Example 13: Bioreactor Protein Manufacturing Runs BR-G, BR-H, and BR-I

In this example, two 3 L (BR-G and BR-H) and 50 L (BR-I) bioreactors with mAb-B were operated using a fed-batch (2-part feed) process. The bioreactors were operated under similar conditions as the control process but with an overall increase in NF Part B, as shown in Table 5, below. The amount of each nutrient feed addition of NF Part B was increased to 150% of the control, except NF5 which was increased to 225% of the control amount. The amount of NF Part A at NF5 was also increased to 150% of the control process amount. While the number of nutrient feed additions was reduced from 6 to 5, the total amount of NF Part B in the process was increased by 38%. This amounted to about a 2 mM increase in L-cystine.

TABLE 5

Comparison of Original and New Nutrient Feed Strategy

| Process | NF Part | Nutrient Feed Amount (% of Control Amount) | | | | | | |
|---|---|---|---|---|---|---|---|---|
| | | NF1 | NF2 | NF3 | NF4 | NF5 | NF6 | Overall |
| Original | A | 100% | 100% | 100% | 100% | 100% | 100% | 100% |
| | B | 100% | 100% | 100% | 100% | 100% | 100% | 100% |
| New | A | 100% | 100% | 100% | 100% | 150% | N/A | 92% |
| | B | 150% | 150% | 150% | 150% | 225% | N/A | 138% |

Cell culture samples were retained from the runs on days 12 and 14 and analyzed for reduction potential as detailed above. Intact antibodies and antibody fragments were visualized using LabChip GX assays of mAb-A BR-G 3 liter bioreactor run, BR-H 3 liter bioreactor run, and BR-I 50 liter bioreactor run at days 12 and 14 of storage under vacuum. These images indicated that the process with increased NF part B showed significantly less antibody reduction and increased purity of the intact antibody in the day 12 sample. The results are summarized in Table 6, and showed that the process with the increase in NF part B (BR-G; BR-H; and BR-I) showed significantly less antibody reduction and increased purity of the intact antibody in the Day 12 sample compared to the original process (BR-A, Example 2).

TABLE 6

Purity of Intact mAb-B in Original and New Process by GX/Vacuum Assay

| Bioreactor Run# | Process | Purity (% intact antibody) | |
|---|---|---|---|
| | | Day 12 | Day 14 |
| BR-A | Original | 17.1 | 80.6 |
| BR-G | New | 72.1 | 71.0 |
| BR-H | New | 70.9 | 72.5 |
| BR-I | New | 66.9 | 71.5 |

Example 14: Bioreactor Protein Manufacturing Run BR-J

In this example, two 3 L scale bioreactors (BR-J-1 and BR-J-2) were operated in a fed-batch process using CHO cells that express the investigational IgG2 monoclonal antibody-A (mAb-A). The manufacturing process for mAb-A differed from that of mAb-B in terms of basal medium formulation, criteria for inoculation and feeds, feed amounts, and bioreactor set points such as temperature and pH. This process comprises six nutrient feeds relative to the five nutrient feeds used in the mAb-B process. The process also started with a lower initial working volume (1.2 L) relative to the mAb-B process (1.5 L). Similar to the mAb-B process described in Example 1, the process comprised a fed-batch animal-protein-free cell culture of approximately 14 days. Similar to mAb-B expression, mAb-A was secreted into the cell culture medium. The nutrient feed protocol for the mAb-A cell culture process was modified relative to the mAb-B process described in the feeding scheme, in that it included increasing the amounts of NF Part B in each of the six nutrient feeds (NF1-6) to 200% of the control volume as indicated on Table 7, an increase of 0.60 mM per NF addition over the control. Cell culture samples were retained and frozen on days 5, 8, 10, 12, and 14 of the bioreactor process. The samples were later thawed and analyzed for reduction potential using the Vacuum/BioA assay. Analyses of the images of intact antibodies and antibody fragments obtained from BioA/Vacuum MAb reduction assay for mAb-A bioreactor BR-J samples with and without additional nutrient feed including cystine indicated that the percent of intact antibody increased after Day 12 with the additional amount of NF Part B, which included cystine. The results are summarized in Table 7, which showed that the % of intact mAb increased after Day 12 with the additional amount of NF Part B which includes cystine. Bioreactor samples BR-J-1 and BR-J-2 were also analyzed using UPLC to verify the cystine concentrations in the bioreactors. The results depicted in FIG. 10 show the increase in cystine in the BR-J-2 sample.

TABLE 7

Purity (%) of Intact Mab-B in Bioreactor Samples as Measured by Vacuum/BioA assay with Increased Amounts of NF Parts B.

| Run# | Nutrient Feed Amount (% of Control Volume) NF1-NF6 | | Vacuum/BioA Assay Result Intact Mab peak (152-158 kDa) | | | | |
|---|---|---|---|---|---|---|---|
| | Part A | Part B | Day 8 | Day 10 | Day 12 | Day 13 | Day 14 |
| BR-J-1 | 100 | 100 | 30.9 | 41.8 | 34.5 | 16.5 | 21.4 |
| BR-J-2 | 100 | 200 | 34.6 | 40.5 | 38.7 | 31.5 | 34.6 |

Example 15: Bioreactor Protein Manufacturing Run BR-K

In this example, two 3 L scale bioreactors (BR-K-1 and BR-K-2) were operated in a fed-batch process using CHO cells that express the investigational IgG4 monoclonal antibody-C (mAb-C). The manufacturing process for mAb-C differed from that of mAb-A in terms of basal medium formulation, which contained different amounts of cell culture medium components and feeds, feed amounts, and bioreactor set points such as temperature and pH. This process comprises six nutrient feeds relative to the five nutrient feeds used in the mAb-B process. Similar to the mAb-A process described in Example 1, the process comprised a fed-batch animal-protein-free cell culture of approximately 14 days. Similar to mAb-B expression, mAb-C was secreted into the cell culture medium. The mAb-C process comprised modifications to the nutrient feed protocol which included adding additional NF Part B with each of the nutrient feeds (NF1-6). As indicated in Table 8, below, the additional NF Part B increased the levels of cystine compared to the control bioreactor. Cell culture samples were retained and frozen on days 1, 4, 5, 6, 8, 10, 12, and 14 of the bioreactor process.

The samples were later thawed and analyzed for reduction potential using the Vacuum/BioA assay. Cells were lysed using a freeze-thaw cycle by freezing 1 ml of culture in an Eppendorf tube in a −80° C. freezer, and after at least 12 hours the culture sample was thawed in a 37° C. water bath. To lyse cells using the capillary shear method, an AKTA purifier was used to control the flow rate of the culture sample at 22.2 mL/min through a 0.007" ID×10 cm stainless steel capillary tube connected to the system outlet. After either lysis method, the lysed cell samples were centrifuged at between 2100 and 10000×g for 5-10 minutes to remove the cells and cell debris, and the supernatant was analyzed for reduction potential. This assay used a BioA analyzer (Agilent Technologies) instead of the GX analyzer used in the earlier Examples. Images of intact antibodies and antibody fragments of BR-K BioA/vacuum reduction assay for mAb-C bioreactor samples with and without additional nutrient feed including cystine were obtained. These images showed that the purity of samples which were lysed showed a lower fraction of completely reduced Mab for the condition with increased NF Part B compared to the control condition. The results are summarized in Table 8, below, which showed that the purity of samples which were lysed using either a freeze/thaw cycle or using a shear device showed a lower fraction of completely reduced Mab for the condition with increased NF Part B compared to the control condition. Bioreactor samples were also analyzed using UPLC to verify the cystine concentrations in the bioreactors. The results of this analysis are shown in FIG. 11, which shows an increase in cystine in the BR-K-2 samples as compared to control.

cation. Using the Labchip® GXII, the protein and fragments were detected by laser-induced fluorescence and translated into gel-like images (bands) and electropherograms (peaks).

Antibody Aggregation Analysis

The percent of antibody aggregates was determined using standard size exclusion chromatography (HP-SEC) methods. An Agilent 1200 series system was used with a Tosoh Bioscience TSKgel G3000SW XL column (Tosoh Bioscience LLC, King of Prussia, PA) (7.8 mm×300 mm) at 1 mL/min flow rate using a mobile phase buffer of 0.1 M sodium phosphate, 0.1 M sodium sulfate, pH 6.8. The absorbance chromatography at 280 nm was used to quantify the results.

Free Thiol Quantitation in Harvested Cell Culture Fluid (HCCF)

The amount of free thiol in harvested cell culture fluid was determined by matching predicted masses of disulfide-linked peptides to observed masses from non-reducing Lys-C peptide mapping. Briefly, the sample was denatured and diluted prior to digestion with a serine protease. Following protease digestion, half of each reaction mixture was reduced by the addition of DTT. The digests were separated by RP-HPLC using a C18 column and analyzed using a UV-detector and an on-line mass spectrometer. Disulfide-

TABLE 8

Percent of Intact Mab-C in Bioreactor Samples as Measured by Vacuum/BioA assay with Increased Amounts of NF Parts B.

| | | Vacuum/BioA Assay Result | | | |
|---|---|---|---|---|---|
| | | % Intact Mab and Higher-level Mab fragments (HHL, HH, HL, >86 kDa) | | % Free Heavy and Light Chain Mab fragments (H, L, <86 kDa) | |
| | Cystine (mM) added per | Day 14, cells | Day 14, cells | Day 14, cells | Day 14, cells |
| Run# | From mAb-C Process | From Additional NF Part B | lysed by freeze/thaw cycle | sheared by flow through capillary tube | lysed by freeze/thaw cycle | sheared by flow through capillary tube |
| BR-K-1 | 0.47 mM | None | 3.1 | 1.3 | 96.8 | 98.7 |
| BR-K-2 | 0.47 mM | 0.60 mM | 9.4 | 19.3 | 90.5 | 80.7 |

Example 16: Fragmentation and Reduction of Samples

Where samples were subjected to vacuum analysis, they were thawed and vortexed. Aliquots of about 400 µL were transferred into glass tubes. The tubes were placed in a small vacuum chamber sealed by screw-cap Mininert™ valves (VICI Valco Instruments, Houston, TX) that can offer on/off control. Vacuum was applied into vacuum chamber through silicon tubing, and the chamber was sealed. Argon gas was then applied into the chamber through silicon tubing until argon pressure was established and the chamber was again sealed. The process was repeated for three cycles of vacuum/argon following the above procedures, and then the chamber was sealed with argon inside. The chamber was then incubated overnight at room temperature.

Samples were stored frozen until analyzed. Once thawed, 400-600 µL of each sample was transferred to culture tubes and mixed in non-reducing sample buffer containing N-Ethylmaleimide (NEM). After being denatured and the free thiols being capped by NEM, the samples were analyzed using a Perkin Elmer Labchip® GXII (Perkin Elmer, Waltham, MA) to perform size fractionation and quantifibond linked peptides are only present in non-reducing runs and will disappear under reducing conditions.

Free Thiol Quantitation Assay

The free thiol assay evaluates the integrity of the disulfide connections in a protein by measuring the levels of free thiol groups on unpaired cysteine residues. Samples are incubated under native and denatured conditions with a compound (5, 5'-dithiobis-(2-nitrobenzoic acid) or DTNB) that binds to free thiol and releases a colored thiolate ion. The colored thiolate ion is detected with a UV-visible spectrophotometer. The concentration of free thiol is interpolated from a standard curve and the free thiol-to-antibody molar ratio is reported.

Example 17: Effect of Antibody Disulfide Bond Reduction on Aggregation Formation in the Harvested Cell Culture Fluid A small-scale (3 L) bioreactor fed-batch study was conducted with mAb E (IgG1 monoclonal antibody) and the conditioned medium was collected on day 14. A portion of the harvested material was subjected to shear stress using a capillary tube described in Example 15, to mimic the effects of a large scale harvest using continuous centrifuge. After dividing up the sheared material into 40 ml aliquots, the aliquots were spiked with either EDTA, CuSO4-5H20, Cystine, a combination of CuSO4-5H20 and Cystine, or left unspiked. The un-sheared material and the sheared aliquots, were centrifuged in 50 ml centrifuge tubes and the supernatant was decanted from each condition. The supernatant from each of these conditions was then either frozen immediately at −80 C or stored at 2-8° C. for 8 days followed by freezing at −80° C. The frozen samples were later tested for reduction potential by holding the samples under vacuum for 12 hours and tested in a non-reduced GXII assay to measure reduced species of light and heavy chain fragments. The samples were also tested for the level of aggregation of the mAb using high performance size exclusion chromatography (HPSEC). As shown by Table XX, shearing the control cell culture material caused the samples to have a reduction potential, as indicated by a decrease in % intact mAb to 0 after vacuum treatment. In contrast, sheared material with an EDTA addition at concentrations of 9.5, 19, and 38 mM or Cystine addition at concentrations of 4 and 8 mM showed no reduction potential at the time of harvest. Table 9 also shows a similar impact on aggregation of the material after 8 days at 2-8° C. Shearing the cell culture material showed a significant increase in aggregation over un-sheared material. However, the addition of EDTA at 9.5, 19, and 38 mM or Cystine at 4 and 8 mM limited the extent of mAb aggregation.

Example 18: Effect of Antibody Disulfide Bond Reduction on Aggregate Formation in the Purification Process of mAb B During purification of an IgG2 monoclonal antibody (mAb B), increased levels of fragments were observed as shown in Table 10, below. The high levels of impurities were first detected in the capture product and were carried through the subsequent steps in the process. As shown in FIG. 12A and FIG. 12B, an analysis of the capture product and final polishing intermediate using a non-reduced (NR)-GX device showed the presence of fragment bands with molecular weights corresponding to reduced species (L, H, L-L, H-L, H-H, H-H-L) of the intact antibody. As seen in FIG. 12C, similar bands of the reduced species were also detected when the HCCF was analyzed by NR-GX, indicating that the mAb reduction phenomenon was occurring at the harvest step. The cell culture media had been clarified using centrifugation harvest and it has previously been reported by Trexler-Schmidt and co-workers (2010, Biotechnol. Bioengineer. 106:452-461) that harsh centrifugation conditions have been shown to impact product quality through increased cell rupture leading to the release of intra-cellular host cell proteins such as thio-redoxin and thio-redoxin reductase, which can cause antibody reduction through an enzymatic reaction.

TABLE 10

Comparison of aggregate and fragment levels in the purification process pre- and post-process optimization.

| | | Capture | Low pH Viral Inactivation | Intermediate Polishing | Final Polishing | Drug Substance |
|---|---|---|---|---|---|---|
| Initial Purification Process | M (%) | 96.2 | 95.7 | 96.0 | 98.2 | nt |
| | A (%) | 2.2 | 3.2 | 2.8 | 0.5 | nt |
| | F (%) | 1.6 | 1.1 | 1.2 | 1.3 | nt |
| Purification Process with low temp, O$_2$, 2 mM Cystine, 4 day hold | M (%) | 96.9 | 96.8 | 96.8 | 99.6 | 98.4 |
| | A (%) | 2.0 | 4.0 | 3.6 | 1.0 | 1.5 |
| | F (%) | 0.1 | 0.1 | 0.1 | 0.0 | 0.1 |
| Purification Process with low temp, O$_2$, 4 mM Cystine, 14 day hold | M (%) | 98.2 | 97.8 | nt | 99.2 | 99.0 |
| | A (%) | 1.8 | 2.2 | nt | 0.8 | 1.0 |
| | F (%) | 0 | 0 | nt | 0 | 0 |

Based on the hypothesis that the loss in product quality was driven primarily by the release of intra-cellular reducing enzymes disrupting disulfide bonds in the mAb molecule, controls were put in place to slow down the reduction reaction by chilling the HCCF and providing an oxidative environment by increasing the headspace in the storage vessel. In addition, the HCCF was purified immediately after harvest to minimize the duration of exposure of the reducing enzymes to the mAb. Analysis using NR-GX of the purification process intermediates showed no reduced species being present across the purification process.

While it is possible to control for reduction through this combined approach, having to process the HCCF immediately imposes severe limitations on manufacturing flexibility. In addition, immediate purification of the HCCF becomes challenging when column size limitations in the manufacturing plant may require multiple cycles of the capture step to be performed. The means of providing an oxidative environment to slow down the rate of reduction involved storing the HCCF in containers with headspace equivalent or larger than the actual volume of the HCCF. This may be a viable option for bench and pilot scale runs, but could prove problematic for manufacturing runs. Alternatives like oxygen sparging and providing an air overlay may be feasible, but may not be available at all facilities.

To allow for extended HCCF holds without impacting product quality, excipient spikes into the pre-harvested cell culture fluid was evaluated. L-cystine has been reported to be a potential competitive inhibitor of a reducing enzyme or act as a surrogate substrate for the enzyme in place of the mAb product (Trexler-Schmidt, M., et al., cited above).
Impact of Cystine Addition on Reduction Control As part of an initial assessment of cystine levels on reduction control, the level of L-cystine in the harvested HCCF was adjusted to 0 mM, 2 mM, and 4 mM through the spiking of L-cystine and cell lysate into the HCCF immediately after harvest. To decouple the effects of the oxidative environment from temperature and cystine levels on preventing reduction, aliquots of the HCCF were sealed in drug substance storage bags without headspace and held for 2 weeks at 2° C.-8° C. before being analyzed.

In a parallel effort to assess the impact of cystine addition on purification process performance, the HCCF containing 2 mM cystine was purified after a four day hold at 2° C.-8° C. in a vessel with headspace. As seen in Table 10, above, during the purification of the HCCF containing 2 mM cystine, increased aggregate levels were observed after the low pH viral inactivation step, which were ultimately cleared during the final polishing step.

At the start of the 2 week hold study of the HCCF aliquots, using NR-GX analysis of HCCF aliquots, no signs of reduction was observed at the start of the 2 week hold study. However, by the end of the hold, reduction had set in for the samples containing 0 (no cystine) and 2 mM cystine (demonstrated by the presence of H-L and H-H-L fragments), while the sample containing 4 mM cystine still showed no signs of reduction. This indicates that the use of low temperature alone was not sufficient to prevent reduction from occurring, and that cystine is required to prevent antibody reduction. In addition, cystine levels have to be sufficiently high in order to completely mitigate reduction.

Using disulfide mapping mass spectrometry (MS), further analytical evidence was obtained that supports the hypothesis that low levels of cystine are inadequate for controlling reduction. The results shown in FIG. 13 indicate a corresponding higher level of inter-chain free thiol in the 0 and 2 mM cystine samples by the end of the hold, but not in the 4 mM cystine sample, nor the starting material (HCCF+0 mM cys, t=0). Franey et al. (2010, Protein Sci.; 19(9):1601-1615) had previously reported that an increase in free thiol level leads to a corresponding increase in aggregate formation for monoclonal antibodies, and this phenomena is more severe for $IgG_2$ molecules due to the higher amount of inter-chain disulfide bonds as compared to other IgG formats. In addition, Hari and co-workers (2010, Biochemistry; 49 (43):9328-9338) have demonstrated increased aggregate formation for $IgG_1$ and $IgG_2$ molecules under low pH and high salt conditions. For mAb B, previous low pH stability studies have shown faster and more significant increases in free thiol levels as the pH of the buffer is decreased from 3.6 to 3.2. The ratio of free thiol to IgG concentration with time when the HCCF is incubated at pH 3.2, pH 3.4, and pH 3.6 is shown in FIG. 14A. The change in aggregate with time when HCCF is incubated at pH 3.2, pH 3.4, and pH 3.6 is shown in FIG. 14B. These results show a corresponding increase in aggregate level with free thiol content.

Effect of 4 mM Cystine and HCCF Hold Conditions on Product Quality

A new HCCF was generated and split into two separate lots which were evaluated to assess the impact of reduction mitigation on purification process performance and formulated product stability. Briefly, two different lots were obtained from cell culture harvest (HCCF), to one lot, no L-cystine (0 mM cystine) was spiked into the mixture; and to the other lot 4 mM cystine was spiked into the mixture. Half of each lot mixture was purified and formulated immediately, while the other half was held for two weeks at 2-8° C. before purification and formulation. To replicate the conditions for aggregation observed previously with the 2 mM cystine-containing HCCF, vessels with headspace were used to store the HCCF lots that were held for two weeks. After formulation, all four lots were monitored for aggregation stability for up to 17 months at 2-8° C., and 1 month at 25° C. and 40° C.

As seen in in FIG. 15, when the inter-chain free thiol levels in all four HCCF aliquots were analyzed by disulfide mapping MS, a trend similar to the one shown in FIG. 13, was apparent. The HCCF that was held for two weeks in the absence of cystine exhibited an increase in free thiol, while the HCCF held for two weeks in the presence of 4 mM cystine had similar levels of free thiols when compared to the HCCF lots subjected to immediate purification and formulation. In addition to monitoring free thiol levels in the HCCF using MS techniques, colorimetric assays were also performed on purification process intermediates. Similar to the HCCF aliquots, as seen in FIG. 16 high free thiol levels were detected in the capture product purified from the HCCF that was held for two weeks in the absence of cystine. The trend in free thiol levels for the four lots also remained unchanged across the purification process indicating that the purification process cannot lower free thiol levels and that prevention of reduction and aggregation is required in the cell culture and harvested cell culture fluid (HCCF) in order to provide adequate mitigation.

The formulated bulk from the four products purified above were held at 5° C., 25° C., and 40° C. for up to one month and aggregate levels were measured weekly using HP-SEC. As seen in FIG. 17A to FIG. 17C, the material generated from HCCF that had been held for two weeks in the presence of 4 mM cystine showed similar starting and final purity levels as bulk material generated from HCCF that had been purified immediately. In contrast, the bulk material generated from the HCCF that had been held for two weeks in the absence of cystine had higher starting and final aggregate levels despite going through the same purification and formulation process. In addition, the rate of aggregate formation was also significantly higher when compared to the other samples. Therefore, higher free thiol content after harvest not only increases the burden on the purification process, but also limits the stability and shelf-life of the molecule. As the cause for free thiol increase was ultimately identified to be a result of a mAb reduction, proper mitigations should always be implemented in the process to prevent, and monitor for the occurrence of antibody reduction during development and production.

The introduction of a continuous centrifugation harvest operation can be a contributing factor to antibody reduction when harvested cell culture fluid was held after harvest. This resulted in increased fragment levels observed throughout the purification process. By employing various means of minimizing reducing enzyme activity (low temperature, oxidative environment, shortened hold duration, inhibitor addition), reduction during harvest was successfully prevented. However, the re-occurrence of antibody reduction during storage can indicate that reduction mitigation at the time of harvest may sometimes be inadequate, and that hold stability studies should always be conducted as part of a successful mitigation strategy.

In addition to monitoring fragment levels using electrophoretic techniques, changes in free thiol levels can be monitored across the duration of a HCCF hold as an additional measure for the occurrence of antibody reduction. However, as this MS technique is rather labor-intensive and not amendable to high throughput analysis, it can be used as a secondary means of verification if reduction mitigation strategies are adequate.

An additional benefit to proper mitigation of antibody reduction is that the aggregate burden on the downstream purification process can be reduced. As reduction is a reversible reaction, reduced species can re-oxidize as soon as the material is exposed to more oxidative environments. This can lead to the formation of monomeric species with an increased propensity for aggregation, or the formation of aggregate species directly. Although the primary pathway for aggregate formation for this molecule is unclear, our study clearly showed that the occurrence of reduction resulted in a corresponding increase in free thiol content and aggregation for this molecule. Further, as IgG2 molecules have been reported to be more susceptible to aggregate formation with increased free thiol levels as compared to other monoclonal antibody formats, it is not enough to merely provide an oxidative environment to allow the reduced species to be re-oxidized, rather, reduction has to be prevented from happening in the first place to prevent an increase in free thiol levels which is the pre-cursor to increased aggregate formation.

By having a robust reduction mitigation strategy, not only is it possible to reduce the impurity burden on the downstream process, but the stability of the molecule can also be improved, leading to longer shelf-life for the molecule. Also, it becomes feasible to store the HCCF for longer periods of time, allowing for greater flexibility in the manufacturing schedule as the process is scaled-up.

Example 19: Effect of Antibody Disulfide Bond Reduction on Aggregate Formation in the Purification Process of mAb F mAb F was purified by protein A chromatography after cell culture (Table 11, BRX-L-1) and harvest and subsequently subjected to a low pH hold at pH 3.6 before being neutralized to pH7.4. After low pH treatment, aggregate levels increased by 0.1% (from 4.8% to 4.9%). When purification was performed after a second cell culture run (BRX-L-2), aggregate levels increased by 8.7% (2.4% to 11.1%.) after low pH treatment. NR-GX analysis of Protein A product generated from both runs showed lower levels of intact mAb for Brx-L-2 (38.5%) as compared to BRX-L-1 (98.4%). In addition, the electropherograms (FIG. 18A & FIG. 18B) also detected additional peaks that corresponded to combinations of heavy (H) and light (L) chain fragments which were indicative of the occurrence of antibody disulfide bond reduction. Free thiol analysis of the capture products also showed higher free thiol content for mAb generated from BRX-L-2 (0.3 mol/mol) as compared to Brx-L-1 (0.2 mol/mol). A subsequent bioreactor (BRX-L-3) was run with three mitigations intended to prevent mAb reduction. An additional 0.346 mM of $CuSO_4\text{-}5H_2O$ was added to the nutrient feed part A increasing the bioreactor Cu by ~3 ppm. The amount of nutrient feed F (containing Cystine) added during each feed was increased by 50%, increasing the bioreactor cystine by ~1 mM. Finally, on the day of harvest EDTA was added to the bioreactor vessel prior to harvest at a concentration of 19.2 mM. NR-GX purity of the capture product (92.3%) was closer to the levels observed in BRX-L-1 capture product where antibody disulfide bond reduction was not observed. As expected, the electropherogram (FIG. 18C) did not detect heavy and light chain fragments that were observed for BRX-L-2. When the capture product was subjected to low pH treatment, aggregate level increase (0.6%) was lower than observed in the run using Brx-L-2. The direct correlation between levels of heavy and light chain fragments in the capture product and aggregate increase across low pH treatment indicates that antibody disulfide bond reduction is responsible for the increase in aggregate formation during low pH treatment.

TABLE 11

Impact of minimizing antibody disulfide bond reduction during the cell culture process on aggregate formation during purification of mAb F

| Bioreactor | Downstream Processing Step | SEC monomer (%) | SEC aggregation (%) | Non-reduced GX assay, intact mAb (%) | Free thiol (mol: mol) |
|---|---|---|---|---|---|
| BRX-L-1 | Protein A capture product | 94.0 | 4.8 | 98.4 | 0.2 |
|  | Low pH treated product | 94.0 | 4.9 | N/A | NA |
| BRX-L-2 | Protein A capture product | 93.5 | 2.4 | 38.5 | 0.3 |
|  | Low pH treated product | 85.3 | 11.1 | N/A | NA |
| BRX-L-3 (Cu, Cystine, and EDTA additions) | Protein A capture product | 94.4 | 4.6 | 92.3 | NA |
|  | Low pH treated product | 93.6 | 5.2 | N/A | NA |

Example 20: Aggregation and Reduction Potential of IgG1 mAb

This example shows that product instability of purified IgG1 monoclonal antibody (mAb A) in formulation buffer can be significantly reduced by eliminating the reduction potential during the cell culture in the production vessel.

The cell culture entailed growing and expanding GS-CHO based CAT-S suspension cells in animal protein free medium at 37° C. with regular passaging every 3 or 4 days. The production was carried out in fed-batch mode in bioreactors with controlled temperature, pH and dissolved oxygen levels. During the fed-batch process, nutrient and glucose supplementation feeds were added to cell culture. Viable cell counts and cell viability were measured by the trypan blue exclusion method using ViCell XR cell counter (Beckman Coulter, CA). A blood-gas analyzer (RAPIDPOINT 400; Siemens Medical Solutions Diagnostics; Tarrytown, NY) was used to measure pH and dissolved oxygen and to calibrate the bioreactor probes as needed. A biochemical analyzer was used to measure glucose levels in cell culture samples (BioProfile 400; Nova Biomedical; Waltham, MA). The productivity in cell culture was measured using analytical Protein A HPLC. At the end of fed-batch process, cell culture was harvested using depth filtration. The cell free harvest material was then purified and formulated to produce the final drug substance.

Reduction potential, i.e. the potential of the molecule to be reduced under anaerobic condition, was measured by subjecting samples to vacuum analysis as described above followed addition of non-reducing sample buffer. This mixture was then analyzed using a Perkin Elmer Labchip® GXII (Perkin Elmer, Waltham, MA) to perform size fractionation and quantification. In the GXII, protein and fragments were detected by laser-induced fluorescence and translated into gel-like images (bands) and electropherograms (peaks).

A formulated drug substance of an IgG1 monoclonal antibody was produced using a typical 14 day mammalian fed-batch cell culture that was harvested, purified and formulated. Aggregate levels in the formulated drug substance was measured weekly by HP-SEC for the first month and then again at 3 months and 9 months. Optimized liquid formulations, such as the one used here, should typically show no change in aggregate levels after 1 month of storage at 2-8° C. However, as seen in FIG. 19, the formulated drug substance in this case showed a very high aggregate increase in the first month (0.35% by HP-SEC) at the intended storage temperatures (2-8° C.). Although the rate of aggregation slowed down after the first month, this degree of aggregation is unacceptable for a liquid drug product and would increase substantially for higher protein concentration (100-150 mg/ml) which is often required.

Reduction potential in the end of fed-batch cell culture material was observed when measured as described in the methods section. Upon further investigation, it was noted that this reduction potential was absent at an earlier time (Day 8) of the cell culture fed-batch.

To identify a possible relationship between reduction potential in cell culture and stability of formulated drug substance, stability studies were conducted side-by-side between formulated drug substance from 8 day and standard 14 day cell culture fed-batch process. As seen in FIG. 20, the cell culture sample from 8 day fed-batch lacked the reduction potential, had less starting aggregate level at t=0, reduced aggregation rates at accelerated conditions (40° C.) by 3-fold and led to no increase in aggregate for up to 9 months at intended storage conditions (2-8° C.). However, a shorter cell culture fed-batch process also significantly decreases cell-culture productivity, which is undesirable from a manufacturing perspective. Additionally, due to the higher end of run viability, it was unclear if the improvement observed related to absence of reduction potential in cell culture or the high end of run cell viability.

As seen above, an alternate method to remove reduction potential in cell culture, is achieved by addition of extra copper and cystine in feeds. This method was tested side-by side to the control cell culture process. Using this strategy, it was possible to significantly decrease the reduction potential while achieving similar cell culture productivity and end of run cell viability. Electropherograms from non-reduced (NR) GXII analysis of end of fed-batch cell culture samples exposed to reduction potential analysis are shown in FIG. 21. Electropherograms from the end of run cell culture samples are from standard 14 day fed-batch process and are shown in FIG. 21A; those from a shorter 8 day fed-batch process are shown in FIG. 21B; and those from a standard duration fed-batch process with feeds enhanced with copper and cystine are shown in FIG. 21C. These figures show that only about 5% intact product (IgG) remains in drug substance from standard 14 day fed-batch process. This number significantly increases (>70%) if the end of run cell culture sample is from an earlier (day 8) harvest. The same effect was also achieved when the feeds during the fed-batch process were enriched in copper and cysteine while keeping the original length (14 days) of fed-batch process.

The image of degradation fragments visualized by NR-GX analysis of end of run cell cultures sample exposed to reduction potential analysis showed that most of the intact IgG in the end of run cell culture sample from standard process is degraded. On the other hand, enriching the feeds with copper and cystine helped retain intact IgG even after exposing the end of run cell culture sample to reduction potential analysis. As seen in FIG. 22, stability studies showed that elimination of reduction potential reduces starting aggregate level at t=0, reduces aggregation at accelerated temperature (40° C.) by over 3-fold and leads to no increase in aggregate for up to 9 months at intended storage conditions (2-8° C.). The data from the 3 conditions is summarized in Table 12, below.

By these examples, we have demonstrated that by modifying the cell culture process to significantly decrease or eliminate reduction potential, the stability of formulated drug substance is improved. This reduces aggregate level at t0 and results in virtually no additional aggregation over 9 months at intended storage conditions. Minimizing aggregation of therapeutic proteins is a key factor in the successful development of liquid products with acceptable shelf life for production and distribution.

TABLE 12

Impact of Fed-batch Duration and Feed Enrichment on Titer, Reduction Potential and Drug Substance Aggregation

| Feeds | Duration of Cell Culture Fed-batch process | Titer (g/L) | % viable cells at Run End | Reduction Potential | Aggregation (%/month) @ 40° C. | Aggregate change over 9 months at 2-8° C. |
|---|---|---|---|---|---|---|
| Standard Feeds | 14 | 3.6 | 38 | Yes | 1.5 | Yes |
| Standard Feeds | 8 | 1.7 | 89 | No | 0.5 | No |
| Standard Feeds with additional Copper and Cystine | 14 | 4.0 | 41 | No | 0.4 | No |

The breadth and scope of this disclosure should not be limited by any of the above-described exemplary aspects, but should be defined only in accordance with the following claims and their equivalents.

What is claimed is:

1. A method for increasing the yield of an intact disulfide bond-containing antibody or antigen-binding fragment thereof in a cell culture or solution, comprising manufacturing the disulfide bond-containing antibody or antigen-binding fragment thereof in the presence of a glutathione reductase inhibitor, a thioredoxin reductase inhibitor, or both a glutathione reductase inhibitor and a thioredoxin reductase inhibitor,
  detecting the presence of glutathione reductase and/or thioredoxin reductase in the culture or the solution containing the disulfide bond-containing antibody or antigen-binding fragment thereof, and
  adding a glutathione reductase and/or thioredoxin reductase inhibitor to mitigate reduction of the disulfide bond-containing antibody or antigen-binding fragment thereof;
  whereby the amount of intact disulfide bond-containing antibody or antigen-binding fragment thereof is higher in the cell culture or solution manufactured in the presence of a glutathione reductase inhibitor, a thioredoxin reductase inhibitor, or a glutathione reductase inhibitor and a thioredoxin reductase inhibitor as compared to the amount of intact disulfide bond-containing antibody or antigen-binding fragment thereof in a cell culture or solution not manufactured in the presence of a glutathione reductase inhibitor, a thioredoxin reductase inhibitor, or a glutathione reductase inhibitor and a thioredoxin reductase inhibitor.

2. The method of claim 1 where increasing the yield of an intact disulfide bond-containing antibody or antigen binding fragment thereof in a cell culture or solution is controlled via an online cell culture redox potential control system, wherein the online measurement of the cell culture redox potential is determined to increase the concentration of a glutathione reductase inhibitor, a thioredoxin reductase inhibitor, or a glutathione reductase inhibitor and a thioredoxin reductase inhibitor in response to a decrease in the cell culture redox potential.

3. The method of claim 1 wherein an increase of the yield of an intact disulfide bond-containing antibody or antigen-binding fragment thereof in a cell culture or solution is monitored online via measurement of the cell culture redox potential throughout the manufacturing process to prevent unnecessary over-addition of the glutathione reductase inhibitor, thioredoxin reductase inhibitor, or glutathione reductase inhibitor and thioredoxin reductase inhibitor in the final process titer.

4. The method of claim 1, further comprising determining the activity of the glutathione reductase and/or thioredoxin reductase in the culture or the solution during the manufacturing process and after a first addition of a glutathione reductase and/or a thioredoxin reductase inhibitor to continue to monitor and mitigate reduction.

5. The method of claim 1 or claim 4, wherein determining the activity of the glutathione reductase and/or thioredoxin reductase in the culture or the solution comprises:
  adding 5,5'-dithio-bis(2-nitrobenzoic acid) (DTNB) to a sample obtained during the manufacturing process;
  adding at least one of thioredoxin reductase inhibitor and glutathione reductase inhibitor to a portion of the sample containing DTNB; and
  monitoring reduction of DTNB at a wavelength of 412 nm in the sample;
  wherein a higher reduction of DTNB in the samples without at least one of thioredoxin reductase inhibitor and glutathione reductase inhibitor, indicates the activity of thioredoxin reductase and/or glutathione reductase.

6. The method of claim 5, wherein NADPH, oxidized glutathione, and buffer are added to the sample prior to monitoring reduction.

7. A method for increasing the yield of an intact disulfide bond-containing antibody or antigen-binding fragment thereof or diminishing the reduction potential of the disulfide containing antibody or antigen-binding fragment thereof in a cell culture or fermentation process comprising maintaining the extracellular cystine levels above 0 and/or maintaining the extracellular Cu levels above 0 and/or adding EDTA to the bioreactor during the cell culture or fermentation process or to the solution containing the disulfide bond-containing antibody or antigen-binding fragment thereof; wherein maintaining the extracellular cystine levels above 0 during the cell culture or fermentation process prevents disulfide bond reduction in the disulfide bond-containing antibody or antigen-binding fragment thereof.

8. The method of claim 7, wherein the intact disulfide bond-containing antibody or antigen-binding fragment thereof is released into the cell culture fluid (CCF).

9. The method of claim 8, wherein the cell culture or fermentation process comprises maintaining the cells in CCF for at least 2 days.

10. The method of claim 9, wherein the cell culture process is a mammalian or insect cell culture process, and the fermentation process is a bacterial, yeast, or fungi fermentation process.

11. A method for improving the stability of a purified disulfide bond-containing antibody or antigen-binding fragment thereof, comprising using a manufacturing process that mitigates reduction or reduction potential of the antibody or antigen-binding fragment thereof during the manufacturing process, thereby resulting in lower aggregate formation during the purification process, wherein the manufacturing process comprises a cell culture phase, a harvest phase, at least one hold phase, a purification phase, or any combination thereof.

12. The method of claim 11, where the minimization of disulfide bond reduction and/or disulfide bond reduction potential and/or free thiols is achieved by increasing $Zn^{2+}$, $Mn^{2+}$, $Fe^{3+}$, $Cu^{2+}$, $Se^{2+}$, cystine, dissolved oxygen, beta mercaptoethanol, or glutathione, or a combination thereof during any step of the manufacturing process, as long as the cell culture redox potential is maintained above a threshold value of −55 mV or −70 mV.

13. A method for increasing the yield of an intact disulfide bond-containing antibody or antigen-binding fragment thereof in a cell culture or solution, comprising manufacturing the disulfide bond-containing antibody or antigen-binding fragment thereof using a process that mitigates reduction or reduction potential of the antibody or antigen-binding fragment thereof by increasing the concentration of $Zn^{2+}$, $Mn^{2+}$, $Fe^{3+}$, $Cu^{2+}$, $Se^{2+}$, cystine, beta-mercapto ethanol, glutathione, or dissolved oxygen during manufacturing processes, comprising detecting the redox potential in the culture or solution containing the disulfide bond-containing antibody or antigen-binding fragment thereof, and adding of $Zn^{2+}$, $Mn^{2+}$, $Fe^{3+}$, $Cu^{2+}$, $Se^{2+}$, cystine, beta-mercaptoethanol, glutathione, or dissolved oxygen to mitigate reduction of the disulfide bond-containing antibody or antigen-binding fragment thereof; wherein the cell culture redox potential is maintained above a threshold value of −55 mV or −70 mV, thereby increasing the yield of the intact disulfide bond-containing antibody or antigen-binding fragment.

\* \* \* \* \*